(12) United States Patent
Abe et al.

(10) Patent No.: US 7,995,651 B2
(45) Date of Patent: *Aug. 9, 2011

(54) FIELD/FRAME ADAPTIVE CODING AND DECODING METHOD WITH FIELD/FRAME INDEX AND APPARATUS FOR PERFORMING THE SAME

(75) Inventors: Kiyofumi Abe, Kadoma (JP); Shinya Kadono, Nishinomiya (JP); Satoshi Kondo, Yawata (JP)

(73) Assignee: Panasonic Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/969,897

(22) Filed: Dec. 16, 2010

(65) Prior Publication Data

US 2011/0096843 A1   Apr. 28, 2011

Related U.S. Application Data

(60) Continuation of application No. 11/980,618, filed on Oct. 31, 2007, which is a division of application No. 10/501,001, filed as application No. PCT/JP03/13679 on Oct. 27, 2003, now Pat. No. 7,881,375.

(30) Foreign Application Priority Data

Nov. 25, 2002   (JP) .................................. 2002-340392

(51) Int. Cl.
*H04N 7/12* (2006.01)
(52) U.S. Cl. ................................ 375/240.1; 375/240.24
(58) Field of Classification Search ............... 375/240.1, 375/240.24
See application file for complete search history.

(56) References Cited

U.S. PATENT DOCUMENTS

| 6,236,806 | B1 | 5/2001 | Kojima et al. |
| 6,272,179 | B1 | 8/2001 | Kadono |
| 2003/0099292 | A1 | 5/2003 | Wang et al. |
| 2003/0099294 | A1 | 5/2003 | Wang et al. |

FOREIGN PATENT DOCUMENTS

JP   6-78298   3/1994

(Continued)

OTHER PUBLICATIONS

Wang, L., et al., "Interlace Coding Tools for H. 26L Video Coding," ITU—Telecommunications Standardization Sector Study Group 16 Question 6 Video Coding Experts Group (VCEG) VCEG-037, 15th Meeting: Pattaya, Thailand, Dec. 4-6, 2001.

(Continued)

*Primary Examiner* — Jay Patel
*Assistant Examiner* — Richard Torrente
(74) *Attorney, Agent, or Firm* — Wenderoth Lind & Ponack, L.L.P.

(57) ABSTRACT

A moving picture coding method for coding a picture when switching between frame coding and field coding adaptively on a block-by-block basis. The method including determining the maximum number of reference indices for field coding for specifying fields which are to be referred to at the time of field coding, using the maximum number of reference indices for frame coding for specifying frames which are to be referred to at the time of frame coding, and assigning to fields the reference indices for field coding for specifying fields which are to be referred to at the time of field coding, within a range of the determined maximum number thereof, using the reference indices for frame coding for specifying frames which are to be referred to at the time of frame coding.

3 Claims, 41 Drawing Sheets

FOREIGN PATENT DOCUMENTS

| | | |
|---|---|---|
| JP | 10-136384 | 5/1998 |
| JP | 11-239351 | 8/1999 |
| TW | 502542 | 9/2002 |
| WO | 03/088679 | 10/2003 |

OTHER PUBLICATIONS

"ITU-T Rec. H. 264—ISO/IEC 14496-10 AVC Joint Final Committee Draft of Joint Video Specification," Aug. 10, 2002, p. 54, 8. 3. 6. 3 Default index orders, p. 56 8. 3. 6. 4 Changing the default index orders.

Wang, L., et al., "Adaptive Frame/Field Coding for JVT," Joint Video Team of ISO/IEC MPEG & ITU-T VECG, $2^{nd}$ Meeting: Geneva, Switzerland, Jan. 29-Feb. 1, 2002.

Wiegand, Thomas, "Joint Final Committee Draft (JFCD) of Joint Video Specification (ITU-T Rec. H. 264, ISO/IEC 14496-10 AVC)," Joint Video Team (JVT) of ISO/IEC MPEG and ITU-T VCEG $4^{th}$ Meeting, Klagenfurt, Austria, Jul. 22-26, 2002, pp. 56-57 and 60, [JVT-D157].

Wang, et al., "Macroblock Adaptive Frame/Field Coding for Interface Sequences," Joint Video Team (JVT) of ISO/IEC MPEG & ITU-T VCEG (ISO/IEC JTC1/SC29/WG11 and ITU-T SG16 Q.6), $3^{rd}$ Meeting, Fairfax, Virginia, May 6-10, 2002, pp. 1-12.

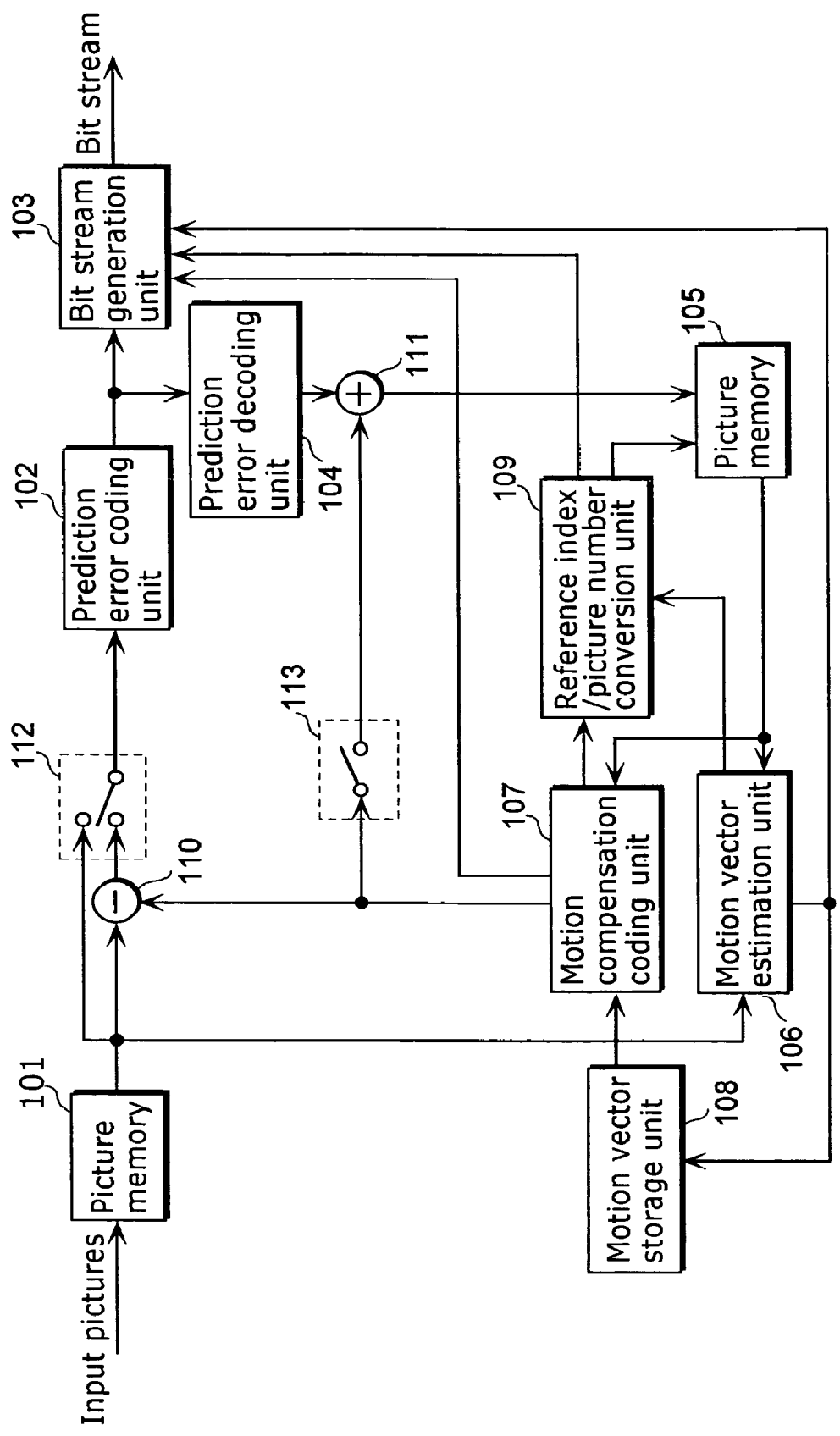

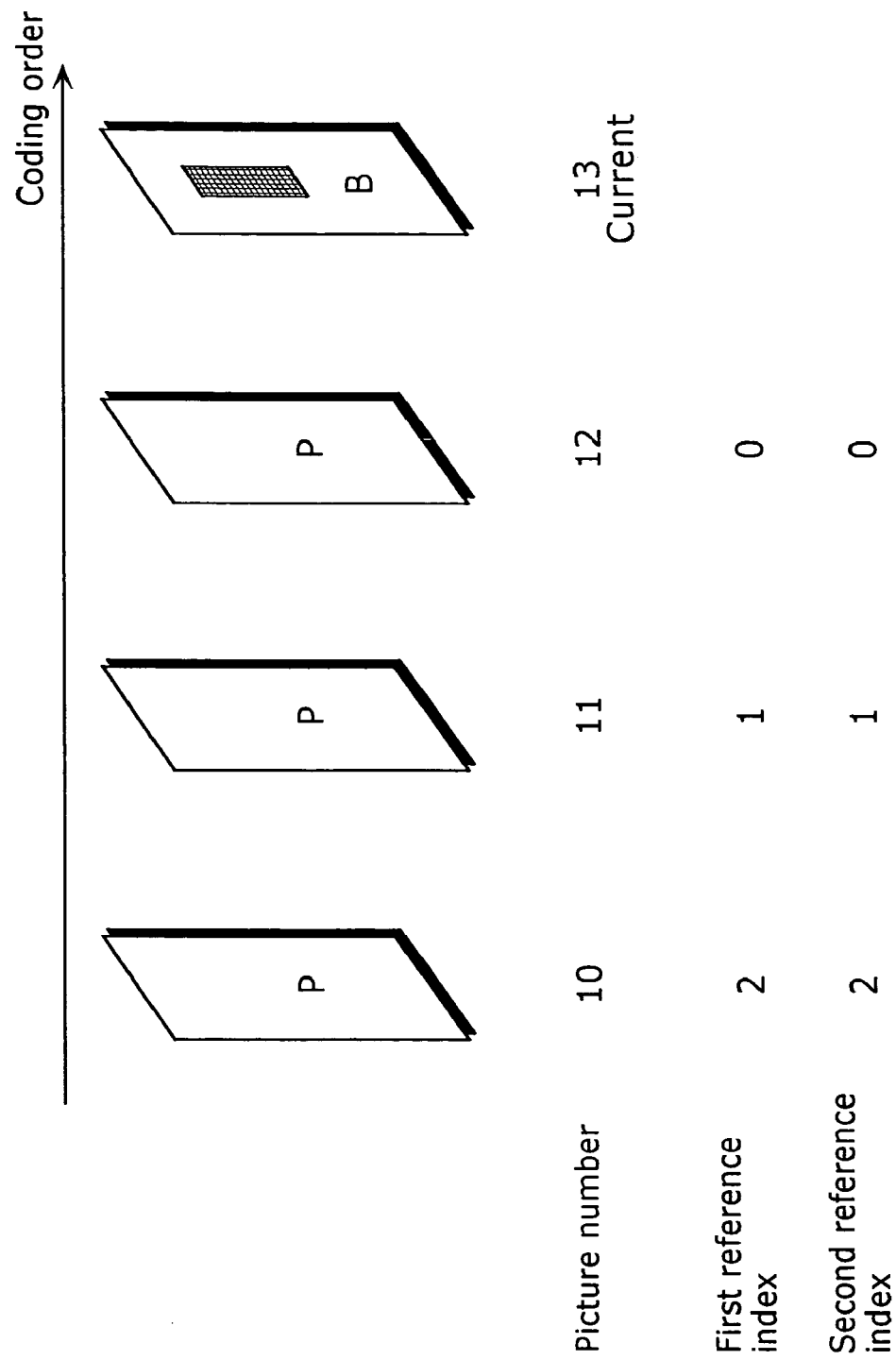

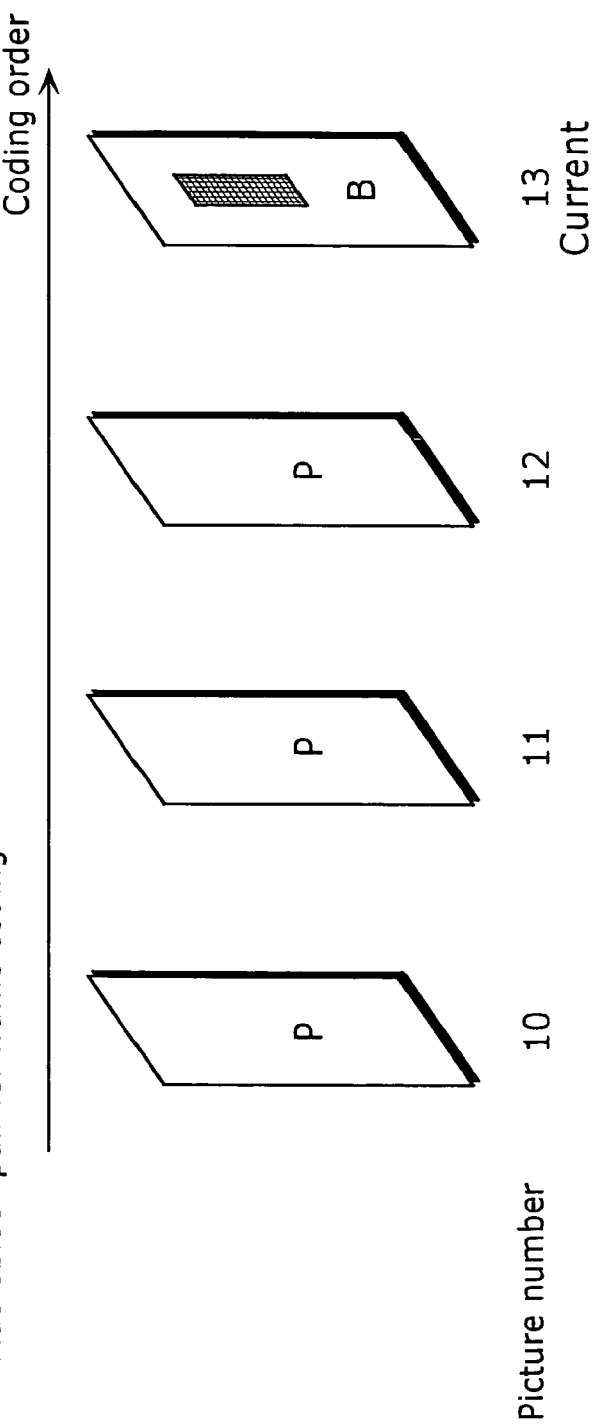
Fig. 3

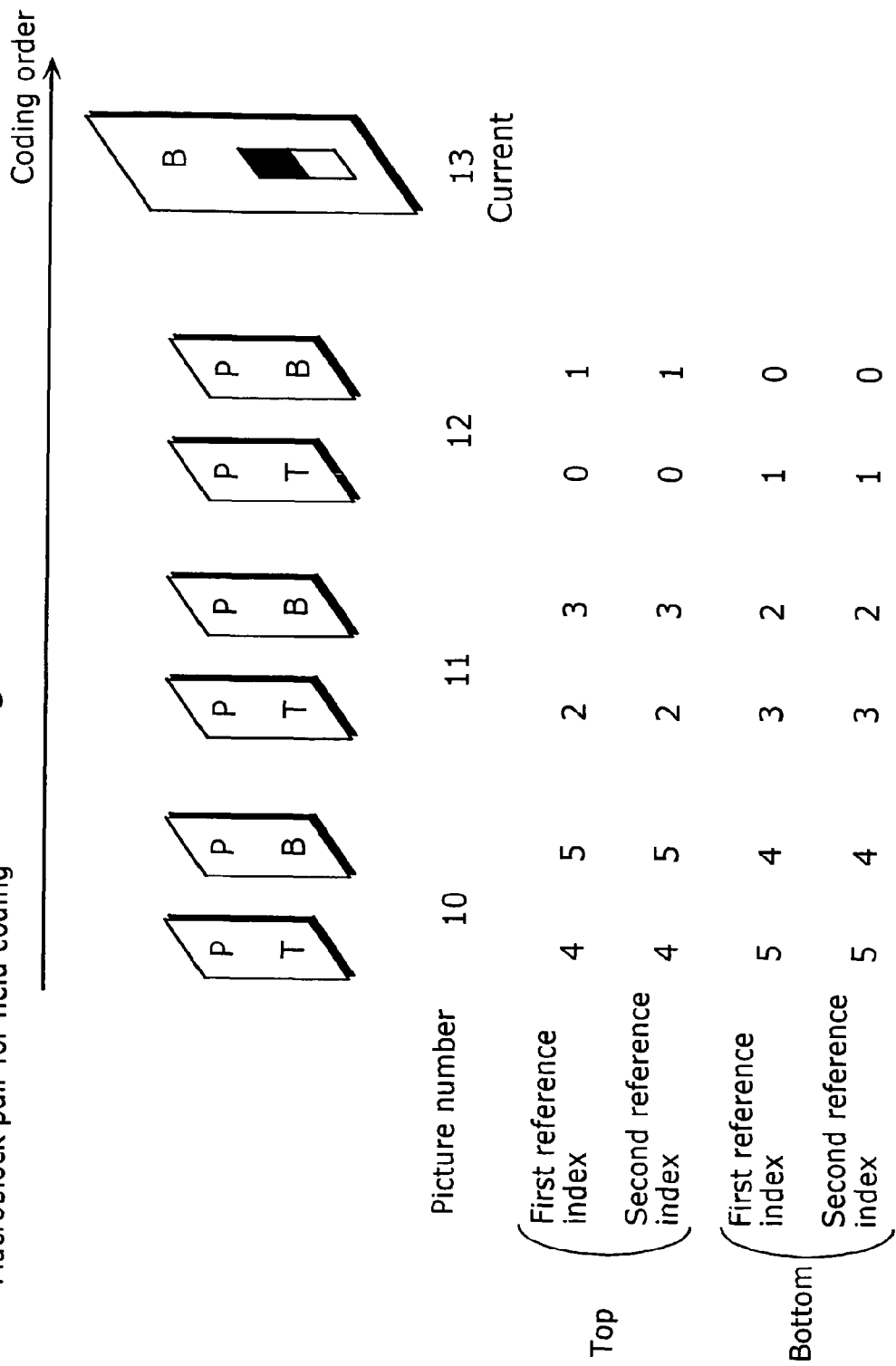
Fig. 4

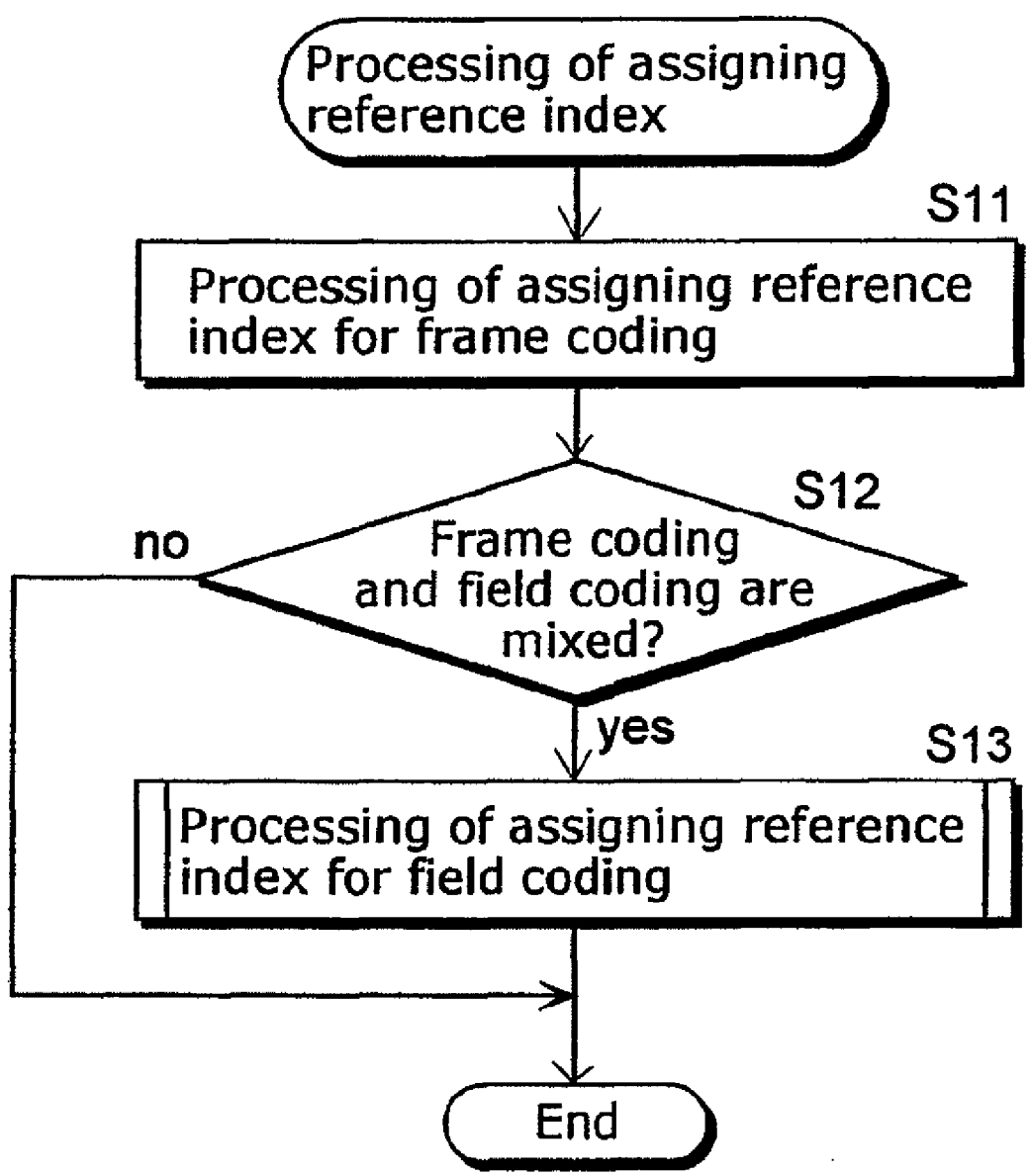
Fig. 5

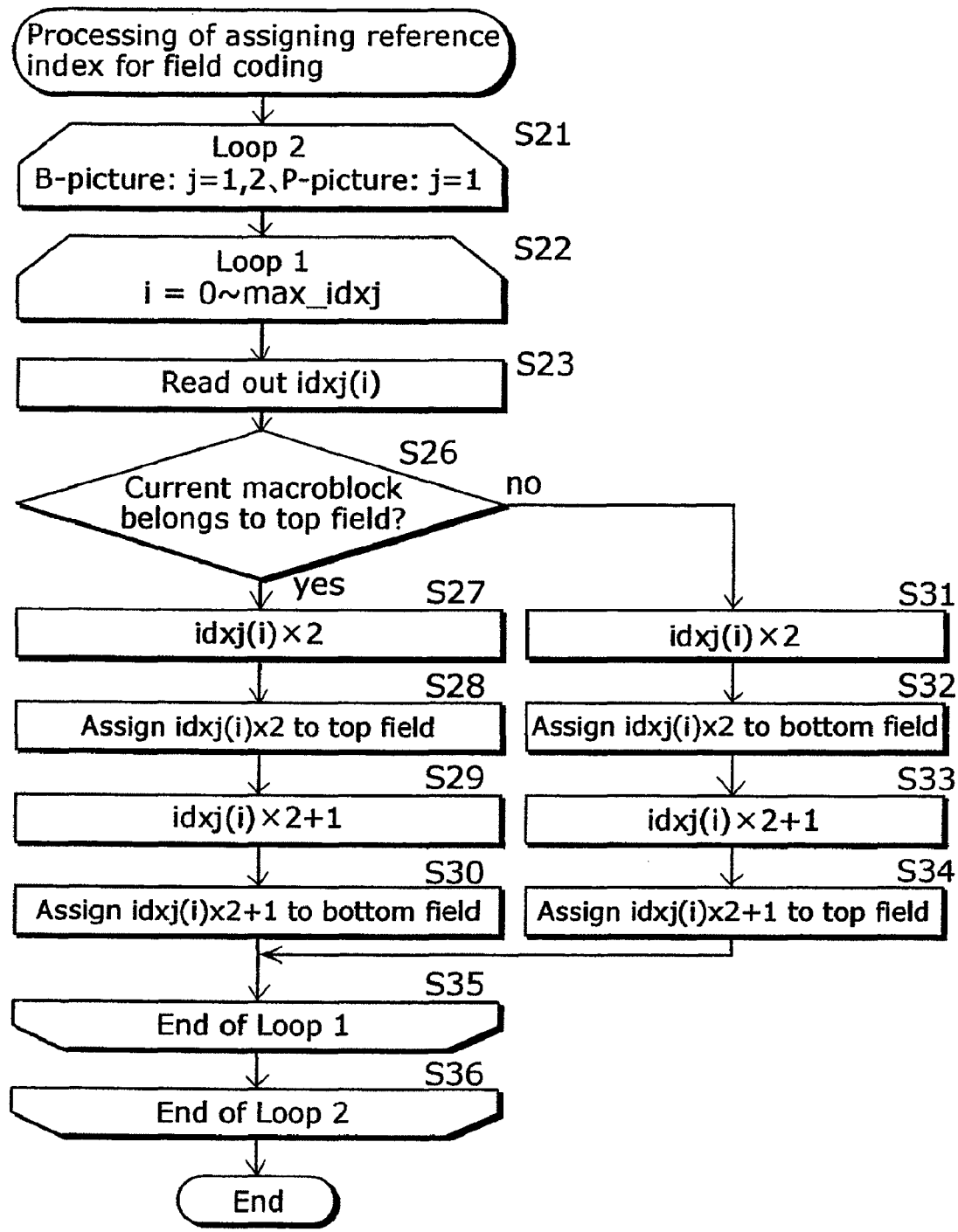
Fig. 6

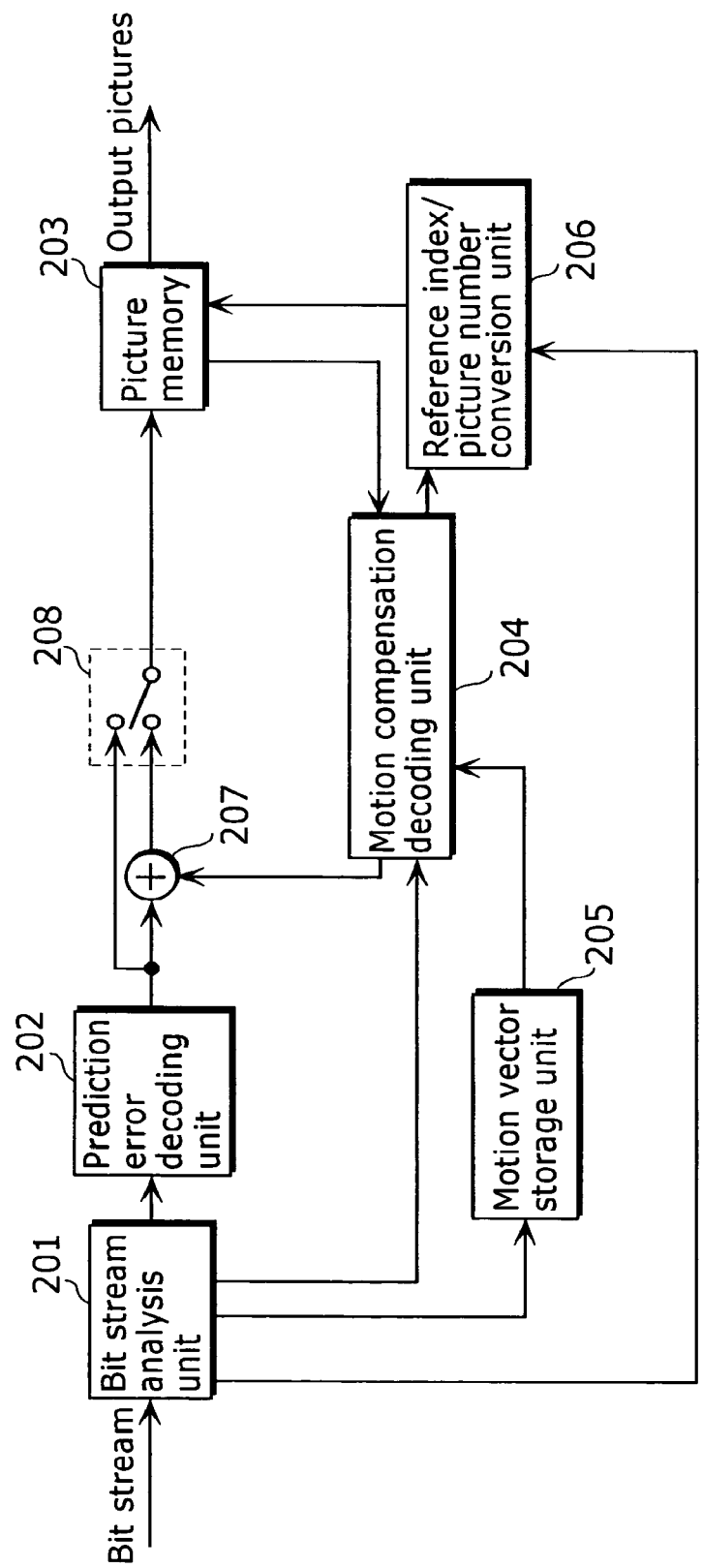

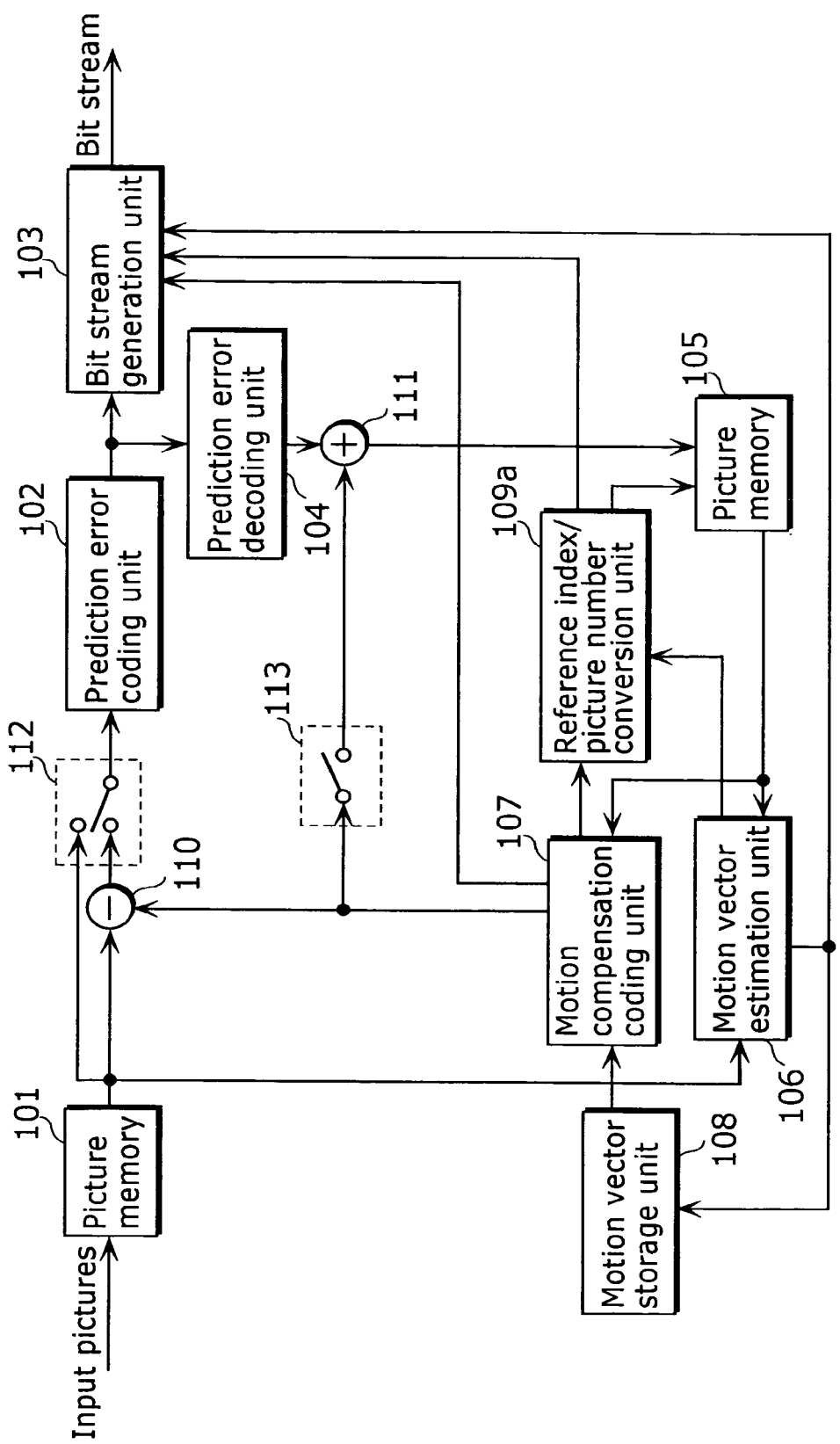
Fig. 8

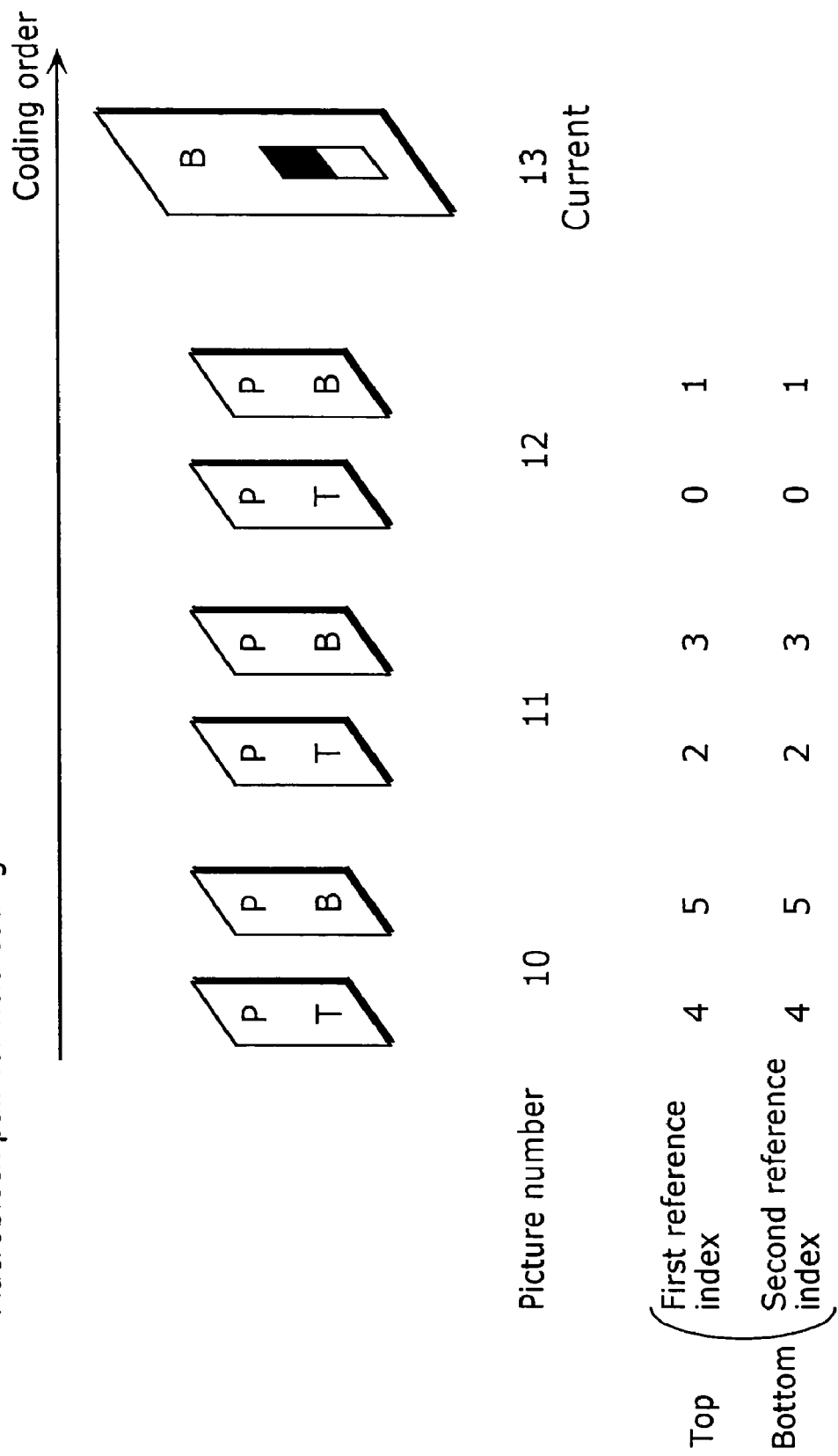

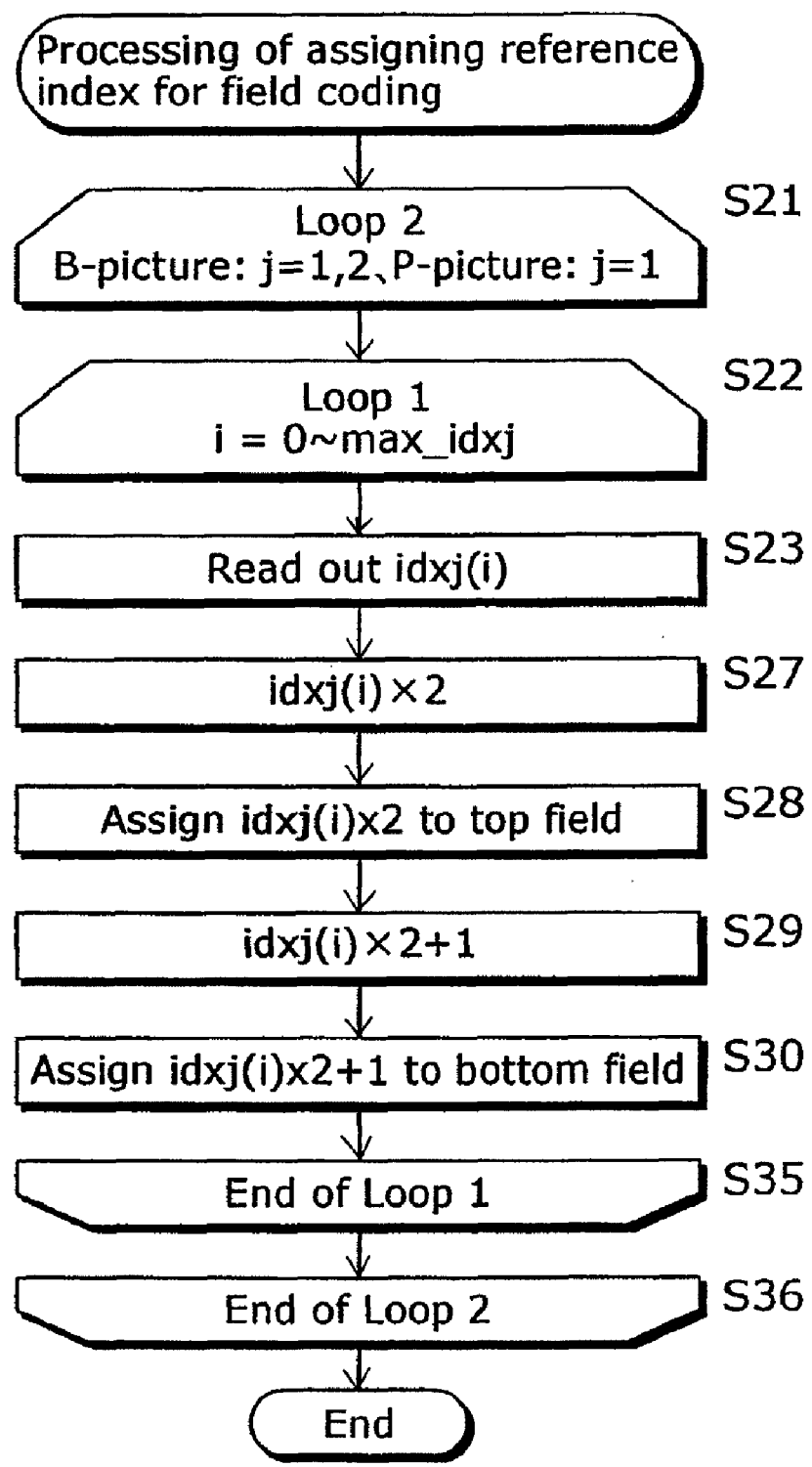
Fig. 10

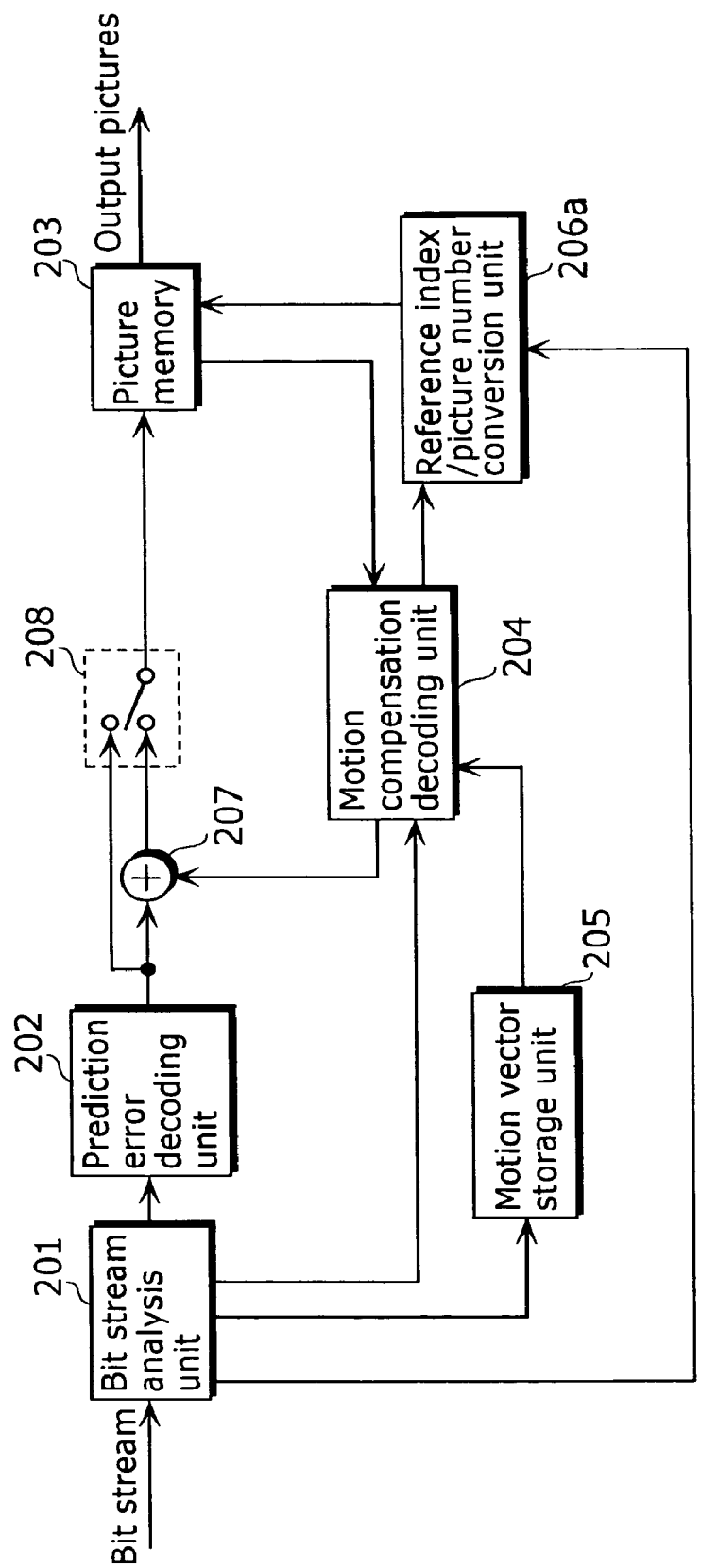
Fig. 11

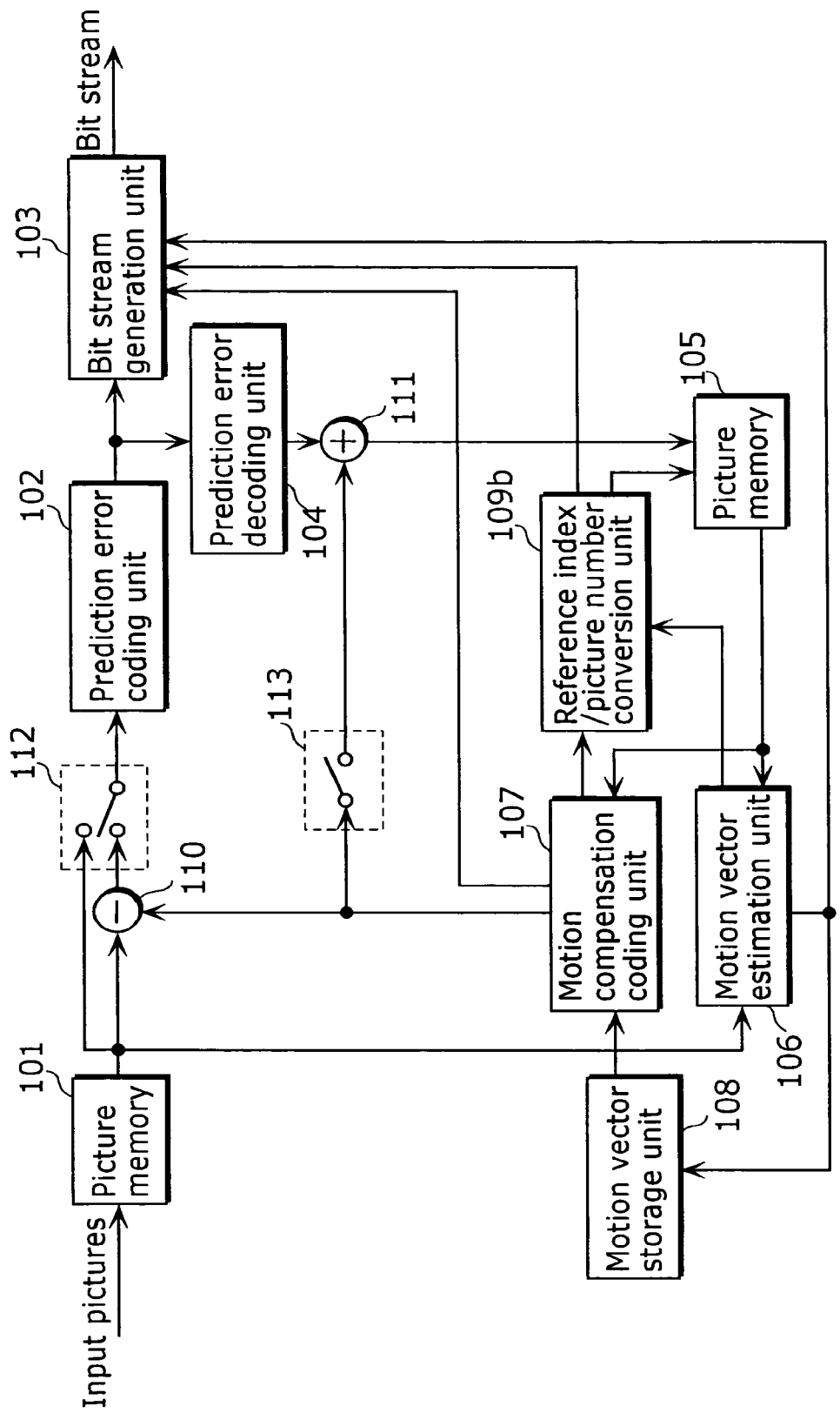
Fig. 12

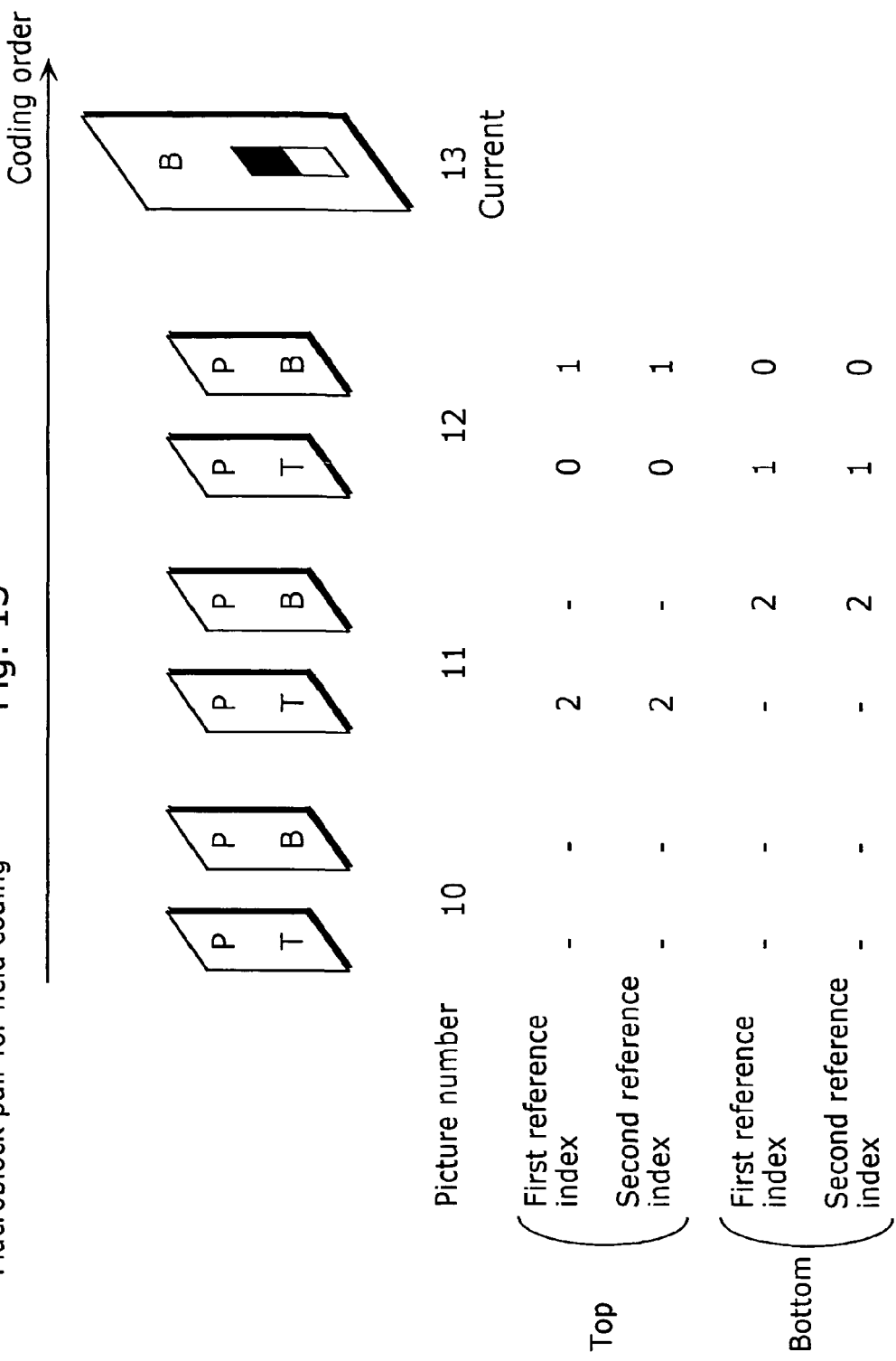

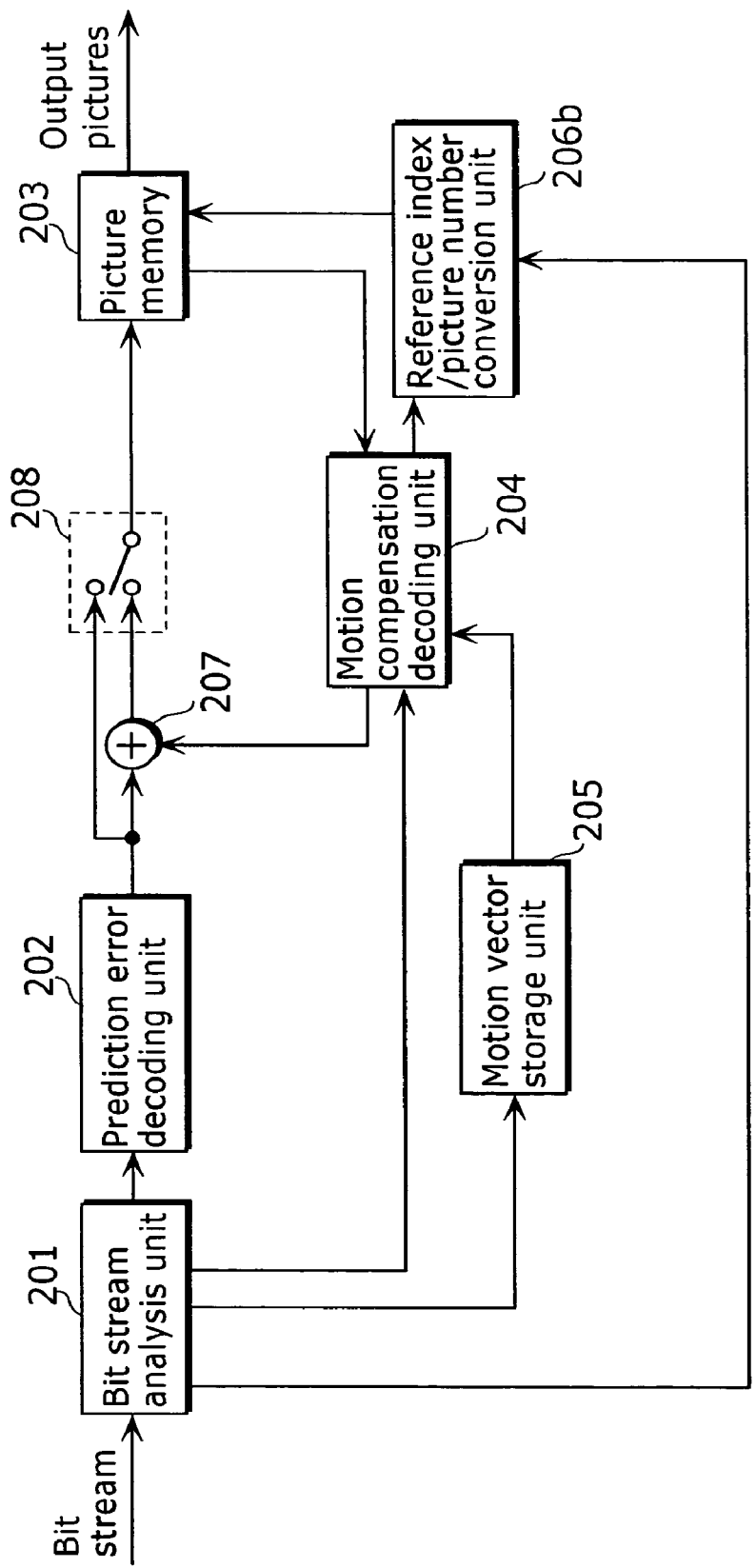
Fig. 14

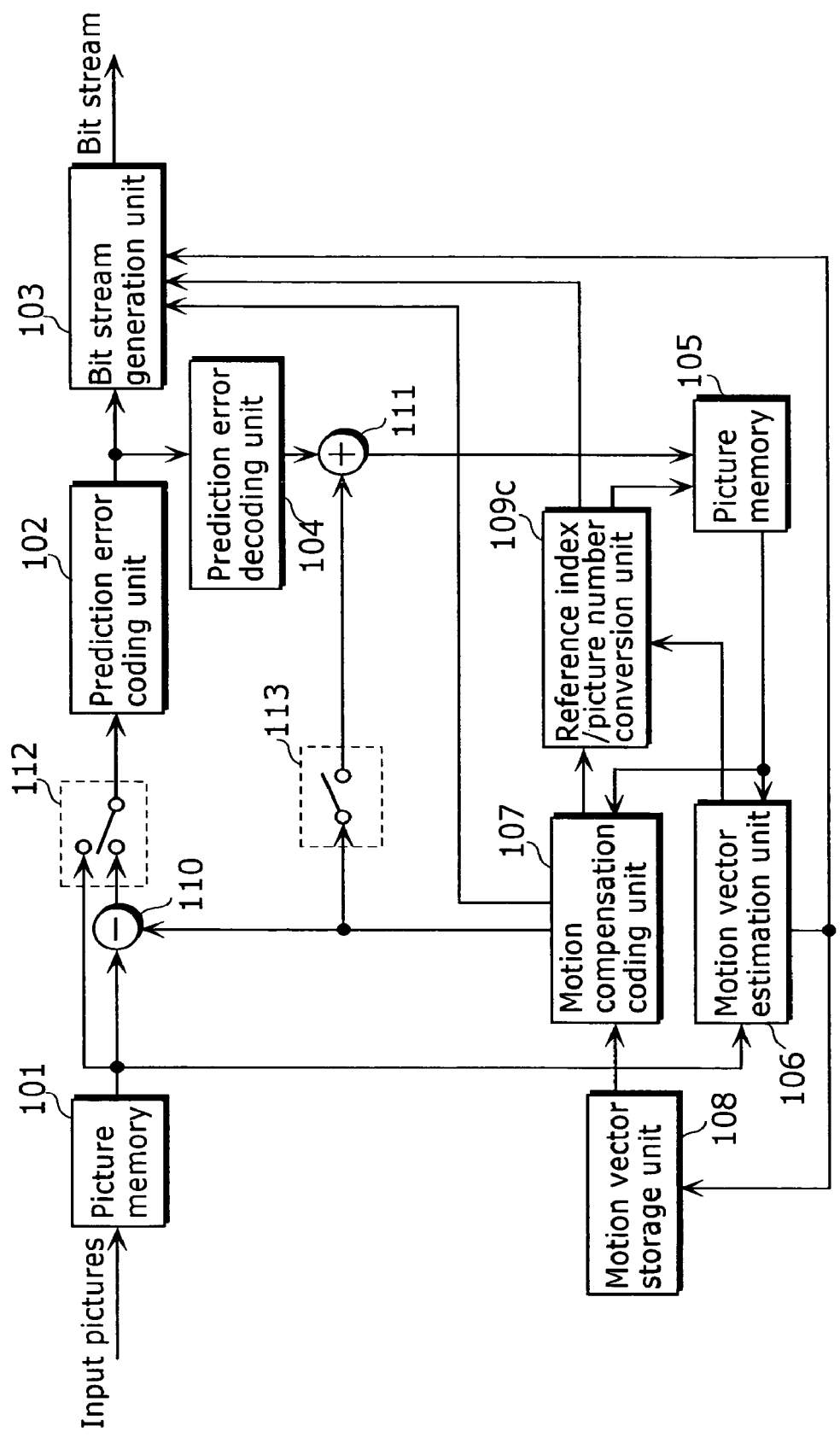
Fig. 15

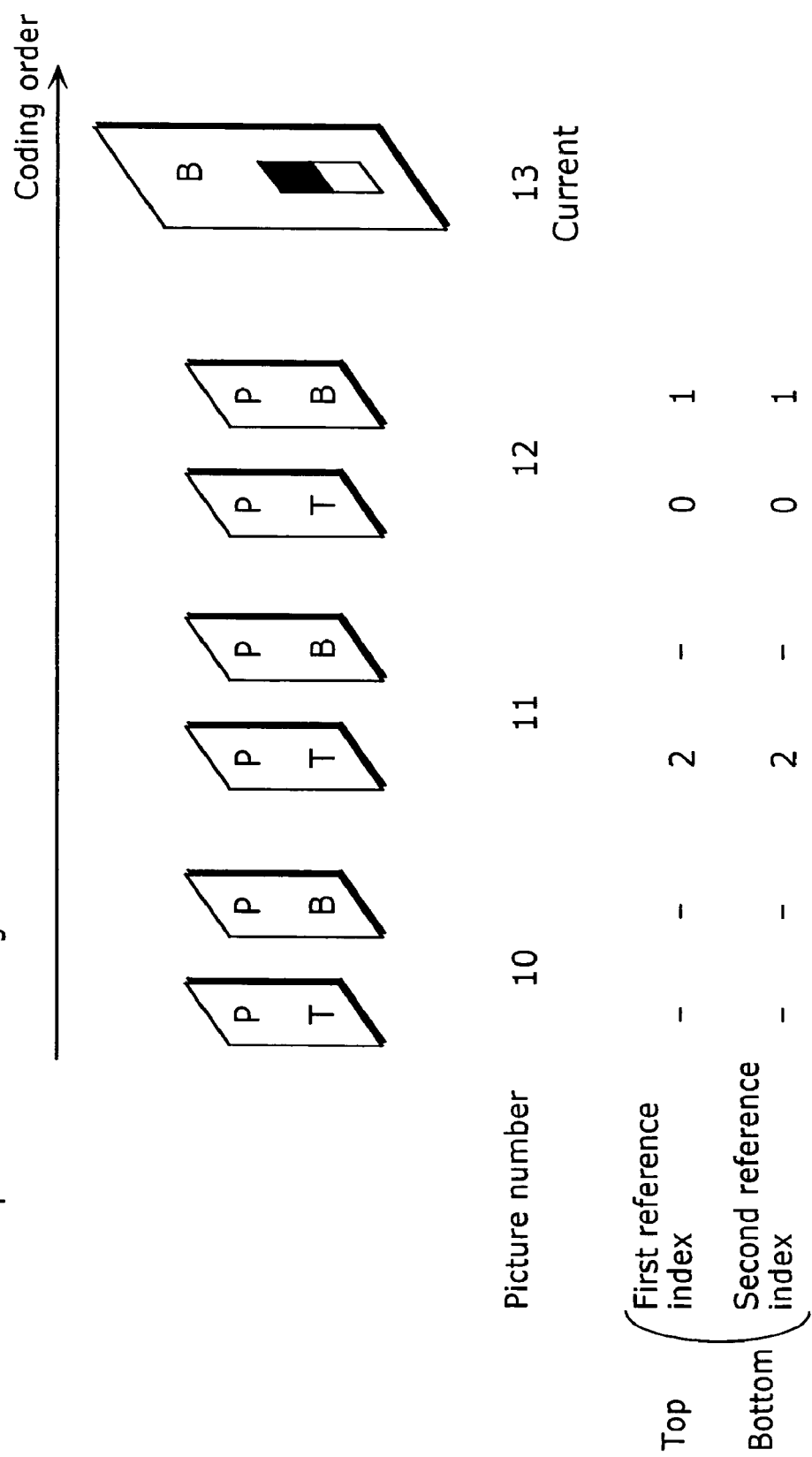

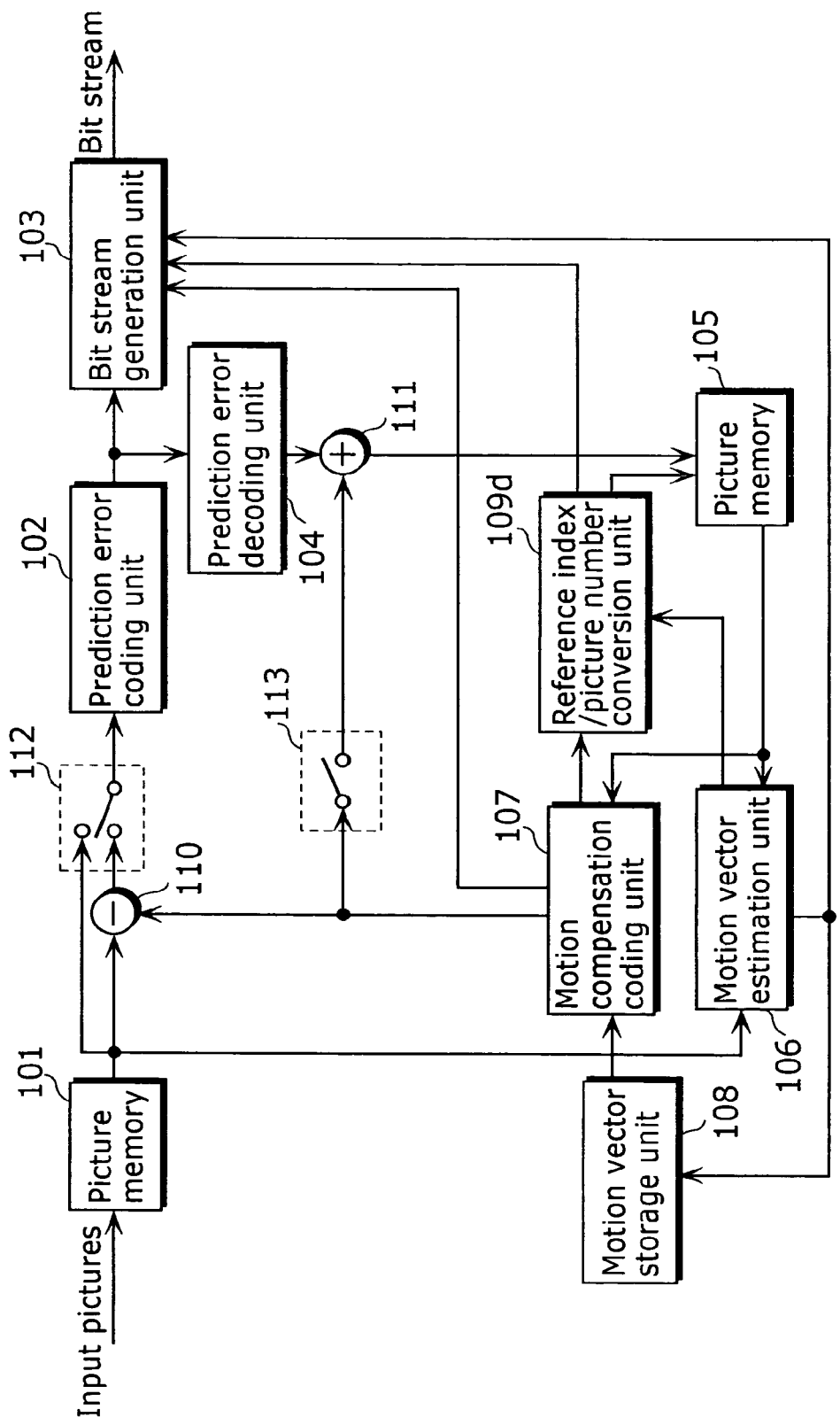
Fig. 17

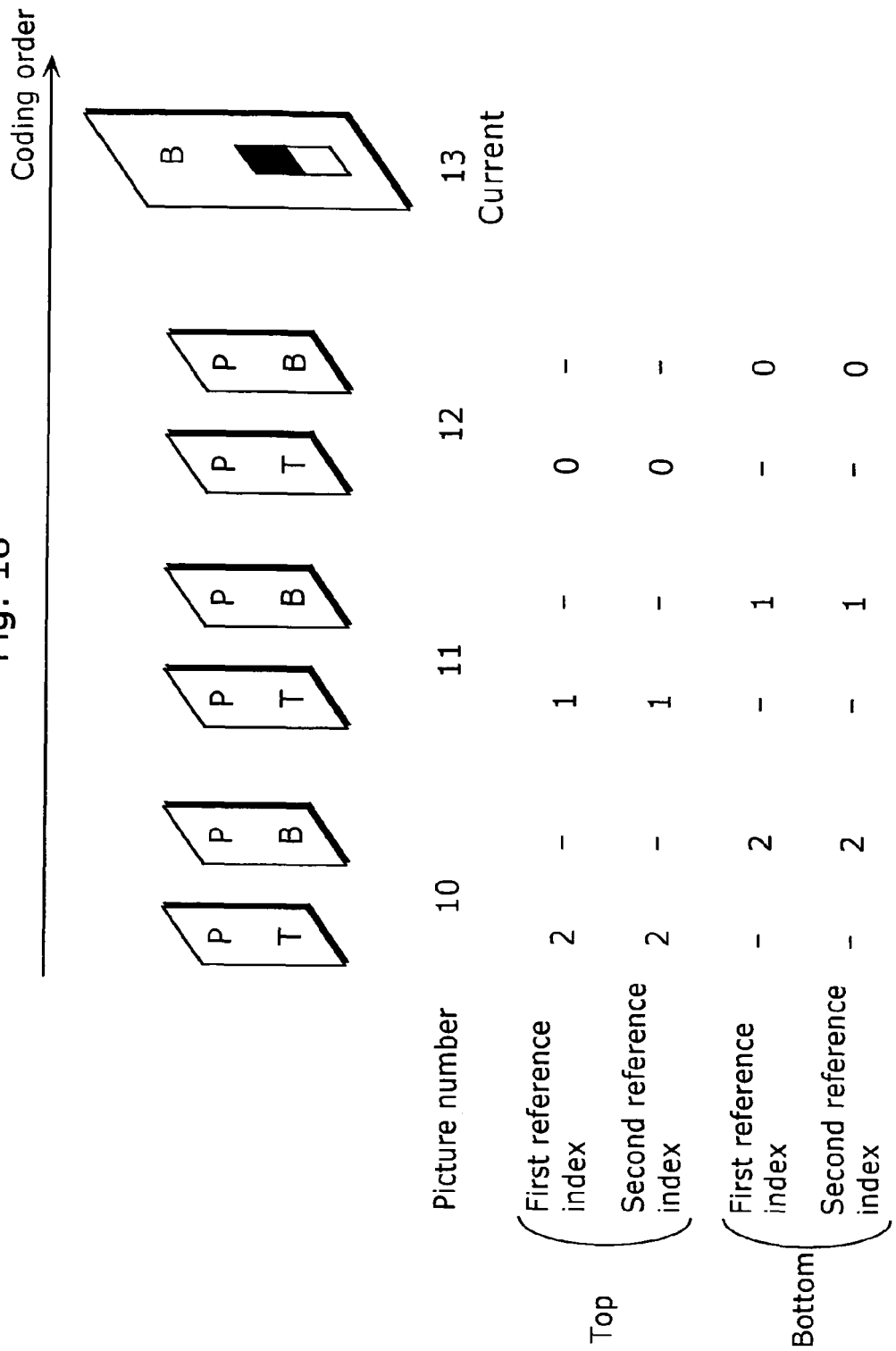

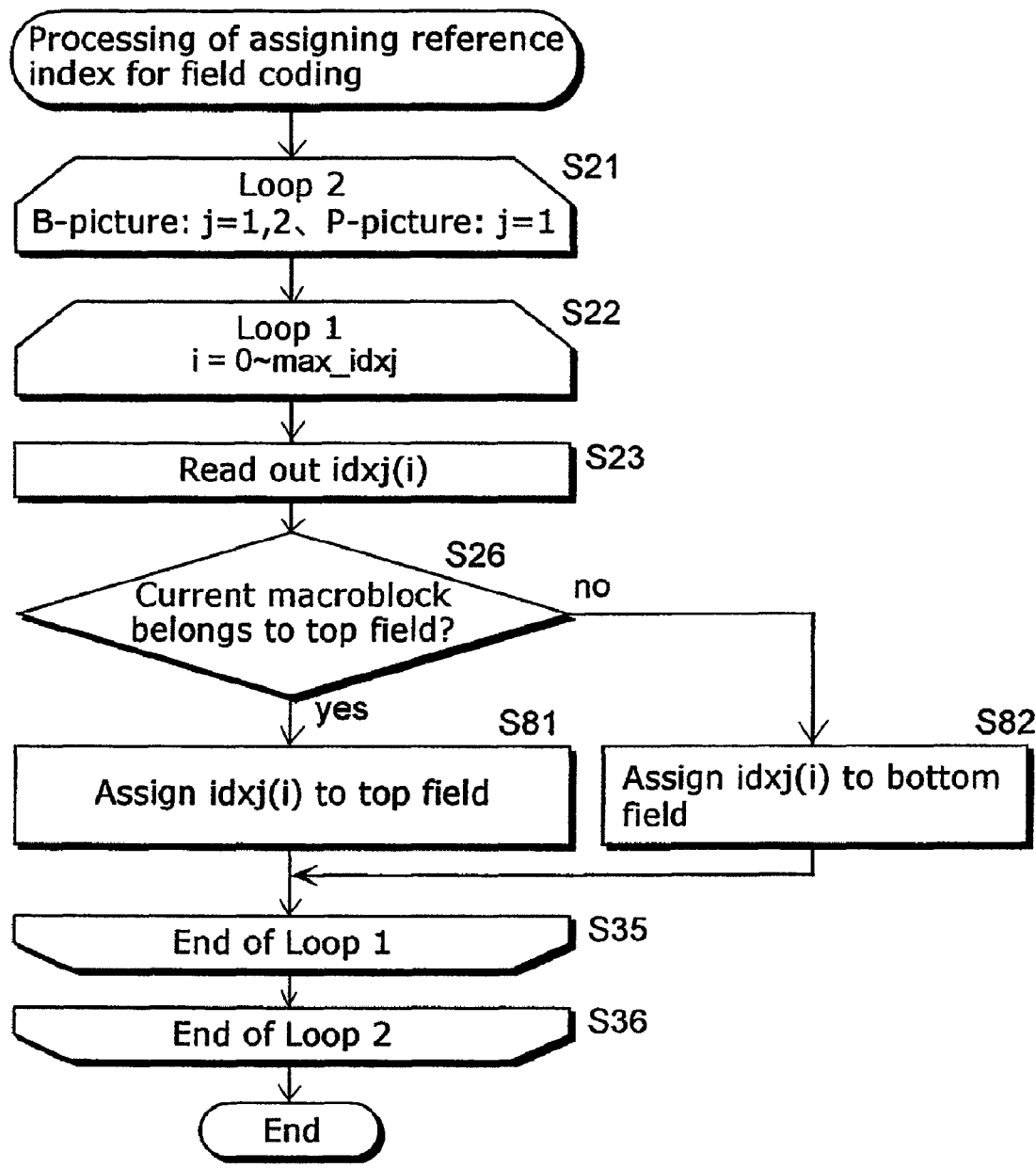
Fig. 19

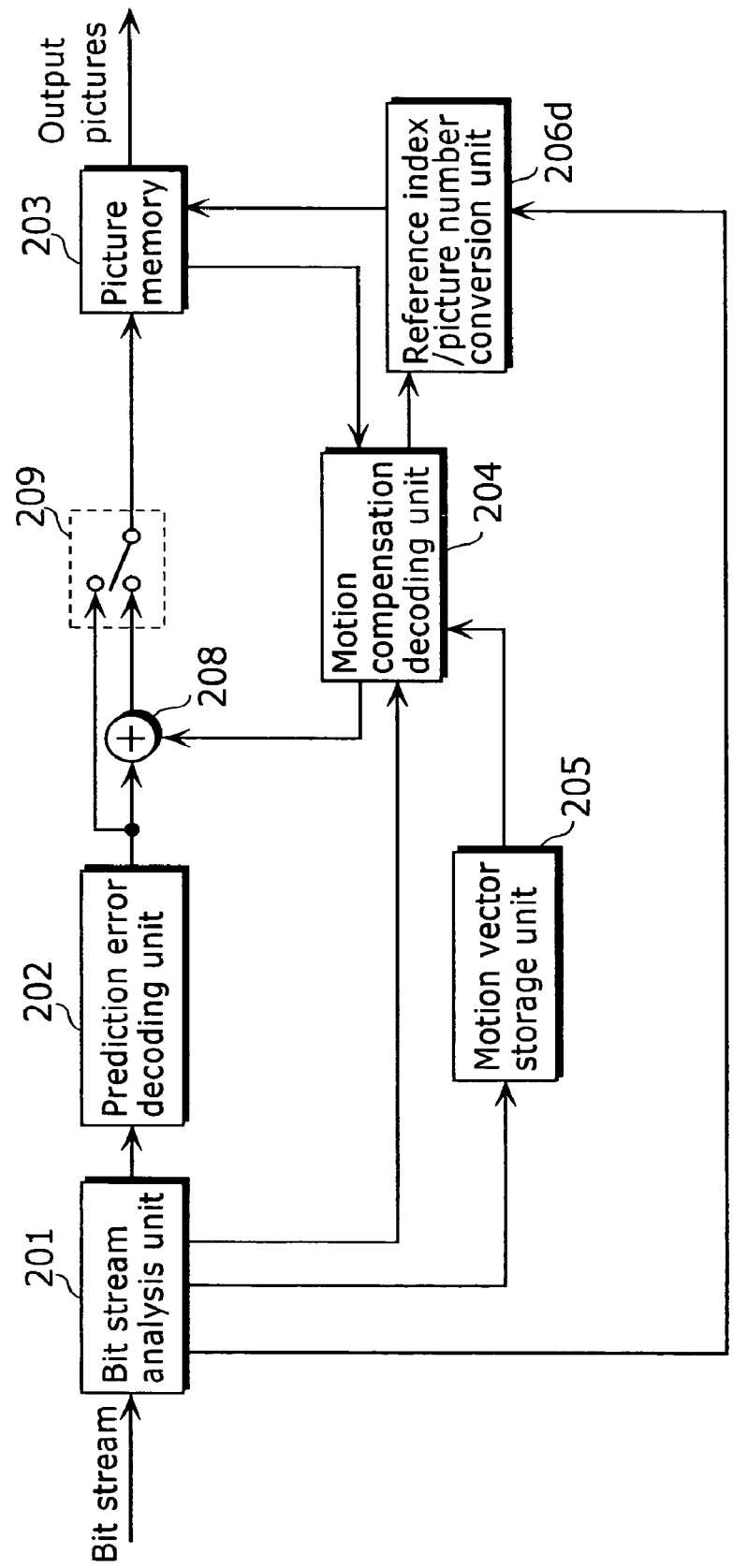

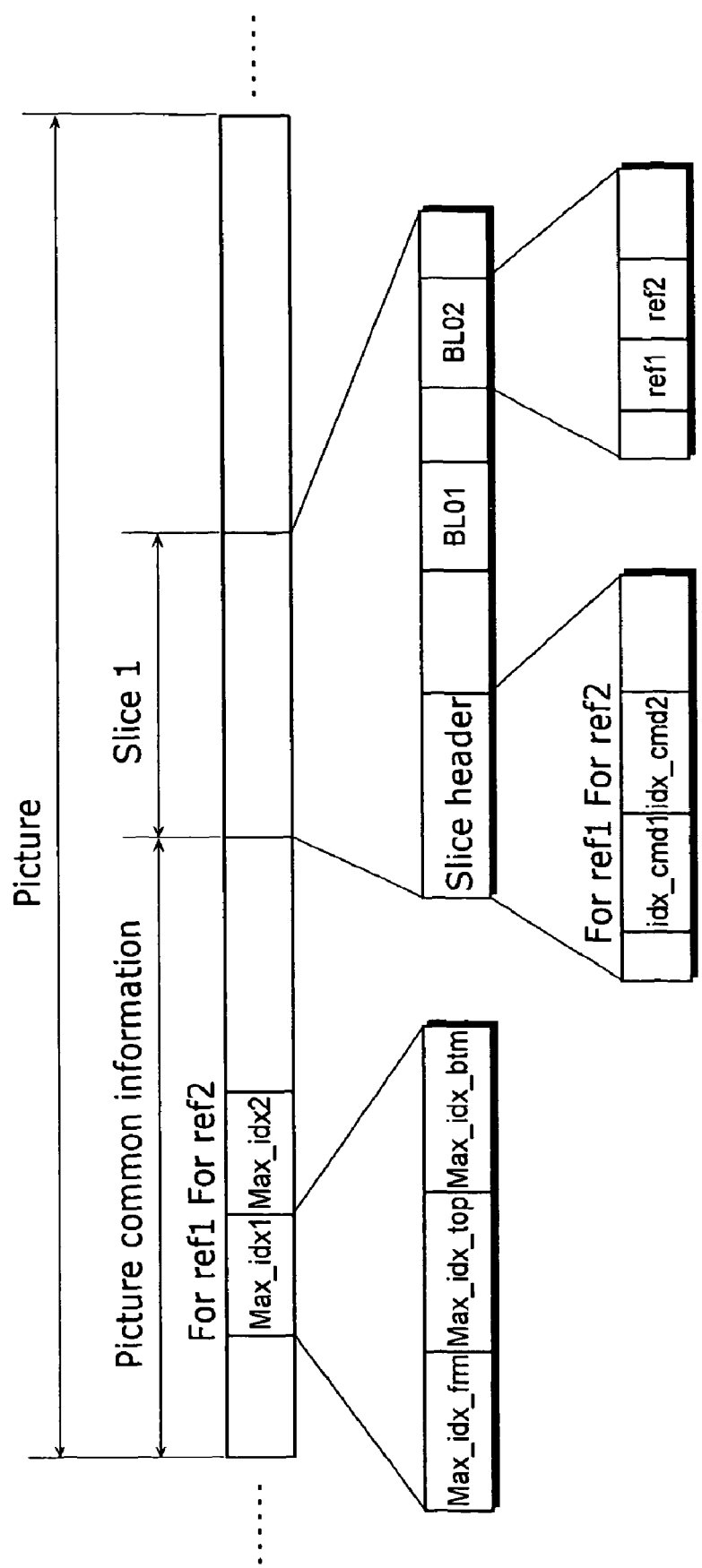
Fig. 21

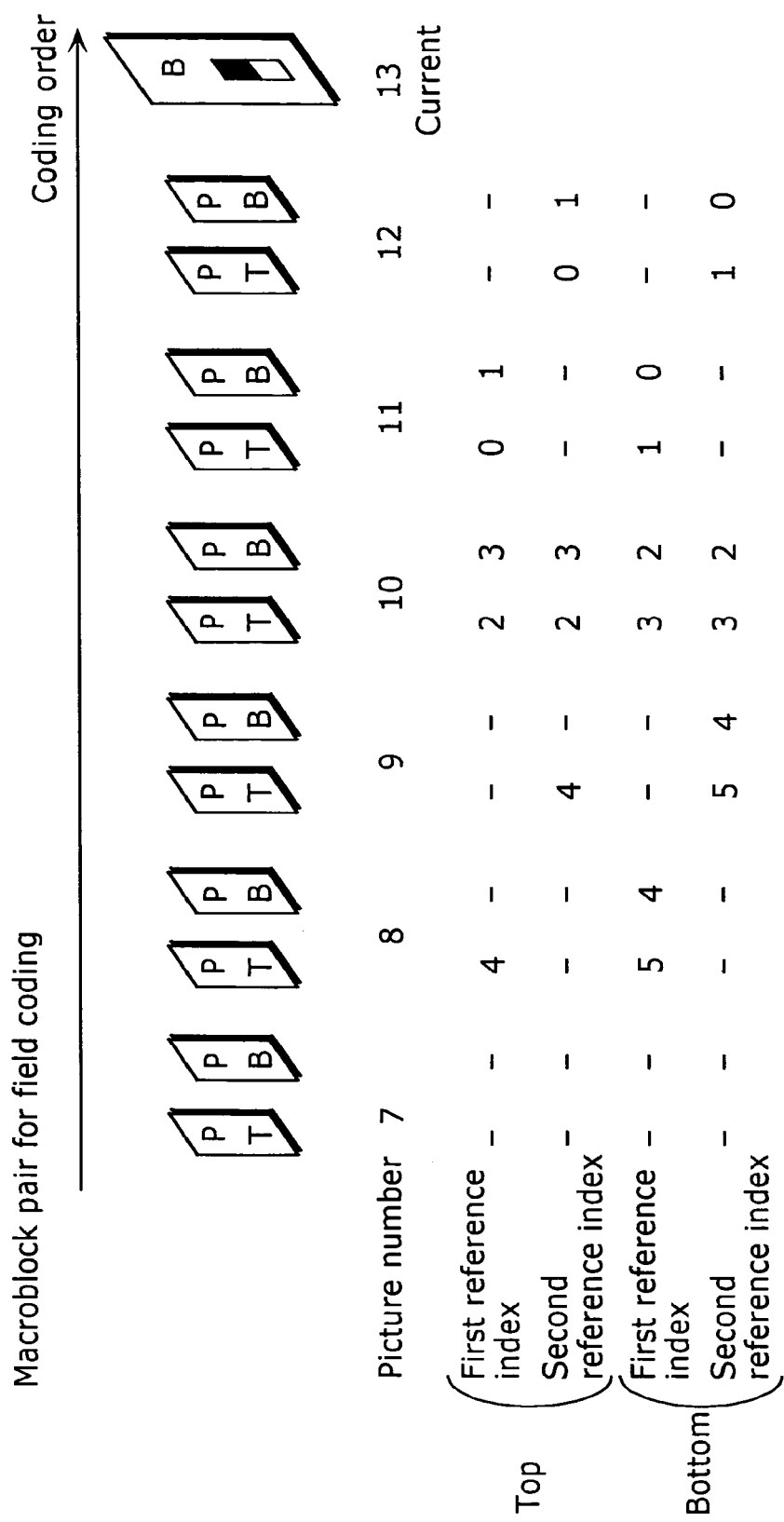

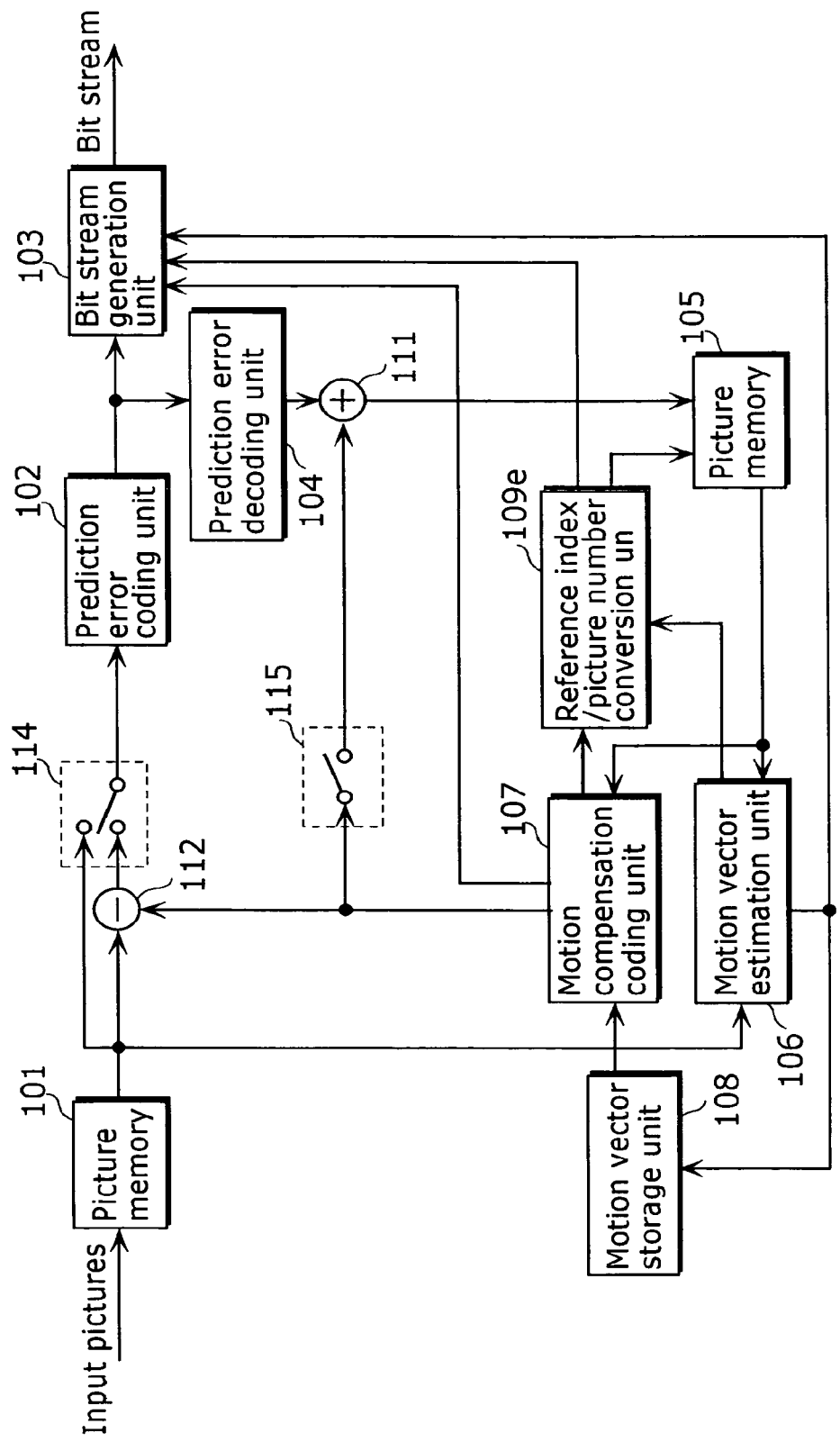
Fig. 23

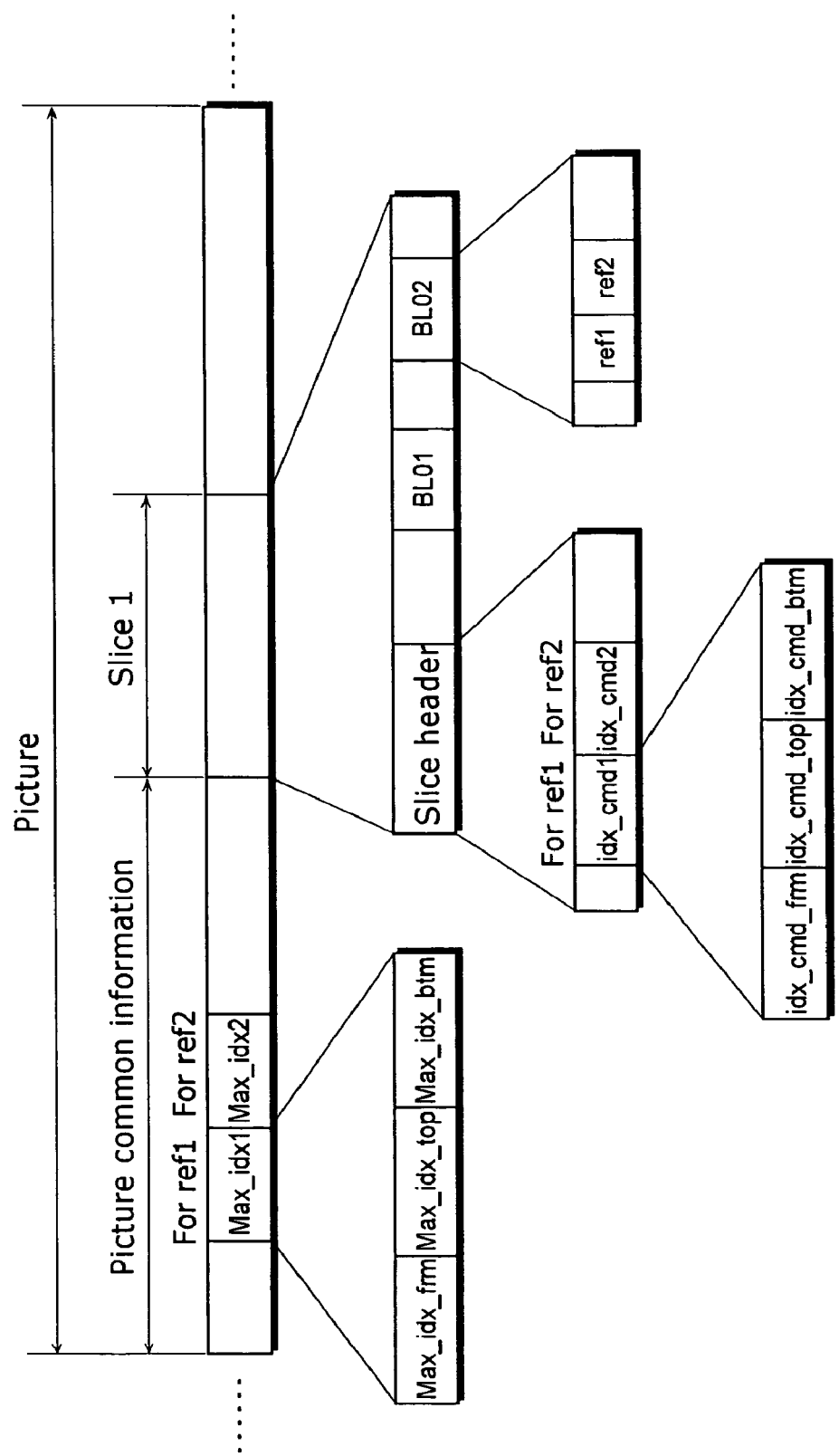
Fig. 24

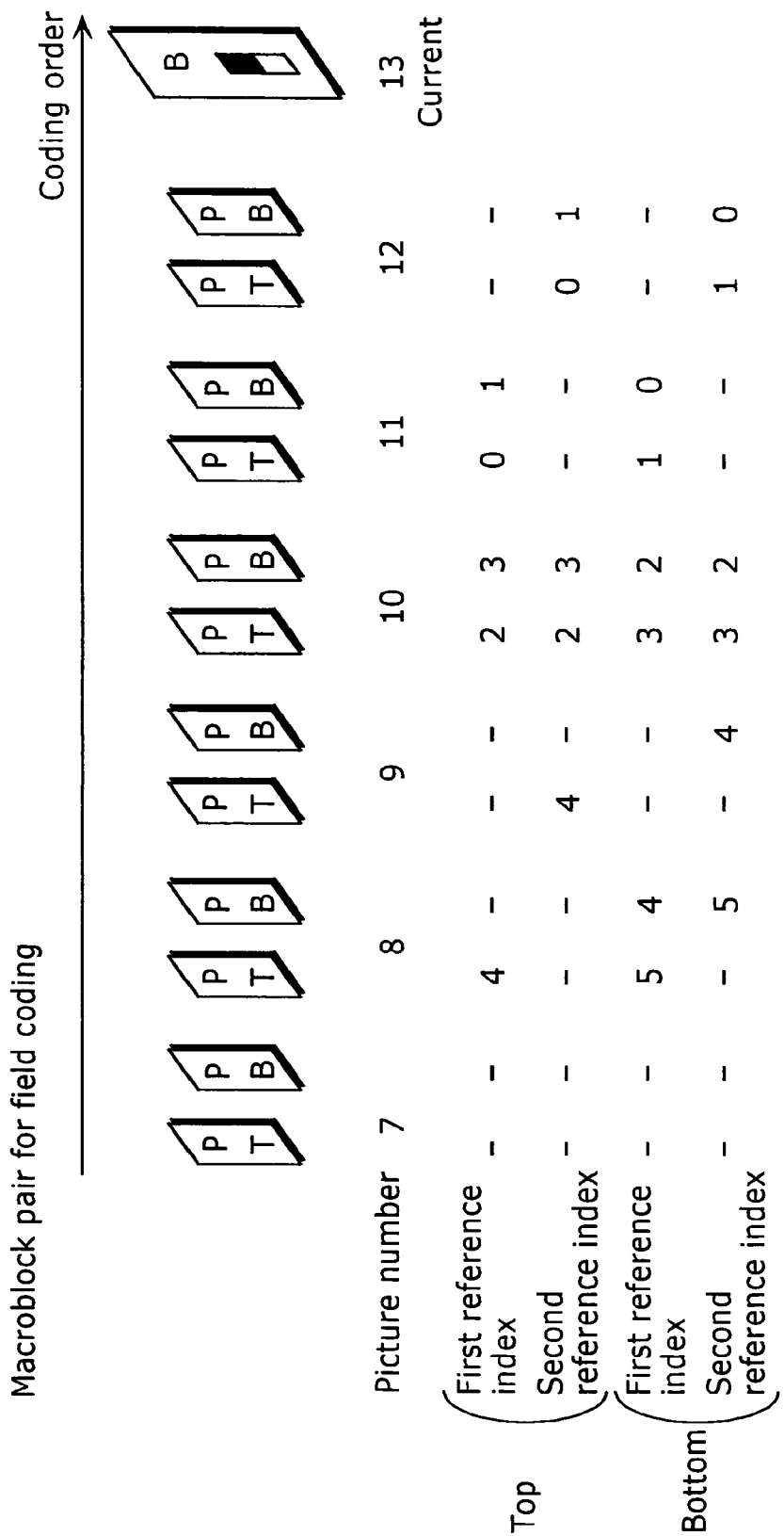
Fig. 25

Fig. 26

<First reference index for top field coding>

| Reference index | 0 | 1 | 2 | 3 | 4 | |
|---|---|---|---|---|---|---|
| Command | −2 | 0 | −1 | 0 | −2 | |
| Picture number | 11 | 11 | 10 | 10 | 8 | |

<Second reference index for top field coding>

| Reference index | 0 | 1 | 2 | 3 | 4 | |
|---|---|---|---|---|---|---|
| Command | −1 | 0 | −2 | 0 | −1 | |
| Picture number | 12 | 12 | 10 | 10 | 9 | |

<First reference index for bottom field coding>

| Reference index | 0 | 1 | 2 | 3 | 4 | 5 | |
|---|---|---|---|---|---|---|---|
| Command | −2 | 0 | −1 | 0 | −2 | 0 | |
| Picture number | 11 | 11 | 10 | 10 | 8 | 8 | |

<Second reference index for bottom field coding>

| Reference index | 0 | 1 | 2 | 3 | 4 | 5 | |
|---|---|---|---|---|---|---|---|
| Command | −1 | 0 | −2 | 0 | −1 | −1 | |
| Picture number | 12 | 12 | 10 | 10 | 9 | 8 | |

Fig. 27
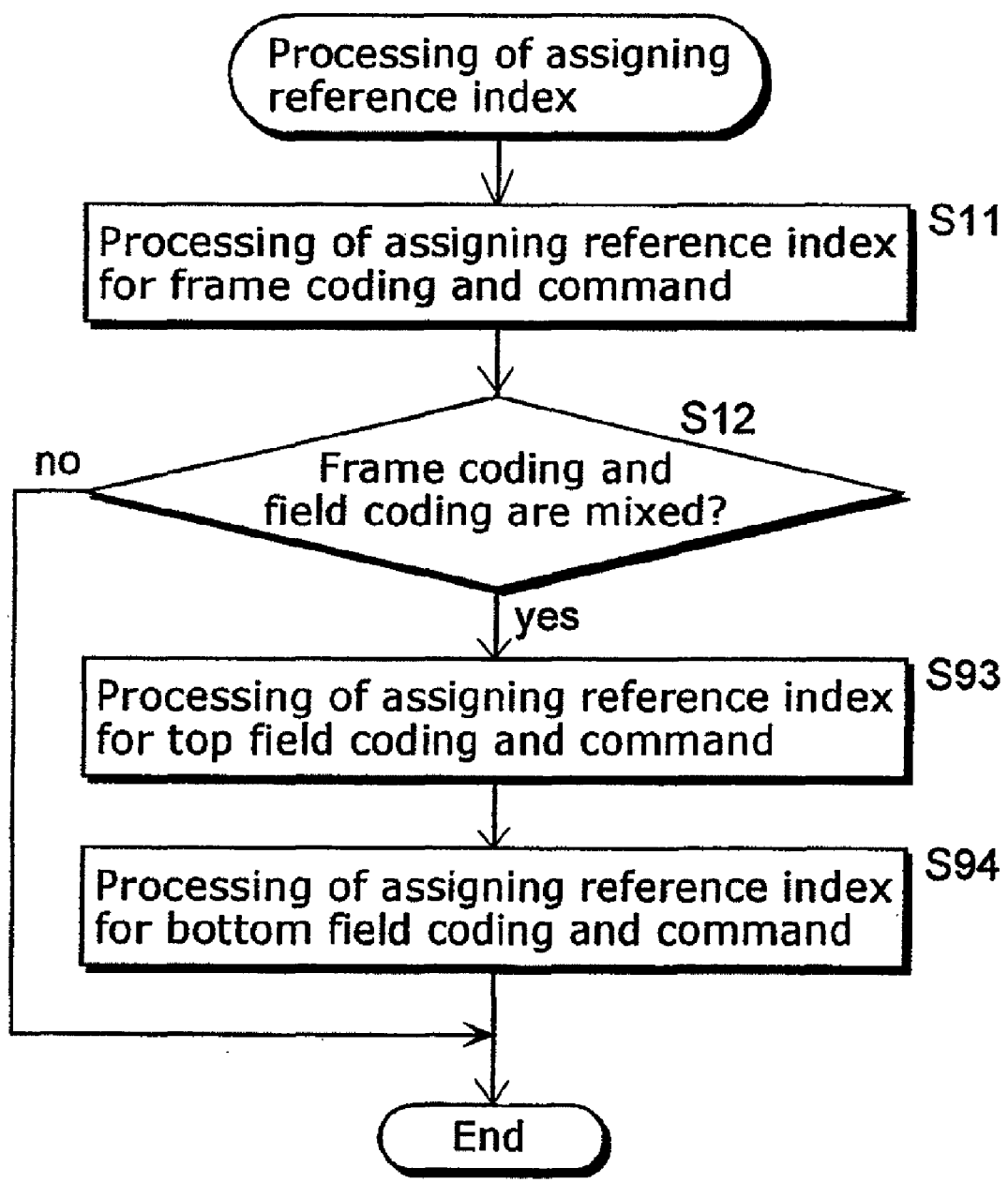

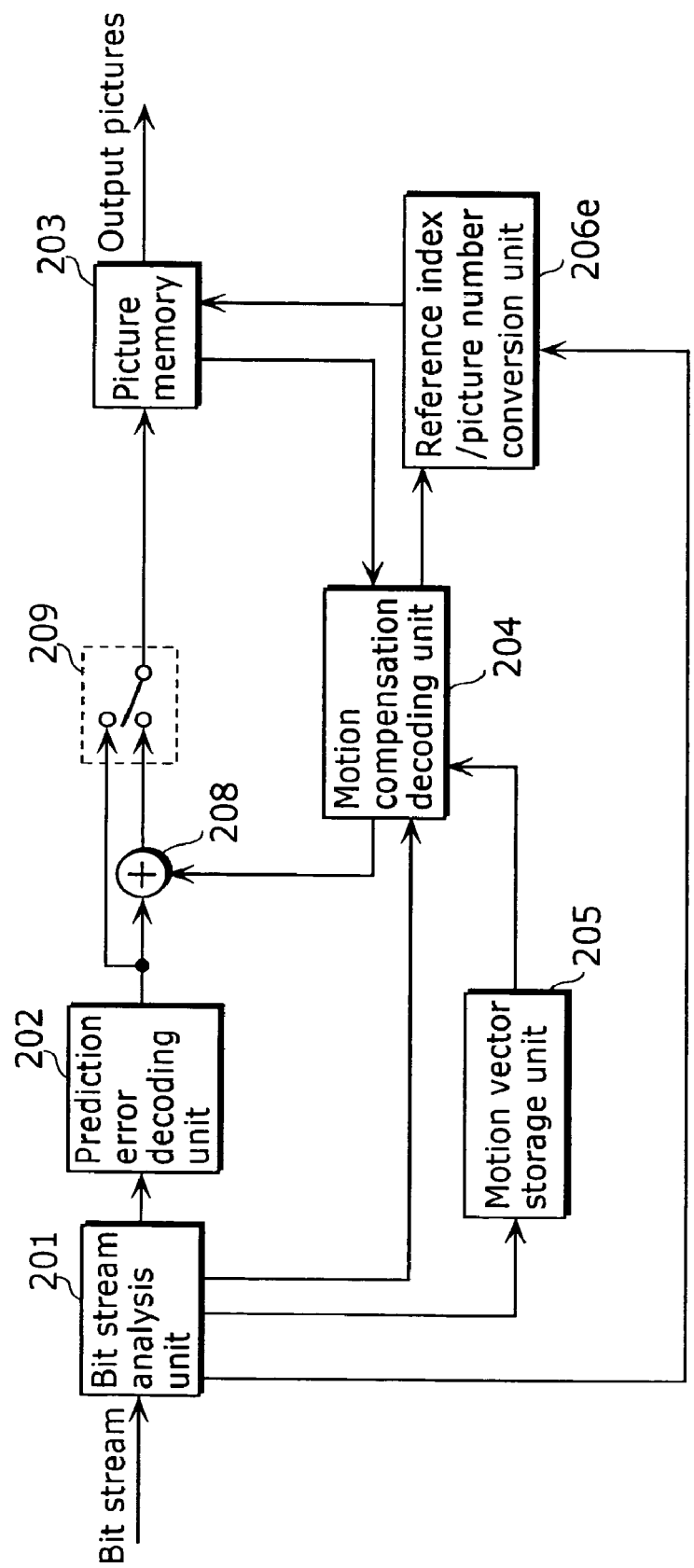
Fig. 28

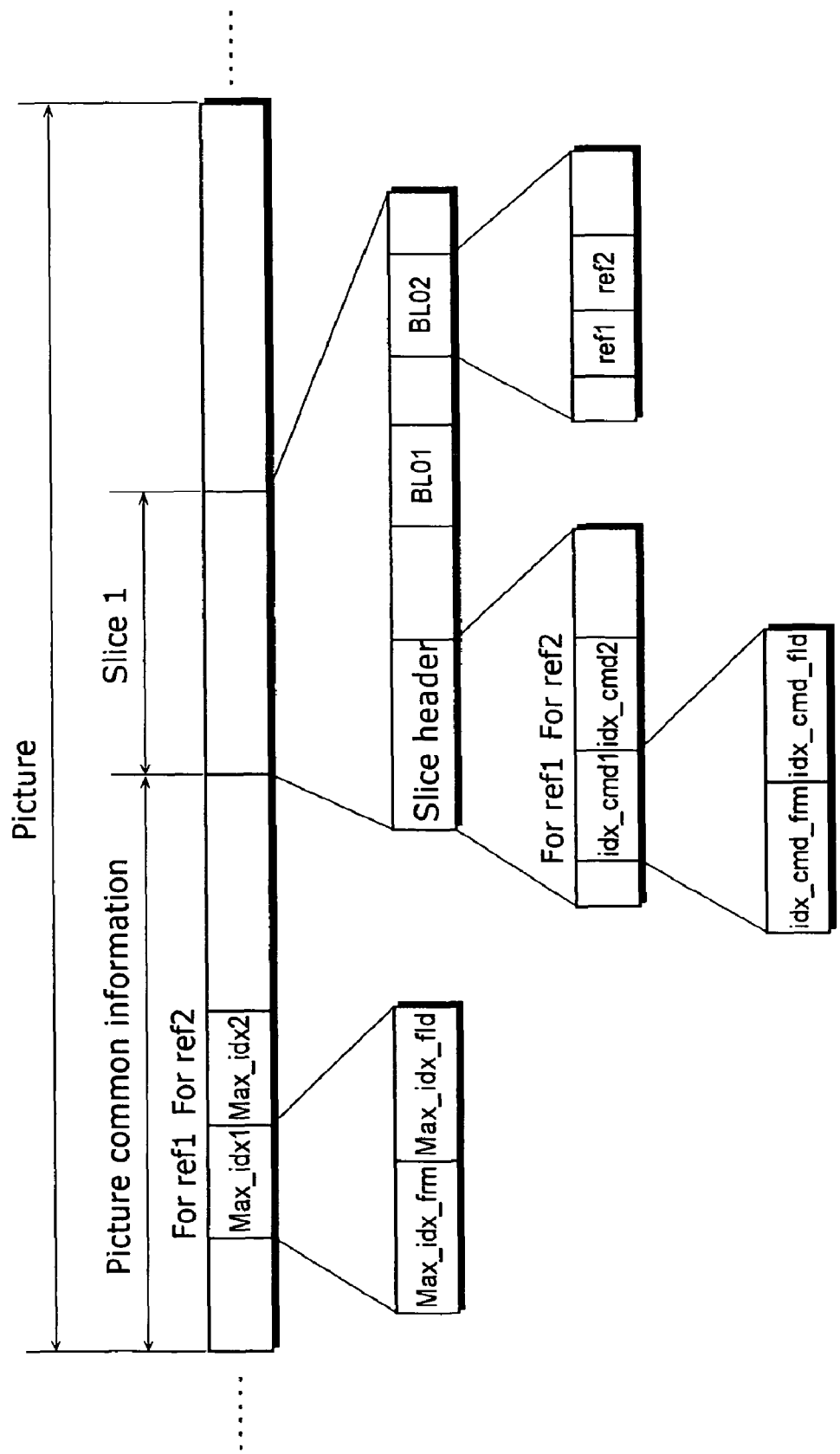
Fig. 29

Fig. 30A
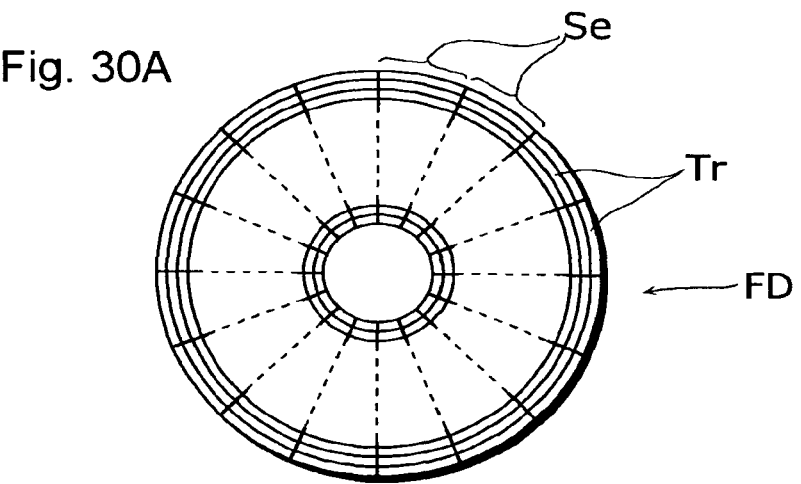
Fig. 30B
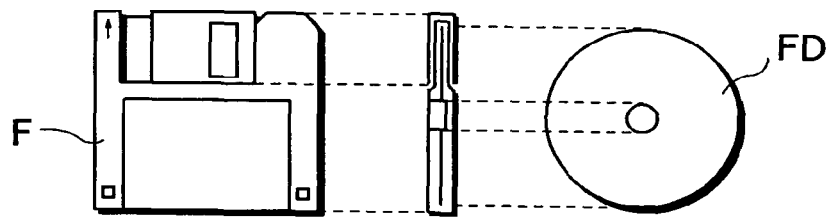
Fig. 30C
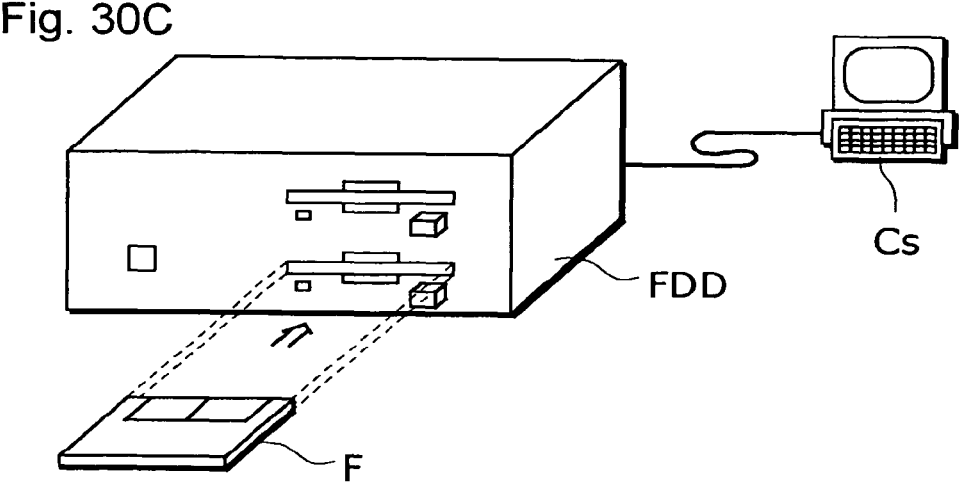

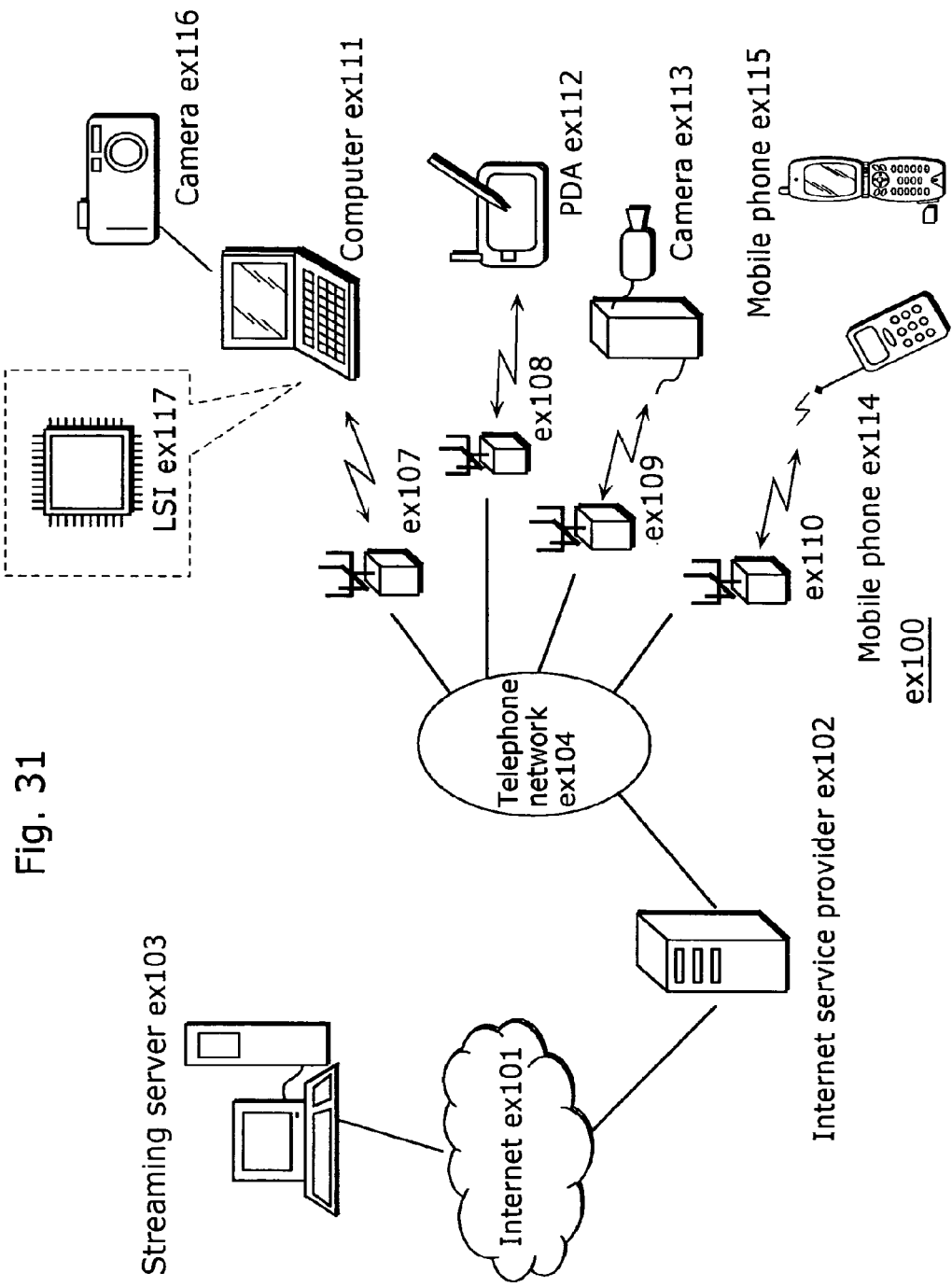
Fig. 31

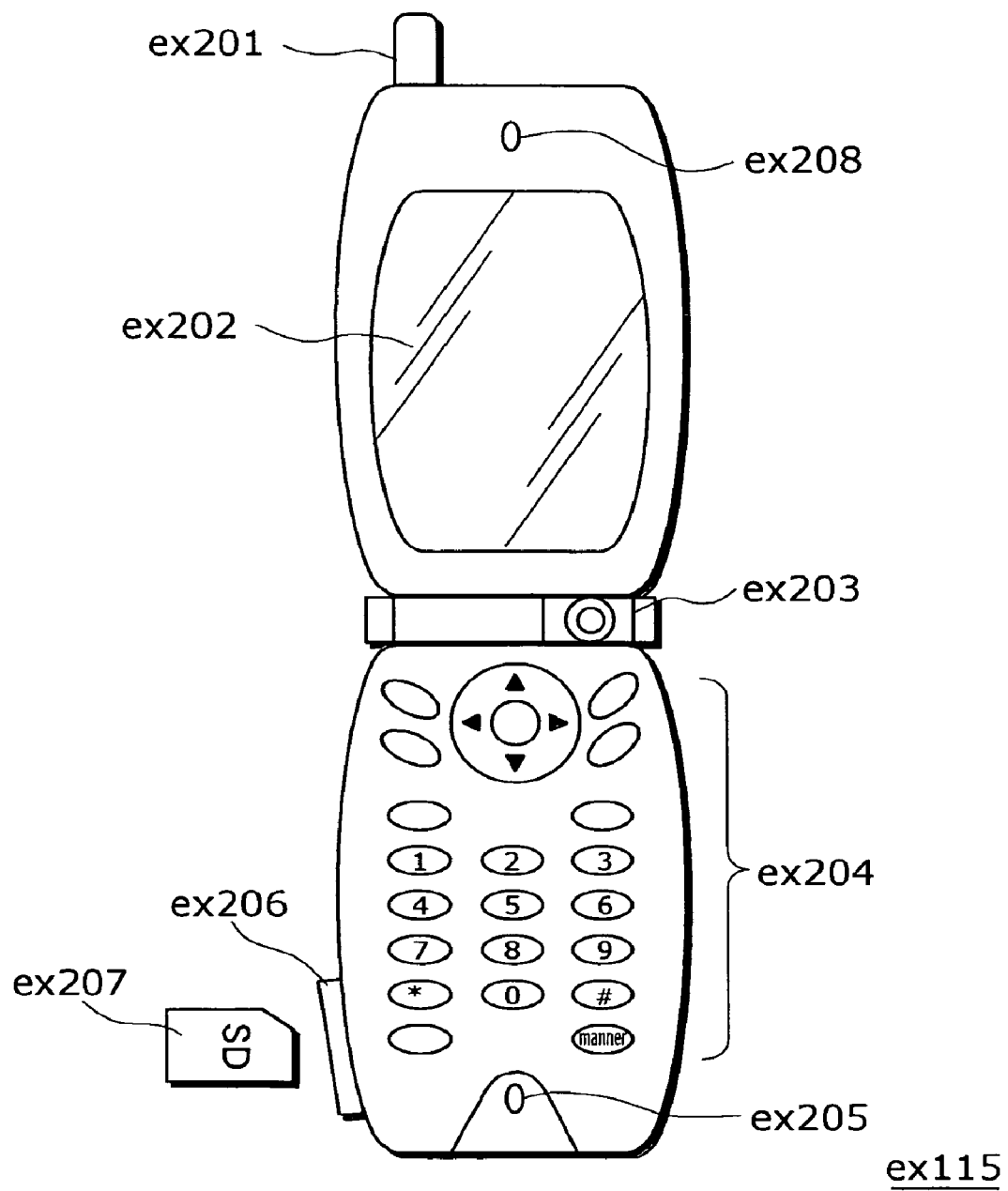
Fig. 32

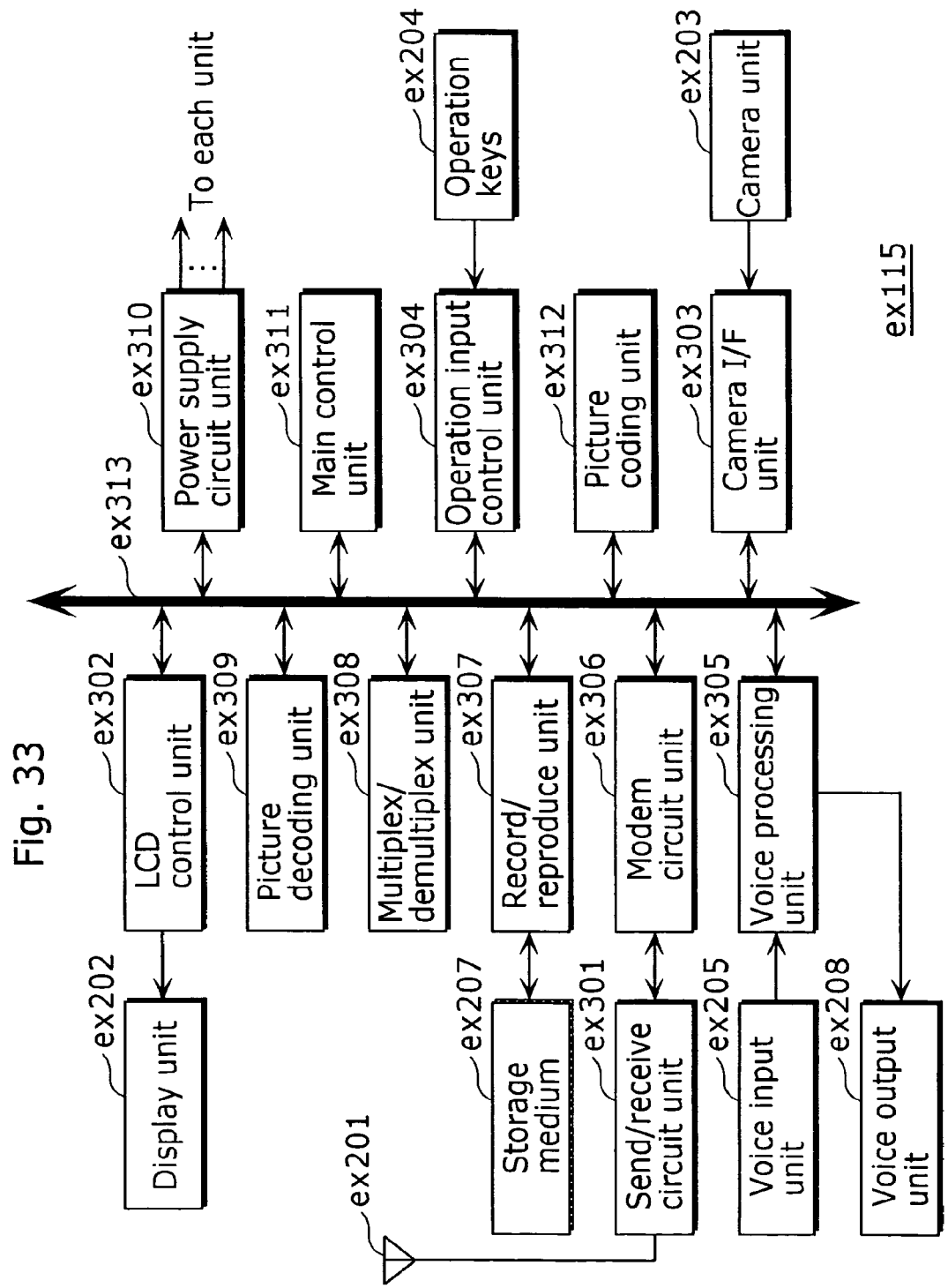
Fig. 33

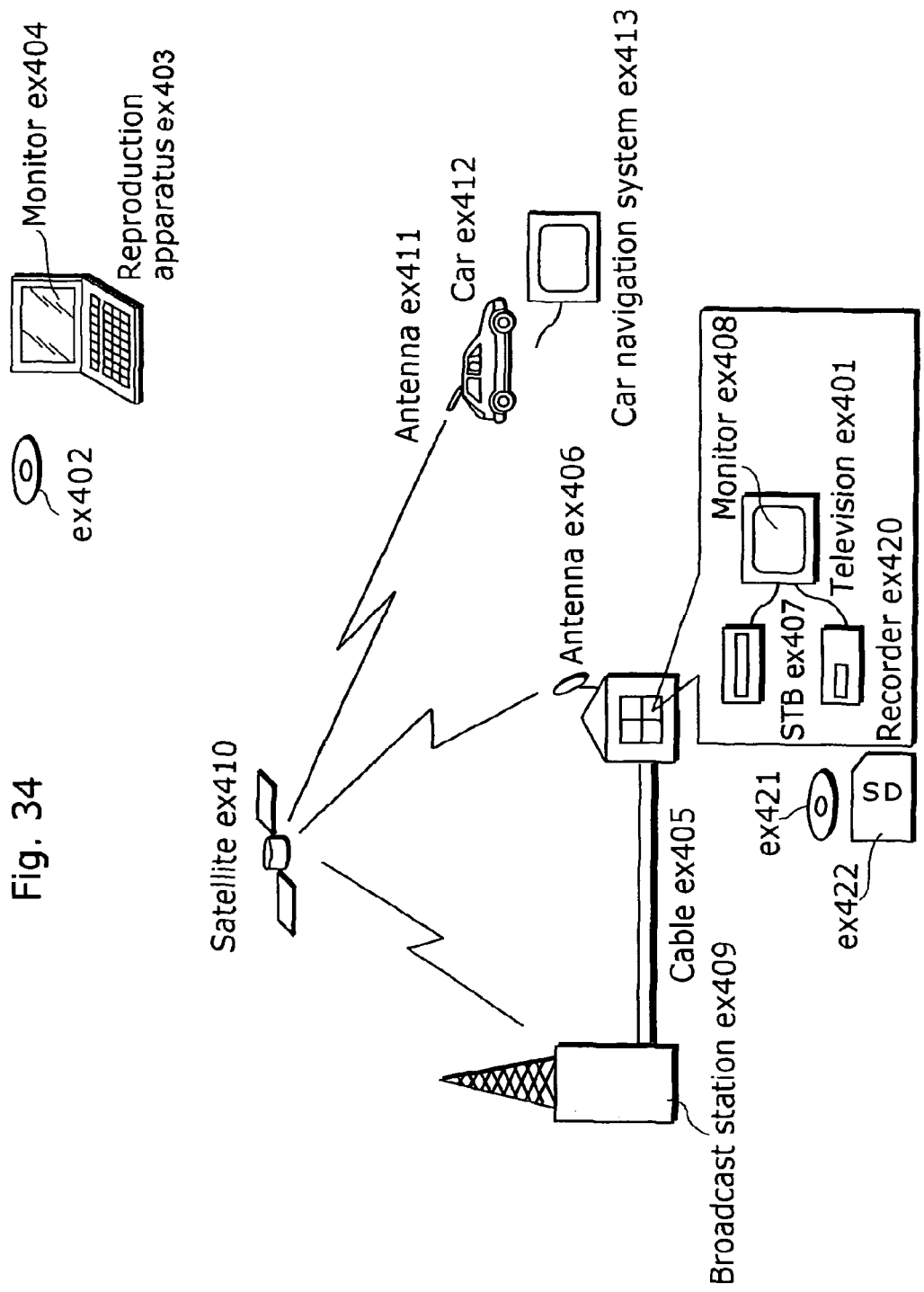
Fig. 34

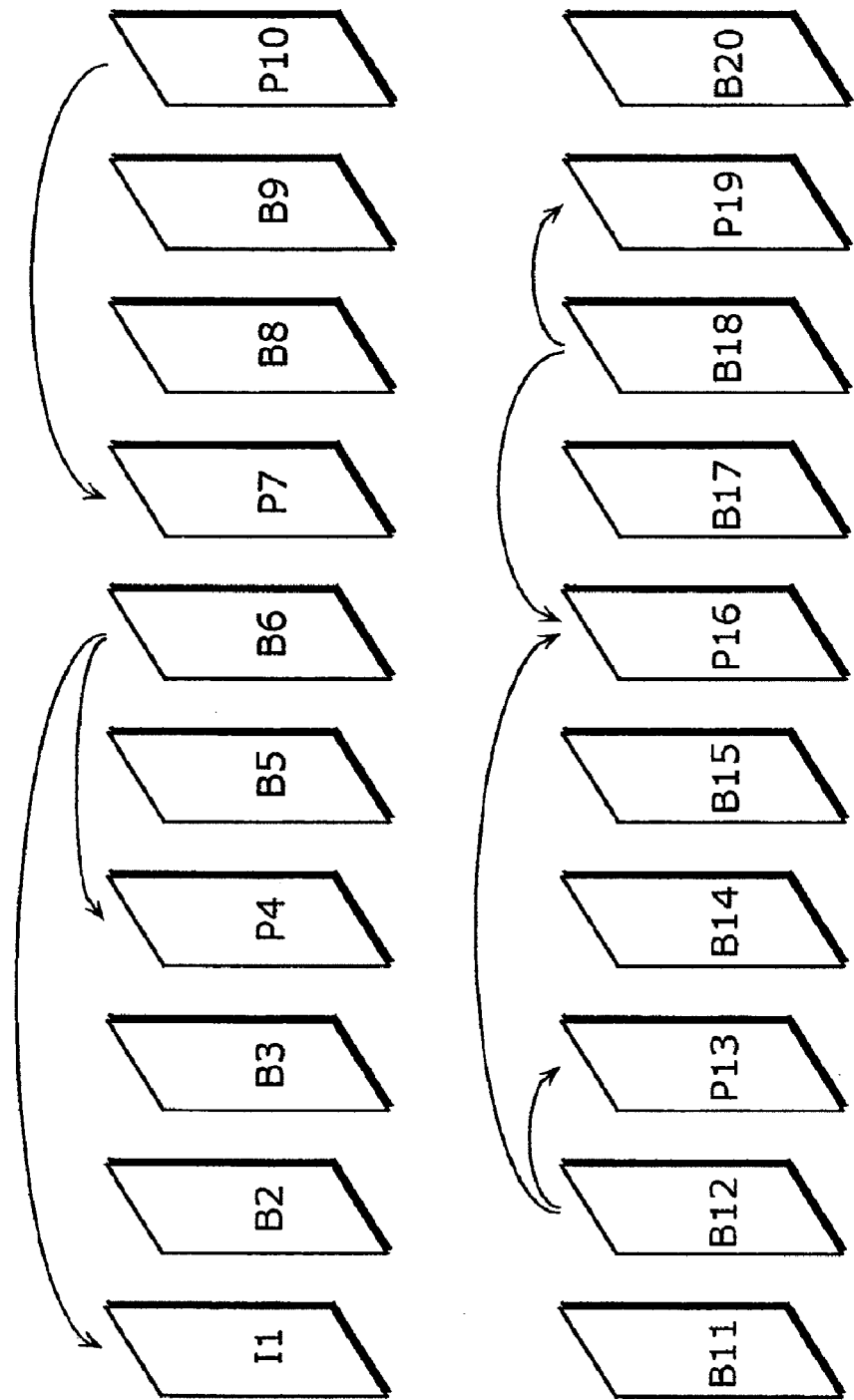
Fig. 35  PRIOR ART

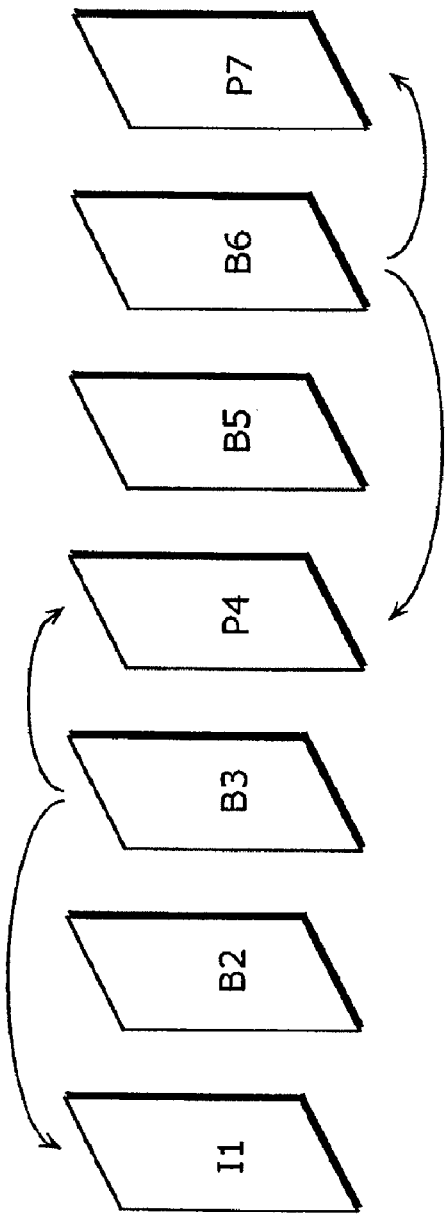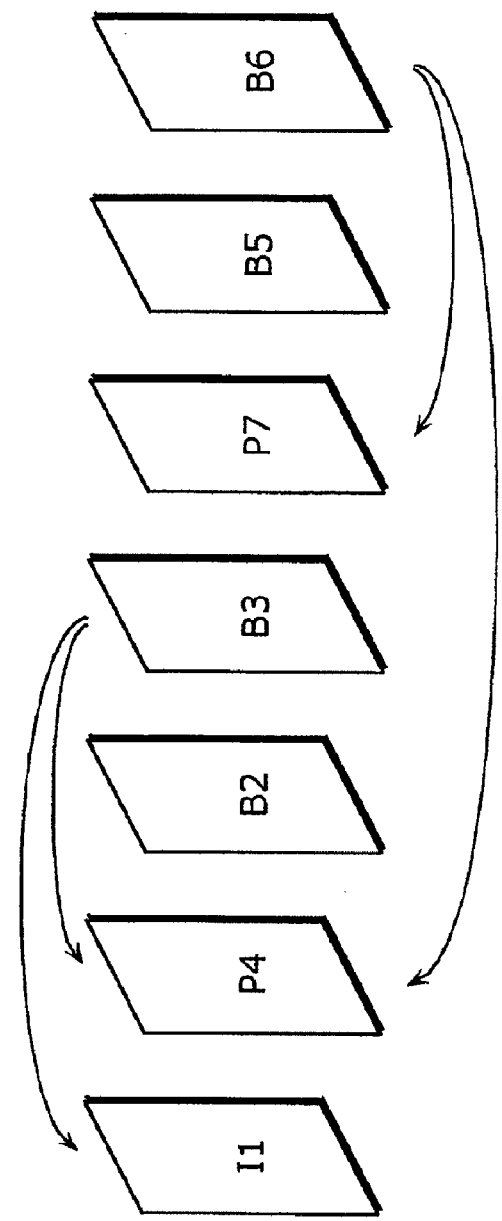
PRIOR ART
Fig. 36A
PRIOR ART
Fig. 36B

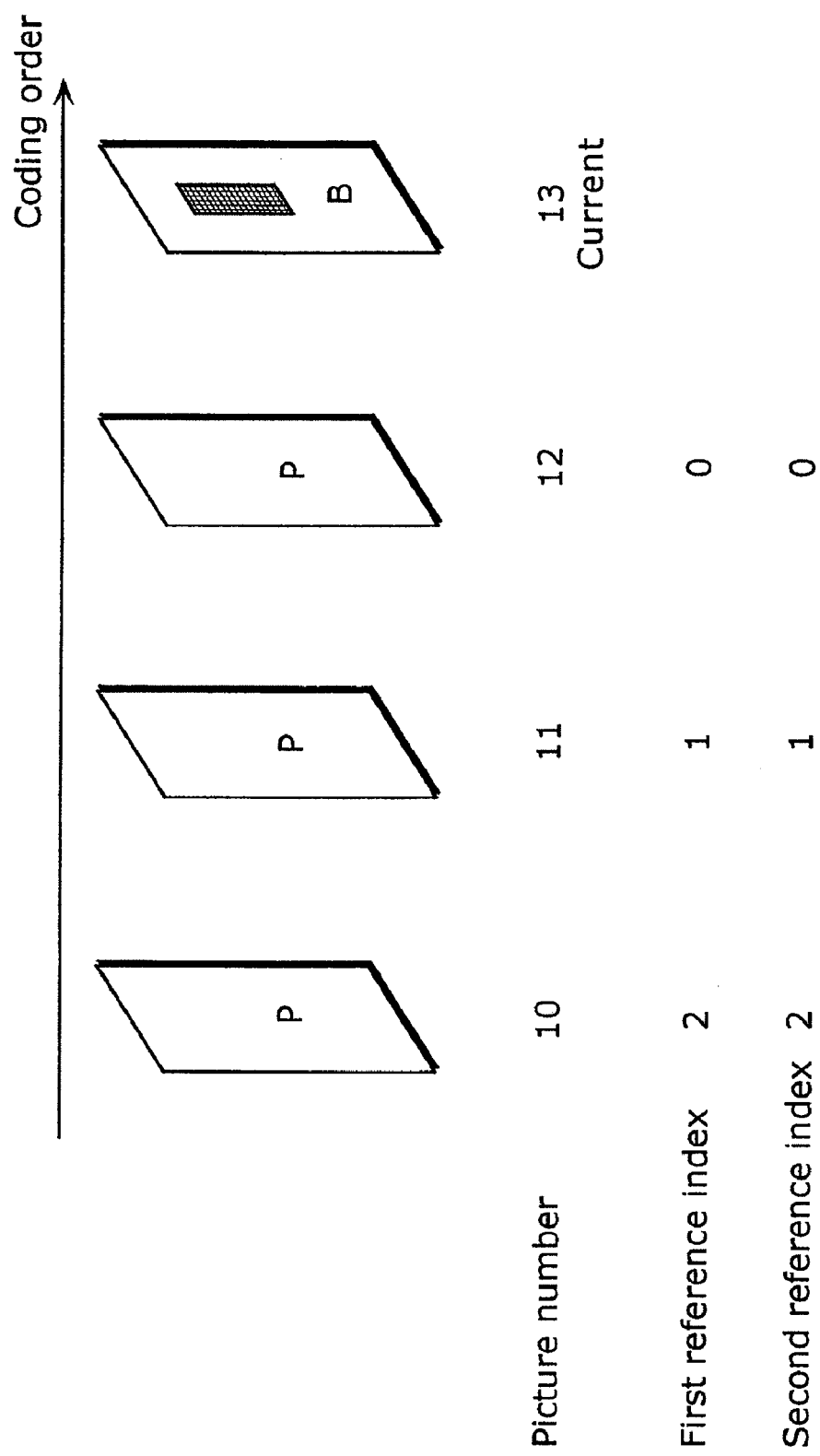

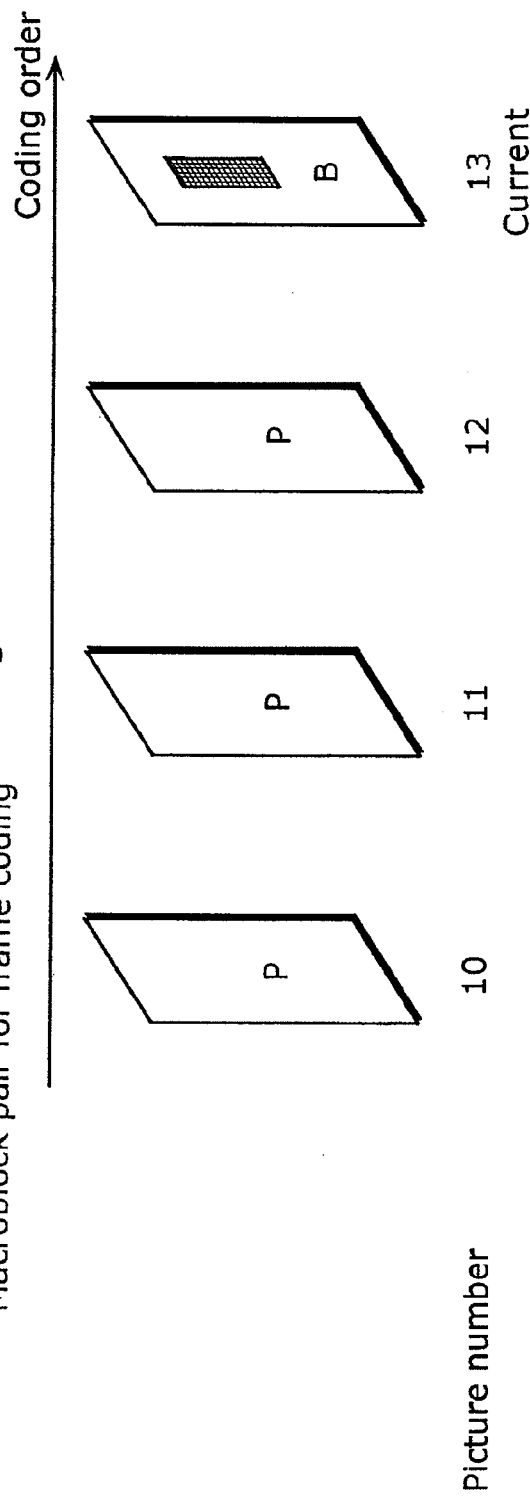
Fig. 38 PRIOR ART

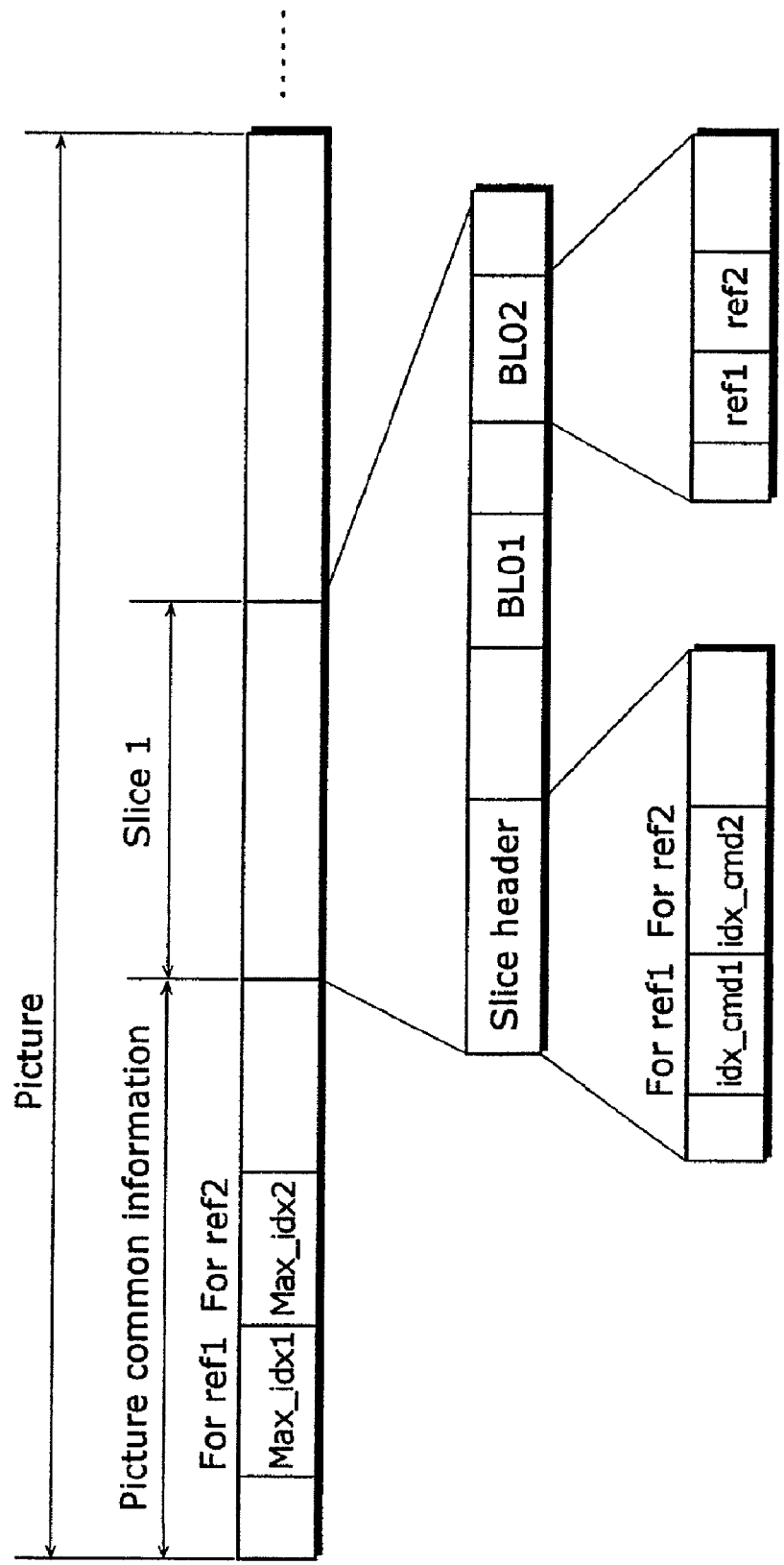
PRIOR ART
Fig. 39

PRIOR ART
Fig. 40
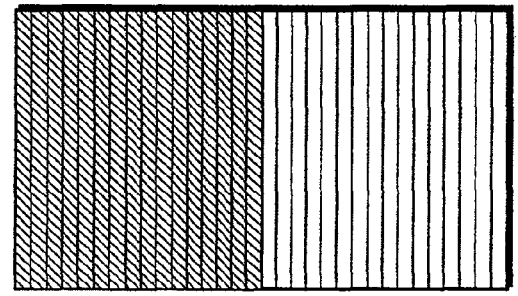
Macroblock pair for field coding
Odd-numbered line
Even-numbered line
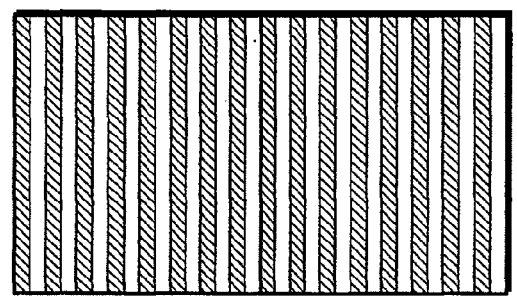
Macroblock pair for frame coding
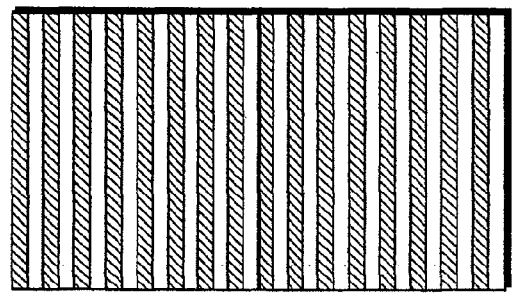
Original macroblock pair

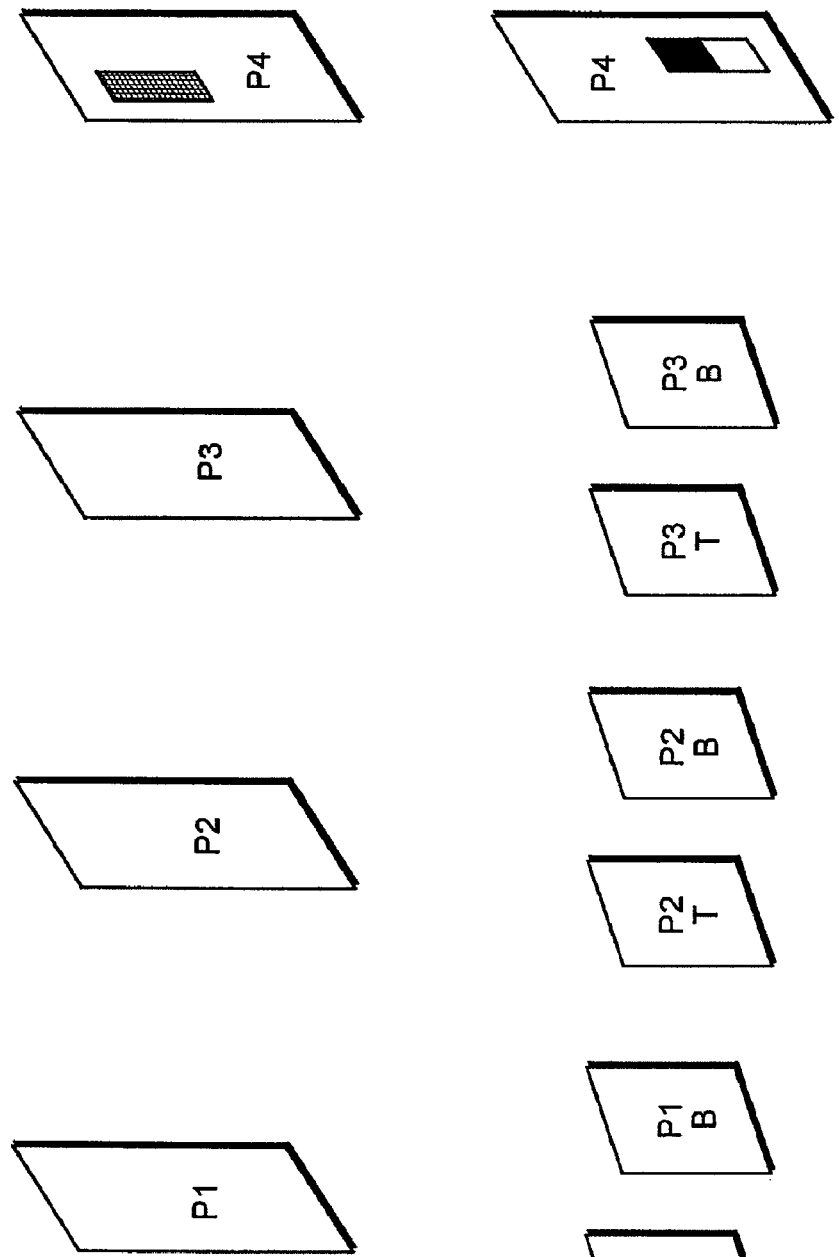
PRIOR ART
Fig. 41A
PRIOR ART
Fig. 41B

FIELD/FRAME ADAPTIVE CODING AND DECODING METHOD WITH FIELD/FRAME INDEX AND APPARATUS FOR PERFORMING THE SAME

This is a divisional of application Ser. No. 10/501,001, filed Jul. 8, 2004, now U.S. Pat. No. 7,881,375 from which continuation application Ser. No. 11/980,618 has been filed on Oct. 31, 2007, is a national stage application of International Application No. PCT/JP03/13679, filed Oct. 27, 2003.

TECHNICAL FIELD

The present invention relates to a moving picture coding method and a moving picture decoding method, and particularly to a coding method and a decoding method for performing inter-picture prediction with reference to previously coded pictures.

BACKGROUND ART

With development of multimedia applications, it has been popular to handle integrally all kinds of media information such as video, audio and text. Since digitized images have an enormous amount of data, image information compression techniques are absolutely essential for storage and transmission of such information. It is also important to standardize such compression techniques for interoperation of compressed image data. There exist international standards for image compression techniques, such as H.261 and H.263 standardized by ITU-T (International Telecommunication Union—Telecommunication Standardization Sector) and MPEG-1, MPEG-2 and MPEG-4 standardized by ISO (International Organization for Standardization). ITU is now working for standardization of H.26L as the latest standard for image coding.

Coding of moving pictures, in general, compresses information amount by reducing redundancy in both temporal and spatial directions. Therefore, in inter-picture prediction coding, which aims at reducing the temporal redundancy, motion of a current picture is estimated on a block-by-block basis with reference to preceding or subsequent pictures so as to generate predictive images of the current picture, and then differential values between the obtained predictive images and the current picture are coded.

Here, the term "picture" represents a single sheet of an image, and it represents a frame when used in a context of a progressive image, whereas it represents a frame or a field in a context of an interlaced image. The interlaced image here is a single frame that is made up of two fields having different times respectively. In the process of coding and decoding the interlaced image, a single frame can be handled as a frame, as two fields, or as a frame structure or a field structure on every block in the frame.

The following description will be given assuming that a picture is a frame in a progressive image, but the same description can be given even assuming that a picture is a frame or a field in an interlaced image.

FIG. 35 is a diagram for explaining types of pictures and reference relations between them.

A picture like Picture I1, which is intra-picture prediction coded without reference to any pictures, is referred to as an I-picture. A picture like Picture P10, which is inter-picture prediction coded with reference to one picture, is referred to as a P-picture. And a picture, which can be inter-picture prediction coded with reference to two pictures at the same time, is referred to as a B-picture. B-pictures, like Pictures B6, B12 and B18, can refer to two pictures located in arbitrary temporal directions. Reference pictures can be specified on a block-by-block basis, on which motion is estimated, and they are discriminated between a first reference picture which is described earlier in a bit stream including the coded pictures and a second reference picture which is described later in the bit stream. However, in order to code and decode above pictures it is a requirement that the reference pictures be already coded and decoded. FIGS. 36A and 36B show examples of order of pictures in which B-pictures are coded and decoded. FIG. 36A shows a display order of the pictures, and FIG. 36B shows a coding and decoding order reordered from the display order as shown in FIG. 36A. These drawings show that the pictures are reordered so that the pictures which are referred to by Pictures B3 and B6 are previously coded and decoded.

Next, reference indices for specifying reference pictures will be explained with reference to FIG. 37 and FIG. 38. For the sake of simplicity, numbers for identifying actual pictures are referred to as picture numbers, while numbers used for specifying reference pictures for inter-picture prediction are referred to as reference indices. Particularly, indices indicating first reference pictures and second reference pictures are referred to as first reference indices and second reference indices, respectively. Default values as shown in FIG. 37 are usually assigned to the reference indices in an initial state, but the assignment can be changed according to commands.

FIG. 37 shows the assignment of two reference indices to the picture numbers in the initial state of frame coding, and FIG. 38 shows an assignment of reference indices updated using commands from the assignment as shown in FIG. 37. When there is a sequence of pictures ordered in coding order, picture numbers are assigned to the pictures stored in a memory in coding order. Commands for assigning the reference indices to the picture numbers are described in a header of a slice that is the smaller unit of coding than a picture, and thus the assignment can be updated every time one slice is coded. It is possible to use a differential value between an original picture number and an updated picture number as the above command and code an arbitrary number of such commands as a command sequence. The first command in the command sequence is applied to a picture number of a current picture and indicates a picture number corresponding to a reference index number "0". The second command in the command sequence is applied to the picture number corresponding to the reference index number "0" and indicates a picture number corresponding to a reference index number "1". The third command is applied to the picture number corresponding to the reference index number "1" and indicates a picture number corresponding to a reference index number "2". The same applies to the fourth and the following commands. In the example of the first reference indices in FIG. 38, a command "−2" is given first and thus the reference index number "0" is assigned to the picture with its number "11" by adding "−2" to the picture number "13" of the current picture. Next, a command "+1" is given and thus the reference index number "1" is assigned to the picture with its number "12" by adding "+1" to the picture number "11" corresponding to the reference index number "0". The following picture numbers are assigned to the reference index numbers in the same manner. The same goes for the second reference indices.

FIG. 39 is a schematic diagram showing an example of a bit stream generated as a result of the above-mentioned coding. As shown in this figure, the maximum number of reference indices Max_idx1 for the first reference pictures (ref1) and the maximum number of reference indices Max_idx2 for the second reference pictures (ref2) are described in the picture common information of the bit stream, and the reference index assignment command sequences idx_cmd1 and idx_cmd2 for ref1 and ref2 are described in the slice header.

A document related to the above conventional technology is ITU-T Rec. H.264|ISO/IEC 14496-10 AVC Joint Final Committee Draft of Joint Video Specification (2002-8-10) (P.54, 8.3.6.3 Default index orders/P.56, 8.3.6.4 Changing the default index orders).

By the way, as a method of coding an interlaced image, frame coding and field coding can be used by switching them per block in one picture. This is referred to as Macroblock Adaptive Frame/Field Coding (hereinafter referred to as MBAFF). In this method, frame coding and field coding can be switched per a pair of two macroblocks placed above and below, as shown in FIG. 40. In a case of frame coding, both macroblocks are coded as a frame structure, while in a case of field coding, a macroblock consisting of odd-numbered lines and a macroblock consisting of even-numbered lines are coded separately.

In MBAFF, as shown in FIGS. 41A and 41B, reference pictures are used for reference by switching them between a frame structure and a field structure depending on the coding methods of the macroblock pairs. When a current macroblock pair is coded as a frame structure as shown in FIG. 41A, Pictures P1~P3 are referred to as frames. When a current macroblock pair is coded as a field structure as shown in FIG. 41B, the pictures are separated into top fields and bottom fields, Pictures P1T~P3B, and referred to as respective fields. At this time, the number of reference pictures, which is the number of top and bottom fields, is twice the number of frames.

However, the maximum number of reference indices (See max_idx1 and max_idx2 in FIG. 39) and the command sequences (See idx_cmd1 and idx_cmd2 in FIG. 39) for updating the assignment, which are used for assigning reference indices to respective pictures, cannot be applied to both frames and fields at the same time. Therefore, there is a problem that the maximum number of reference indices and the assignment commands cannot be appropriately determined in a case of MBAFF.

BRIEF SUMMARY OF THE INVENTION

In view of the above description, the present invention aims at providing a picture coding method and a picture decoding method for applying reference indices appropriately to either frame coding or field coding in a case of MBAFF.

In order to achieve this object, the coding method according to the present invention is a moving picture coding method for coding a picture with switching between frame coding and field coding adaptively on a block-by-block basis, comprising an assignment step of assigning field reference indices to fields using frame reference indices, the field reference indices specifying fields which are referred to at the time of field coding, and the frame reference indices specifying frames which are referred to at the time of frame coding.

According to this structure, frame reference indices can be used for assigning field reference indices. In other words, frame reference indices can be applied appropriately not only to frame coding, but also to field coding.

Here, the above-mentioned moving picture coding method may further comprise a specification step of specifying two fields that make up each of the frames specified by each of the frame reference indices, and in the assignment step, a first value may be assigned to one field having a parity same as a parity of a field including a current block to be coded, out of the specified two fields, as each of the field reference indices, the first value being obtained by doubling a value of the each of the frame reference indices, and a second value may be assigned to another field having a parity different from a parity of the field including the current block as the each of the field reference indices, the second value being obtained by adding one to the first value.

According to this structure, the value obtained by doubling the value of the frame reference index and the value obtained by adding one to the doubled value are assigned to the field reference indices depending on the field parity. Therefore, the field reference indices can be assigned extremely easily using the frame reference indices.

Here, the above-mentioned moving picture coding method may further comprise a determination step of determining a maximum number of the field reference indices to be a value obtained by doubling a maximum number of the frame reference indices, and in the assignment step, the field reference indices may be assigned within a range of the determined maximum number.

According to this structure, the number obtained by doubling the maximum number of frame reference indices can be assigned as the field reference indices, and thus the effective use of the frame reference indices can be maximized.

Here, the above-mentioned moving picture coding method may further comprise a specification step of specifying two fields that make up each of the frames specified by each of the frame reference indices, the two fields being a top field and a bottom field, and in the assignment step, a first value may be assigned to the top field, out of the specified two fields, as each of the field reference indices, the first value being obtained by doubling a value of the each of the frame reference indices, and a second value may be assigned to the bottom field as the each of the field reference indices, the second value being obtained by adding one to the first value.

The above-mentioned moving picture coding method may further comprise a specification step of specifying two fields that make up each of the frames specified by each of the frame reference indices, and in the assignment step, a value same as a value of the each of the frame reference indices may be assigned only to one field having a parity same as a parity of a field including a current block to be coded, out of the specified two fields, as each of the field reference indices.

Here, the above-mentioned moving picture coding method may further comprise an addition step of generating a command sequence indicating how to assign the frame reference indices and a command sequence indicating how to assign the field reference indices independently, coding the two command sequences, and adding the coded command sequences to a coded signal.

The above-mentioned moving picture coding method, wherein the field reference indices consist of top field reference indices and bottom field reference indices, may further comprise an addition step of generating a command sequence indicating how to assign the frame reference indices, a command sequence indicating how to assign the top field reference indices and a command sequence indicating how to assign the bottom field reference indices independently, coding the three command sequences, and adding the coded command sequences to a coded signal.

The above-mentioned moving picture coding method may further comprise a determination step of determining a maximum number of the field reference indices, and in the assignment step, the field reference indices may be assigned to fields within a range of the determined maximum number using the frame reference indices.

Here, in the determination step, the maximum number of the field reference indices may be determined to be a value obtained by doubling a maximum number of the frame reference indices.

According to this structure, the frame reference indices can be used effectively at the maximum for the field reference indices within the number obtained by doubling the maximum number of frame reference indices.

Here, in the determination step, the maximum number of the field reference indices may be determined to be a value same as a maximum number of the frame reference indices.

According to this structure, the frame reference indices can be used effectively at the maximum for the field reference indices within the number same as the maximum number of frame reference indices.

Here, the above-mentioned moving picture coding method may further comprise an addition step of determining a maximum number of the frame reference indices independently of the maximum number of the field reference indices, coding the two maximum numbers, and adding the coded maximum numbers to a coded signal.

According to this structure, the maximum number of the field reference indices can be determined independently of the maximum number of the frame reference indices, and the decoding apparatus can notify the determined maximum number via a coded signal.

Here, the above-mentioned moving picture coding method, wherein the field reference indices consist of top field reference indices and bottom field reference indices, may further comprise an addition step of determining a maximum number of the frame reference indices, a maximum number of the top field reference indices and a maximum number of the bottom field reference indices independently, coding the three maximum numbers, and adding the coded maximum numbers to a coded signal. As described above, according to the coding method of the present invention, the reference indices, the maximum number of the reference indices and the commands that are originally intended for frame coding can also be utilized appropriately in field coding, in a case of MBAFF.

Also, the moving picture decoding method, the moving picture coding apparatus, the moving picture decoding apparatus and the program of the present invention have the same structures, functions and effects as mentioned above.

BRIEF DESCRIPTION OF DRAWINGS

FIG. 1 is a block diagram showing a structure of a coding apparatus in a first embodiment of the present invention.

FIG. 2 is an illustration showing an example of correspondences between picture numbers and first and second reference indices in a case of frame coding of macroblocks (MB).

FIG. 3 is an illustration showing an example of correspondences between the first and second reference indices, commands and picture numbers.

FIG. 4 is an illustration showing an example of assigning the first and second reference indices to the picture numbers of fields in a case of field coding of macroblocks.

FIG. 5 is a flowchart showing the processing of assigning reference indices and commands executed by a reference index/picture number conversion unit in the coding apparatus.

FIG. 6 is a flowchart showing the processing of assigning reference indices for field coding to fields.

FIG. 7 is a block diagram showing a structure of a decoding apparatus in the first embodiment of the present invention.

FIG. 8 is a block diagram showing a structure of a coding apparatus in a second embodiment of the present invention.

FIG. 9 is an illustration showing an example of assigning the first and second reference indices to picture numbers of fields in a case of field coding of a macroblock.

FIG. 10 is a flowchart showing the processing of assigning reference indices executed by a reference index/picture number conversion unit in the coding apparatus.

FIG. 11 is a block diagram showing a structure of a decoding apparatus in the second embodiment of the present invention.

FIG. 12 is a block diagram showing a structure of a coding apparatus in a third embodiment of the present invention.

FIG. 13 is an illustration showing an example of assigning the first and second reference indices to picture numbers of fields in a case of field coding of a macroblock.

FIG. 14 is a block diagram showing a structure of a decoding apparatus in the third embodiment of the present invention.

FIG. 15 is a block diagram showing a structure of a coding apparatus in a fourth embodiment of the present invention.

FIG. 16 is an illustration showing an example of assigning the first and second reference indices to picture numbers of fields in a case of field coding of a macroblock.

FIG. 17 is a block diagram showing a structure of a coding apparatus in a fifth embodiment of the present invention.

FIG. 18 is an illustration showing an example of assigning the first and second reference indices to picture numbers of fields in a case of field coding of a macroblock.

FIG. 19 is a flowchart showing the processing of assigning reference indices executed by a reference index/picture number conversion unit in the coding apparatus.

FIG. 20 is a block diagram showing a structure of a decoding apparatus in the fifth embodiment of the present invention.

FIG. 21 is a diagram showing a data structure of a bit stream in a sixth embodiment of the present invention.

FIG. 22 is an illustration showing an example of assigning the first and second reference indices to picture numbers of fields in a case of field coding of a macroblock.

FIG. 23 is a block diagram showing a structure of a coding apparatus in a seventh embodiment of the present invention.

FIG. 24 is a diagram showing an example of a data structure of a bit stream.

FIG. 25 is an illustration showing an example of assigning the first and second indices to picture numbers of fields in a case of field coding of a macroblock.

FIG. 26 is a diagram showing an example of correspondences between reference indices, commands and picture numbers of fields specifically applied to top fields and bottom fields respectively in a case of field coding.

FIG. 27 is a flowchart showing the processing of assigning reference indices and commands in a case of a mixture of frame coding and field coding.

FIG. 28 is a block diagram showing a structure of a decoding apparatus in the seventh embodiment of the present invention.

FIG. 29 is a diagram showing another example of a data structure of a bit stream.

FIGS. 30A, 30B and 30C are illustrations of a recording medium for storing a program for realizing the moving picture coding method and moving picture decoding method in each of the embodiments by a computer system.

FIG. 31 is a block diagram showing an overall configuration of a content supply system.

FIG. 32 is an external view of a mobile phone.

FIG. 33 is a block diagram showing a structure of the mobile phone.

FIG. 34 is a diagram showing an example of a digital broadcasting system.

FIG. 35 is a schematic diagram for explaining reference relations between pictures in a background art.

FIGS. 36A and 36B are schematic diagrams for explaining reordering of pictures in the background art.

FIG. 37 is a schematic diagram for explaining how to assign picture numbers to reference indices in the background art.

FIG. 38 is a schematic diagram showing assignment of reference indices updated from the assignment as shown in FIG. 37 using commands in the background art.

FIG. 39 is a schematic diagram for explaining a structure of a bit stream in the background art.

FIG. 40 is an illustration of macroblock pairs in cases of frame coding and field coding.

FIGS. 41A and 41B are illustrations showing reference frames in frame coding and reference fields in field coding.

DETAILED DESCRIPTION OF THE INVENTION

First Embodiment

<Overview of Coding Apparatus and Decoding Apparatus>

First, an overview of a coding apparatus and a decoding apparatus in the present embodiment will be given.

When performing macroblock adaptive frame/field coding (MBAFF), the coding apparatus and the decoding apparatus in the present embodiment handle the maximum number of reference indices and a command sequence in the following manners (1.1) and (1.2), respectively. Here, the reference indices and the commands are same as those as shown in FIG. 38, and the maximum number of the reference indices are the same as those as shown in FIG. 39.

(1.1) As for the maximum number of the reference indices, the coding apparatus describes the maximum number of reference indices for frame coding (frame reference indices) in a bit stream to be transmitted when field coding and frame coding are mixed. The coding apparatus handles the maximum number of reference indices as the number of available reference indices in frame coding, while, in field coding, it considers the value obtained by doubling the maximum number for frame coding as the number of reference indices for field coding (field reference indices). For example, when the reference indices for frame coding 0-2 are assigned, the maximum number of reference indices is "3". In a case of frame coding, this number indicates the actual maximum number itself. In a case of field coding, the number "6" obtained by doubling the maximum number of reference indices for frame coding "3" is considered as the maximum number of reference indices for field coding. The same applies to the decoding apparatus.

(1.2) As for the command sequence, the coding apparatus describes commands for frame coding in a bit stream to be transmitted. The coding apparatus assigns the reference indices for frame coding in a case of frame coding, as explained using FIG. 38. Note that if the command sequence is not coded, correspondences between picture numbers and reference indices are established in the manner of default assignment as shown in FIG. 37.

In a case of field coding, the assignment of reference indices is updated for field coding based on the reference indices for frame coding which are already assigned.

To be more specific, the value obtained by doubling the value of the reference index for frame coding is assigned to a field of the same parity as a field including a current macroblock to be coded, among two fields that make up one frame, while the value obtained by doubling the value of the reference index for frame coding and adding 1 (x2+1) is assigned to another field of the opposite parity, as a reference index for field coding, respectively (See FIG. 4). Here, "parity" means an odd or even quality of a field (distinction between a top field consisting of odd-numbered lines and a bottom field consisting of even-numbered lines).

In other words, when a current macroblock to be coded belongs to a top field, the value obtained by doubling a value of a reference index for frame coding is assigned to a top field among two fields, while the value obtained by adding 1 to the doubled value (x2+1) is assigned to a bottom field among the two fields. When a current macroblock belongs to a bottom field, the value obtained by doubling the value of the reference index for frame coding is assigned to a bottom field among two fields, while the value obtained by adding 1 to the doubled value (x2+1) is assigned to a top field among the two fields.

On the other hand, the decoding apparatus decodes the maximum number of reference indices for frame coding and the assignment commands included in the transmitted bit stream, and assigns the reference indices to the reference pictures, using the maximum number and the commands, in exactly the same manner as the coding apparatus.

<Structure of Coding Apparatus>

Next, the structure of the coding apparatus will be explained.

FIG. 1 is a block diagram showing the structure of the moving picture coding apparatus in the first embodiment of the present invention. Using the figure, (1) an overview of coding and (2) an assignment method of reference indices and commands for frame coding and an assignment method of reference indices for field coding will be explained in this order.

(1) Overview of Coding

It is assumed here that a current picture represents either a frame or a field to be coded, and thus the overview of coding which is common to both frame coding and field coding will be explained below.

A moving picture to be coded is inputted to a picture memory 101 on a picture-by-picture basis in display order, and the inputted pictures are reordered in coding order. FIGS. 36A and 36B are diagrams showing an example of reordering of pictures. FIG. 36A shows an example of pictures in display order, and FIG. 36B shows an example of the pictures reordered in coding order. Here, since Pictures B3 and B6 refer both temporally preceding and subsequent pictures, the reference pictures need to be coded before coding these current pictures and thus the pictures are reordered in FIG. 36B so that Pictures P4 and P7 are coded earlier. Each of the pictures is divided into blocks called macroblocks of horizontal 16×vertical 16 pixels, for example, and the following proceeding is performed on a block-by-block basis.

An input image signal read out from the picture memory 101 is inputted to a difference calculation unit 112, a difference between the input image signal and the predicted image signal that is an output from a motion compensation coding unit 107 is calculated, and the obtained difference image signal (residual error signal) is outputted to a prediction error coding unit 102. The prediction error coding unit 102 performs image coding processing such as frequency transformation and quantization, and outputs a coded residual error signal. The coded residual error signal is inputted to a prediction error decoding unit 104, which performs image decoding processing such as inverse-quantization and inverse-frequency transformation and outputs a decoded residual error signal. An addition unit 111 adds the decoded residual error signal and the predicted image signal to generate a reconstructed image signal, and stores, in a picture memory 105, the reconstructed signals which could be referred in the following inter-picture prediction out of the obtained reconstructed image signals.

On the other hand, the input image signal read out per macroblock from the picture memory 101 is also inputted into a motion vector estimation unit 106. Here, the reconstructed image signals stored in the picture memory 105 are searched to estimate an image area which is the closest to the input image signal and determine a motion vector pointing to the position of the image area. The motion vector estimation is performed per block that is a part of a macroblock, and the obtained motion vectors are stored in a motion vector storage unit 108. At this time, since a plurality of pictures can be used for reference in H.26L which is now under consideration for standardization, identification numbers for specifying reference pictures are required per block. The identification numbers are referred to as reference indices, and a reference index/picture number conversion unit 109 establishes correspondences between the reference indices and the picture numbers of the pictures stored in the picture memory so as to allow specification of the reference pictures.

The motion compensation coding unit 107 extracts the image area that is most suitable for the predicted image from among the reconstructed image signals stored in the picture memory 105, using the motion vectors estimated by the above-mentioned processing and the reference indices. It is judged at this time which is more efficient, frame predictive coding or field predictive coding, in each macroblock, and then coding is performed using the selected method. The bit stream generation unit 103 performs variable length coding for the coded information such as the reference indices, the motion vectors and the coded residual error signals outputted as a result of the above series of processing so as to obtain a bit stream to be outputted from this coding apparatus.

The flow of operations in a case of inter-picture prediction coding has been described above, but a switch 112 and a switch 113 switch between inter-picture prediction coding and intra-picture prediction coding. In a case of intra-picture prediction coding, a predicted image is not generated by motion compensation, but a difference image signal is generated by calculating a difference from a predicted image in a current area which is generated from a coded area in the current picture. The prediction error coding unit 102 converts the difference image signal into the coded residual error signal in the same manner as inter-picture prediction coding, the bit stream generation unit 103 performs variable length coding for the signal to obtain a bit stream to be outputted.

(2) Assignment Method of Reference Indices
<Example of Assignment of Reference Indices>

First, FIG. 2~FIG. 4 show examples of assignment methods of reference indices for frame coding and reference indices for field coding.

FIG. 2 shows an example of assignment of default reference indices in a case where frame coding is performed on a block in a current picture to be coded, and the reference indices are assigned to the picture numbers in decreasing order of the picture number. The reference indices are always assigned in this manner when assignment commands are not coded. FIG. 3 shows an example where the default reference indices as shown in FIG. 2 are updated using the assignment commands. Since "−2" is given first as a command, a picture with its picture number "11" is assigned to the reference index number "0" by adding "−2" to the current picture number "13". Next, "+1" is given, as a command, a picture with its picture number "12" is assigned to the reference index number "1". Each of the following picture numbers is assigned in the same manner. The same applies to the second reference indices. The following will be explained based on FIG. 2 showing the default assignment, but the reference indices can be assigned in exactly the same manner even if the default assignment is updated by commands. Note that the above commands are just an example, and the reference indices can be assigned in exactly the same manner even if the default assignment is updated by commands for other assignments than the above example.

FIG. 4 is an illustration showing correspondences of the first and second reference indices for top field coding (top field reference indices) and bottom field coding (bottom field reference indices), respectively, updated from the first and second reference indices for frame coding as shown in FIG. 2, according to the above (1.1) and (1.2). FIG. 4 shows that the values obtained by doubling those of the reference indices for frame coding are assigned to the fields of the same parity as the field including a current macroblock, while the values obtained by doubling those of the reference indices for frame coding and adding 1 (x2+1) are assigned to the fields of the opposite parity.

In the present embodiment, if field coding and frame coding are mixed in one picture, the maximum number of reference indices for field coding is handled as the value obtained by doubling that for frame coding, and thus the number of indices in FIG. 4 is "6", whereas the number of indices in FIG. 2 is "3".

<Processing of Assigning Reference Indices>

FIG. 5 is a flowchart showing the processing of assigning reference indices executed by the reference index/picture number conversion unit of the coding apparatus.

The reference index/picture number conversion unit 109 performs the processing of assigning reference indices per slice in a case of MBAFF. Here, a slice means each of one or more areas which make up a picture. The reference index/picture number conversion unit 109 omits all the processing in this figure when there is no change of reference indices (in a case of default).

As shown in this figure, the reference index/picture number conversion unit 109 first performs the processing of assigning reference indices and commands for frame coding to frames (S11). Since this processing is same as that as described using FIG. 37, it is omitted here. Next, the reference index/picture number conversion unit 109 judges whether or not frame coding and field coding are mixed in the slice (S12), and if they are mixed, it performs the processing of assigning reference indices for field coding (S13).

FIG. 6 is a flowchart showing the processing of assigning reference indices to fields based on the correspondences between reference indices for frame coding and reference indices for field coding. In this figure, a variable j is 1 and 2 (j=1, 2) for B-pictures and j is 1 (j=1) for P-pictures, and max_idxj indicates the maximum number of the jth reference indices for frame coding, and idxj(i) indicates the value of the ith-jth reference index for frame coding, respectively. Loop 2 can be applied commonly to B-pictures and P-pictures. Loop 1 has iterations for the maximum number of reference indices for frame coding (max_idxj), and two reference indices for field coding are assigned for every iteration of loop 1.

The processing of assigning two reference indices for field coding using one-iteration of loop 1, that is, one reference index for frame coding, will be explained below. The reference index/picture number conversion unit 109 reads out the value of the ith-jth reference index for frame coding idxj(i)

assigned in S11 of FIG. 5 (S23), and judges whether the current macroblock belongs to the top field or not (S26).

When the current macroblock is judged to belong to the top field, the value obtained by doubling that of the reference index for frame coding idxj(i) (S27) is assigned to the top field out of the two fields specified in S25 (S28), and the value obtained by doubling the value idxj(i) and adding 1 (S29) is assigned to the bottom field out of the two fields specified in S25 (S30).

When the current macroblock is judged to belong to the bottom field, the value obtained by doubling that of the reference index for frame coding idxj(i) (S31) is assigned to the bottom field out of the two fields specified in S25 (S32), and the value obtained by doubling the value idxj(i) and adding 1 (S33) is assigned to the top field out of the two fields specified in S25 (S34).

As described above, the value obtained by doubling the value of the reference index for frame coding and the value obtained by adding 1 to the doubled value (x2+1) are assigned to the reference indices for field coding. Therefore, as shown in FIG. 4, the value obtained by doubling the maximum number of reference indices for frame coding (max_idxj) is assigned to the maximum number of reference indices for field coding.

In coding a macroblock, reference indices for field coding used as reference fields in the field-coded macroblock are set in a bit stream as ref1 and ref2 (See FIG. 39). On the other hand, reference indices for frame coding used as reference frames in the frame-coded macroblock are set in a bit stream as ref1 and ref2 (See FIG. 39).

The number of reference indices for frame coding is 3 in the example of FIG. 2, whereas the number of reference indices for field coding is 6 in the example of FIG. 4.

FIG. 6 shows the processing of assigning reference indices for field coding to each current picture to be field-coded, but a table may be prepared in advance. To be more specific, the present embodiment may be structured so as to create a table indicating correspondences between reference indices for frame coding and picture numbers of frames according to commands, and further, by assigning the reference indices for top field coding and bottom-field coding respectively in the same manner as shown in FIG. 6, to create a table indicating correspondences between reference indices for top field coding and picture numbers of fields and a table indicating correspondences between reference indices for bottom field coding and picture numbers of fields. Once these tables are created at the beginning of coding or decoding pictures, the reference pictures can be determined only with reference to the reference indices indicated in these tables.

<Structure of Decoding Apparatus>

FIG. 7 is a block diagram showing a structure of a decoding apparatus in the first embodiment of the present invention. Using this figure, (1) an overview of decoding and (2) processing of converting reference indices will be explained in this order. Here, it is assumed that a bit stream is transmitted from the coding apparatus as shown in FIG. 1 to the present decoding apparatus.

(1) Overview of Decoding

First, a bit stream analysis unit 201 extracts various information from the inputted bit stream: the maximum number of reference indices from a picture common information area, command sequences for reference index assignment from a slice header area, and reference indices, motion vector information and a coded residual error signal from a coded block information area, respectively.

The maximum number of reference indices and the command sequences for reference index assignment extracted by the bit stream analysis unit 201 are outputted to a reference index/picture number conversion unit 206, the reference indices are outputted to a motion compensation decoding unit 204, the motion vector information is outputted to a motion vector storage unit 205, and the coded residual error signal is outputted to a prediction error decoding unit 202, respectively.

The prediction error decoding unit 202 performs image decoding processing such as inverse-quantization and inverse-frequency transformation for the inputted coded residual error signal, and outputs a decoded residual error signal. The addition unit 207 adds the decoded residual error signal and the predicted image signal outputted from the motion compensation decoding unit 204 to generate a reconstructed image signal. The obtained reconstructed image signal is stored in a picture memory 203 for use for reference in the following inter-picture prediction and output for display.

The motion compensation decoding unit 204 extracts an image area which is most suitable as a predicted image from the reconstructed image signals stored in the picture memory 203, using the motion vectors inputted from the motion vector storage unit 205 and the reference indices inputted from the bit stream analysis unit 201. At this time, the reference index/picture number conversion unit 206 specifies the reference pictures in the picture memory 203 based on the correspondences between the given reference indices and the picture numbers. If field coding is mixed, it specifies reference fields after converting the reference indices for frame coding into the reference indices for field coding.

Further, the motion compensation decoding unit 204 performs pixel value conversion processing such as interpolation processing by linear prediction on pixel values in the extracted image area so as to generate the ultimate predicted image. The decoded image generated through the above-mentioned series of processing is stored in the picture memory 203 and outputted as a picture signal for display according to display timing.

The flow of operations in a case of inter-picture prediction decoding has been described above, but a switch 208 switches between inter-picture prediction decoding and intra-picture prediction decoding. In a case of intra-picture decoding, a predicted image is not generated by motion compensation, but a decoded image is generated by generating a predicted image of a current area to be decoded from a decoded area in the same picture and adding the predicted image. The decoded image is stored in the picture memory 203, as is the case with the inter-picture prediction decoding, and outputted as a picture signal for display according to display timing.

(2) Processing of Converting Reference Indices

The reference index/picture number conversion unit 206 assigns picture numbers and reference indices using the inputted maximum number of reference indices and commands for reference index assignment. They are assigned in exactly the same manner as the coding apparatus. In the present embodiment, the value obtained by doubling the maximum number of reference indices for frame coding is used as the maximum number of reference indices for field coding. Therefore, the assignment for frame coding as shown in FIG. 2 turns to be the assignment as shown in FIG. 4 for field coding.

As described above, according to the coding apparatus and the decoding apparatus in the present embodiment, the maximum number of reference indices and the assignment commands for frame coding, if only they are coded in a bit stream, can be applied appropriately not only to frame coding but also to field coding in a case of MBAFF. Also, the value obtained by doubling the maximum number of reference indices for frame coding is used as the maximum number for field coding, such that all the fields stored in the memory can be used effectively for coding and decoding.

Second Embodiment

Overview of Coding Apparatus and Decoding Apparatus

First, an overview of a coding apparatus and a decoding apparatus in the present embodiment will be explained.

The coding apparatus and the decoding apparatus in the present embodiment perform MBAFF, and for that purpose, they handle the maximum number of reference indices and a command sequence in the following manners (2.1) and (2.2), respectively.

(2.1) Since the maximum number of reference indices is same as (1.1) as described at the outset of the first embodiment, an explanation thereof is omitted.

(2.2) As for the command sequence, the coding apparatus describes commands for frame coding in a bit stream to be transmitted. As described using FIG. 37 and FIG. 38, the coding apparatus assigns reference indices for frame coding for the purpose of frame coding. Note that correspondences of the reference indices are established in the manner of the default assignment, as described using FIG. 37, if the command sequence is not coded.

Further, for the purpose of field coding, the assignment of reference indices is updated based on the assigned reference indices for frame coding.

In the present embodiment, differently from the first embodiment, regardless of whether a current macroblock to be coded is in a top field or a bottom field, the value obtained by doubling the value of reference index for frame coding is assigned to a top field out of two fields that make up one frame, while the value obtained by doubling the reference index for frame coding and adding 1 (x2+1) is assigned to a bottom field, respectively, as reference indices for field coding (See FIG. 9).

<Structure of Coding Apparatus>

FIG. 8 is a block diagram showing the structure of the coding apparatus in the second embodiment of the present invention. The coding apparatus in this figure is different from that in FIG. 1 in that the former includes a reference index/picture number conversion unit 109a, instead of the reference index/picture number conversion unit 109. The same points as those in FIG. 1 are omitted, and the following explanation will focus on the different points. The reference index/picture number conversion unit 109a is different from FIG. 1 only in that the former establishes a mapping (assignment of reference indices) of above-mentioned (2.2), not a mapping of (1.2).

<Example of Assignment of Reference Indices>

FIG. 9 is an illustration showing correspondences of the first and second reference indices for field coding, updated from the first and second reference indices for frame coding as shown in FIG. 2, according to the above (2.1) and (2.2). As shown in FIG. 9, the mapping executed by the reference index/picture number conversion unit 109a in the present embodiment is not separate assignment of reference indices for top field coding and bottom field coding, but common assignment for both top field coding and bottom field coding.

In the present embodiment, when field coding and frame coding are mixed in one picture, the value obtained by doubling the maximum number of reference indices for frame coding is handled as the value for field coding, and thus the number of indices in FIG. 2 is "3", whereas the number of indices in FIG. 9 is "6".

<Processing of Assigning Reference Indices>

FIG. 10 is a flowchart showing the processing of assigning reference indices executed by the reference index/picture number conversion unit in the coding apparatus.

In FIG. 10, the same step numbers are assigned to the same processing as that in FIG. 6, and the flowchart in FIG. 10 is different from that in FIG. 6 in that S26 and S31~S34 in FIG. 6 are deleted and S27 is executed next to S23 in FIG. 10. Due to these differences, the number of reference indices obtained by doubling the number of the reference indices for frame coding is assigned as the reference indices for field coding, and further the reference indices for field coding are assigned commonly for both top field coding and bottom field coding, as shown in FIG. 9.

<Structure of Decoding Apparatus>

FIG. 11 is a block diagram showing the structure of the decoding apparatus in the second embodiment of the present invention. The decoding apparatus in FIG. 11 is different from that in FIG. 7 in that the former includes a reference index/picture number conversion unit 206a, instead of the reference index/picture number conversion unit 206. The reference index/picture number conversion unit 206a is different from FIG. 7 only in that the former converts the reference indices according to the mapping of (2.2), not the mapping of (1.2).

<Processing of Converting Reference Indices>

The reference index/picture number conversion unit 206a assigns picture numbers and reference indices using the inputted maximum number of reference indices and the reference index assignment commands. They are assigned in exactly the same manner as the coding apparatus. In the present embodiment, the value obtained by doubling the value of the maximum number of reference indices for frame coding is used as the maximum number of reference indices for field coding. Therefore, the assignment for frame coding as shown in FIG. 2 turns to be the assignment for field coding as shown in FIG. 9.

Third Embodiment

Overview of Coding Apparatus and Decoding Apparatus

First, the overview of the coding apparatus and the decoding apparatus in the present embodiment will be explained.

The coding apparatus and the decoding apparatus in the present embodiment perform MBAFF, and for that purpose, they handle the maximum number of the reference indices and the command sequence in the following manners (3.1) and (3.2).

(3.1) As for the maximum number of the reference indices, the coding apparatus describes the maximum number of reference indices for frame coding in a bit stream to be transmitted when field coding and frame coding are mixed. The coding apparatus handles this maximum number of reference indices as the number of available reference indices in frame coding, and, in field coding, it also handles the number for frame coding as the number of reference indices for field coding. For example, if the maximum number of reference indices for frame coding is 3, the coding apparatus also handles the maximum number of reference indices for field coding as 3.

(3.2) As for the command sequence, since it is handled in the same manner as (1.2) as described at the outset of the first embodiment, an explanation thereof is omitted. However, the same value is used as the maximum number of reference indices given by (3.1) for both frame coding and field coding, so only the same number of reference indices as that as shown in FIG. 2 can be applied to field coding (See FIG. 13).

<Structure of Coding Apparatus>

FIG. 12 is a block diagram showing the structure of the coding apparatus in the third embodiment of the present invention. The coding apparatus in this figure is different from that in FIG. 1 in that the former includes a reference index/picture number conversion unit 109*b*, instead of the reference index/picture number conversion unit 109. The reference index/picture number conversion unit 109*b* is different from that in FIG. 1 only in that the former handles the number of reference indices according to (3.1), not to (1.1).

<Example of Reference Index Assignment>

FIG. 13 is an illustration showing correspondences of the first and second reference indices for field coding, updated from the first and second reference indices for frame coding as shown in FIG. 2, according to the above (3.1) and (3.2). As shown in FIG. 13, the mapping executed by the reference index/picture number conversion unit 109*b* in the present embodiment is separate assignment of reference indices to top fields and bottom fields in the same manner as the first embodiment, but is different in that the maximum number of reference indices for field coding is same as the maximum number of reference indices for frame coding.

<Structure of Decoding Apparatus>

FIG. 14 is a block diagram showing the structure of the decoding apparatus in the third embodiment of the present invention. The decoding apparatus in FIG. 14 is different from that in FIG. 7 in that the former includes a reference index/picture number conversion unit 206*b*, instead of the reference index/picture number conversion unit 206. The reference index/picture number conversion unit 206*b* is different from FIG. 7 only in that the former performs the reference index conversion processing according to the maximum number described in (3.2), not the maximum number described in (1.1).

Fourth Embodiment

Overview of Coding Apparatus and Decoding Apparatus

First, an overview of the coding apparatus and the decoding apparatus in the present embodiment will be explained.

The coding apparatus and the decoding apparatus in the present embodiment perform MBAFF, and for that purpose, they handle the maximum number of reference indices and the command sequence in the following manners (4.1) and (4.2).

(4.1) As for the maximum number of reference indices, since it is handled in the same manner as (3.1) as described at the outset of the third embodiment, an explanation thereof is omitted.

(4.2) Since it is same as (2.2) as described at the outset of the second embodiment, an explanation thereof is omitted. However, the same value is used as the maximum number of reference indices given by (4.1) for both frame coding and field coding, so only the same number of reference indices as that as shown in FIG. 2 can be applied for field coding (See FIG. 16).

<Structure of Coding Apparatus>

FIG. 15 is a block diagram showing the structure of the coding apparatus in the fourth embodiment of the present invention. The coding apparatus in this figure is different from that in FIG. 8 in that the former includes a reference index/picture number conversion unit 109*c*, instead of the reference index/picture number conversion unit 109*a*. The reference index/picture number conversion unit 109*c* is different from that in FIG. 8 only in that the former handles the maximum number of reference indices according to (4.1), not to (2.1).

<Example of Reference Index Assignment>

FIG. 16 is an illustration showing correspondences of the first and second reference indices for field coding, updated from the first and second reference indices for frame coding as shown in FIG. 2, according to the above (4.1) and (4.2). As shown in FIG. 16, the mapping executed by the reference index/picture number conversion unit 109*c* in the present embodiment is assignment of common reference indices for both top field coding and bottom field coding, in the same manner as the second embodiment, but is different in that the maximum number of reference indices for field coding is same as the maximum number of reference indices for frame coding.

<Structure of Decoding Apparatus>

The decoding apparatus in the present embodiment may be same as the decoding apparatus in the second embodiment. However, the former is different from the latter in that the former handles the maximum number of reference indices for field coding as the same number as the maximum number of reference indices for frame coding, not the doubled number.

Fifth Embodiment

Overview of Coding Apparatus and Decoding Apparatus

First, the overview of the coding apparatus and the decoding apparatus in the present embodiment will be explained.

The coding apparatus and the decoding apparatus in the present embodiment perform MBAFF, and for that purpose, they handle the maximum number of the reference indices and the command sequence in the following manners (5.1) and (5.2).

(5.1) As for the maximum number of reference indices, since it is handled in the same manner as (3.1) as described at the outset of the third embodiment, an explanation thereof is omitted.

(5.2) As for the command sequence, the coding apparatus describes commands for frame coding in a bit stream to be transmitted. As described using FIG. 37 and FIG. 38, the coding apparatus assigns reference indices for frame coding for the purpose of frame coding. Note that correspondences of the reference indices are established by the default assignment method, as described using FIG. 37, if the command sequence is not coded.

Further, for the purpose of field coding, the assignment of reference indices is updated based on the assigned reference indices for frame coding.

In the present embodiment, differently from the first embodiment, the value of reference index for frame coding is assigned to a field of the same parity as that of a current macroblock to be coded, out of two fields that make up one frame, as a reference index for field coding, while no value is assigned to a field of the opposite parity (See FIG. 18).

In other words, when the current macroblock belongs to the top field, the value of the reference index for frame coding is assigned to the top field out of the above two fields, as a reference index for field coding. When the current macroblock belongs to the bottom field, the value of the reference index for frame coding is assigned to the bottom field out of the above two fields, as a reference index for field coding.

On the other hand, the decoding apparatus decodes the maximum number of reference indices for frame coding and the assignment commands included in the transmitted bit stream, and using them, it assigns the reference pictures and the reference indices in exactly the same manner as the coding apparatus.

<Structure of Coding Apparatus>

FIG. 17 is a block diagram showing the structure of the coding apparatus in the fifth embodiment of the present invention. The coding apparatus in this figure is different from that in FIG. 1, in order to adapt to the above (5.1) and (5.2), in that the former includes a reference index/picture number conversion unit 109d, instead of the reference index/picture number conversion unit 109.

<Example of Reference Index Assignment>

FIG. 18 is an illustration showing correspondences of the first and second reference indices for field coding, updated from the first and second reference indices for frame coding as shown in FIG. 2, according to the above (5.1) and (5.2). As shown in FIG. 18, the value of the reference index for frame coding is applied to a field of the same parity as a current macroblock as the reference index for field coding, while no index is applied to a field of the opposite parity.

<Processing of Assigning Reference Indices>

FIG. 19 is a flowchart showing the processing of assigning reference indices executed by the reference index/picture number conversion unit in the coding apparatus. FIG. 19 is different from FIG. 6 in that S81 is added instead of S27~S30 and S82 is added instead of S31~S34.

<Structure of Decoding Apparatus>

FIG. 20 is a block diagram showing the structure of the decoding apparatus in the fifth embodiment of the present invention. The decoding apparatus in FIG. 20 is different from that in FIG. 7 in that the former includes a reference index/picture number conversion unit 206d, instead of the reference index/picture number conversion unit 206.

According to the same operation as the mapping of (5.2), the reference index/picture number conversion unit 206b executes a mapping of indices for field coding for top fields only if a current macroblock to be decoded is in a top field and for bottom fields only if a current macroblock is in a bottom field, respectively.

Sixth Embodiment

Overview of Coding Apparatus and Decoding Apparatus

First, the overview of the coding apparatus and the decoding apparatus in the present embodiment will be explained.

The coding apparatus and the decoding apparatus in the present embodiment perform MBAFF, and for that purpose, they handle the maximum number of the reference indices and the command sequence in the following manners (6.1) and (6.2). Here, the reference indices and the commands are same as those as shown in FIG. 37, and the maximum number of the reference indices is same as that as shown in FIG. 39.

(6.1) As for the maximum number of reference indices, when both field coding and frame coding are mixed, the coding apparatus describes not only the maximum number of reference indices for frame coding but also the maximum number of reference indices for top field coding and the maximum number of reference indices for bottom field coding, respectively, in a bit stream to be transmitted.

The decoding apparatus uses the maximum number of reference indices for top field coding and the maximum number of reference indices for bottom field coding described in the bit stream.

(6.2) As for the command sequence, since it is same as that in (1.2), an explanation thereof is omitted. However, the reference indices for top field coding are handled so as not to exceed the maximum number described in the bit stream. The same applies to the reference indices for bottom field coding.

On the other hand, the decoding apparatus decodes the maximum numbers of the reference indices for frame coding, top field coding and bottom field coding and the assignment commands, which are included in the transmitted bit stream, and using them, it assigns the reference pictures and the reference indices in exactly the same manner as the coding apparatus.

<Structure of Coding Apparatus and Decoding Apparatus>

The coding apparatus and the decoding apparatus in the present embodiment may be same as the coding apparatus and the decoding apparatus in the first embodiment. However, as the maximum number of reference indices for top field coding and the maximum number of reference indices for bottom field coding, they use the values described in the bit stream, not the values obtained by doubling the values of reference indices for frame coding.

<Data Structure>

FIG. 21 is a diagram showing the data structure of the bit stream in the sixth embodiment of the present invention. In this figure, the first reference picture ref1 corresponds to Max_idx1 included in the picture common information, and the maximum number of reference indices for frame coding (Max_idx_form), the maximum number of reference indices for top field coding (Max_idx_top) and the maximum number of reference indices for bottom field coding (Max_idx_btm) are described in Max_idx1.

FIG. 22 is an illustration showing an example of assigning the first and second reference indices to picture numbers of fields in a case of field coding. In this figure, "5" is described in Max_idx_top, while "6" is described in Max_idx_btm. In this way, the coding apparatus and the decoding apparatus in the present embodiment can set the maximum number of reference fields flexibly for top fields and bottom fields.

Note that the maximum number of reference indices for top field coding and the maximum number of reference indices for bottom field coding are described in a bit stream separately (See (6.1)), but one maximum number common to both top and bottom field coding may be described instead.

In (6.2), as in the case with (1.2), the value obtained by doubling the value of the reference index for frame coding is assigned to a field of the same parity as a current microblock to be coded, out of two fields that make up one reference frame specified by the reference index and the command for the frame, whereas the value obtained by doubling the value of that reference index for frame coding and adding 1 (x2+1) is assigned to another field of the opposite parity to the current microblock, respectively, as reference indices for field coding (See FIG. 4). Instead, as in the case with (2.2), the value obtained by doubling the value of the reference index for frame coding may be assigned to a top field, out of two fields that make up one reference frame specified by the reference index and the command for the frame, and the value obtained by doubling the value of that reference index for frame coding and adding 1 (x2+1) may be assigned to a bottom field, respectively, as reference indices for field coding (See FIG. 9).

Seventh Embodiment

Overview of Coding Apparatus and Decoding Apparatus

First, the overview of the coding apparatus and the decoding apparatus in the present embodiment will be explained.

The coding apparatus and the decoding apparatus in the present embodiment perform MBAFF, and for that purpose, they handle the maximum number of the reference indices and the command sequence in the following manners (7.1) and (7.2). Here, the reference indices and the commands are same as those as shown in FIG. 37, and the maximum number of the reference indices is same as that as shown in FIG. 39.

(7.1) As for the maximum number of reference indices, since it is handled in exactly the same manner as (6.1), an explanation thereof is omitted.

(7.2) As for the command sequence, the coding apparatus describes not only the reference indices and the commands for frame coding but also the reference indices and the commands for top field coding and the reference indices and the commands for bottom field coding in a bit stream to be transmitted. The coding apparatus assigns the reference indices for frame coding for the purpose of frame coding, while it assigns the reference indices for top field coding and the reference indices for bottom field coding for the purpose of field coding.

On the other hand, the decoding apparatus decodes the maximum number of reference indices and the assignment commands for frame coding, top field coding and bottom field coding, included in the transmitted bit stream, and using them, it assigns the reference pictures and the reference indices in exactly the same manner as the coding apparatus.

<Structure of Coding Apparatus>

FIG. 23 is a block diagram showing the structure of the coding apparatus in the seventh embodiment of the present invention. The coding apparatus in this figure is different from that in FIG. 1 in that the former includes a reference index/picture number conversion unit 109e, instead of the reference index/picture number conversion unit 109.

FIG. 24 is a diagram showing an example of a data structure of a bit stream in the present embodiment. In this figure, idx_cmd1 is a set of commands for the first reference picture ref1, and includes idx_cmd_form, idx_cmd_top and idx_cmd_btm. idx_cmd_form is a command sequence for reference indices for frame coding. idx_cmd_top is a command sequence for reference indices for top field coding. idx_cmd_btm is a command sequence for reference indices for bottom field coding.

FIG. 25 is an illustration showing an example of assigning the first and second indices to picture numbers of fields in a case of field coding. In this figure, the reference indices for top field coding and the reference indices for bottom field coding can be independently assigned to arbitrary fields.

FIG. 26 is a diagram showing an example of correspondences between reference indices, commands and picture numbers of fields in a case of FIG. 25.

FIG. 27 is a flowchart showing the processing of assigning reference indices and commands executed by the reference index/picture number conversion unit 109e. As shown in this figure, the reference index/picture number conversion unit 109e assigns reference indices and commands for frame coding (S11), and when frame coding and field coding are mixed (S12), it assigns reference indices and commands for top field coding (S93) and further assigns reference indices and commands for bottom field coding (S94).

Note that in FIG. 27, no command is assigned in S11, S93 and S94 when default reference indices are used.

<Structure of Decoding Apparatus>

FIG. 28 is a block diagram showing the structure of the decoding apparatus in the seventh embodiment of the present invention. FIG. 28 includes a reference index/picture number conversion unit 206e instead of the reference index/picture number conversion unit 206 in FIG. 7. The reference index/picture number conversion unit 206e establishes correspondences between picture numbers and reference indices for frame coding, top field coding and bottom field coding, respectively, using index assignment commands for them inputted from the bit stream analysis unit 201.

In the present embodiment, command sequences for top field coding and bottom field coding are described separately in a bit stream, but they may be one common command sequence. FIG. 29 is a diagram showing the data structure of the bit stream in that case. In this figure, idx_fld is a command sequence common to top field coding and bottom field coding.

Note that the maximum number of reference indices for field coding as described in (7.1) do not have to be specific to top field coding or bottom field coding, but may be common to top field coding and bottom field coding.

Also, the reference indices and commands for field coding as described in (7.2) do not have to be specific to top field coding or bottom field coding, and may be common to top field coding and bottom field coding.

Also, the decoding apparatus in each of the above embodiments may create a reference table between reference indices for field coding and picture numbers of fields before starting decoding of a slice, and refer to the table when decoding a field-coded macroblock.

Eighth Embodiment

If a program for realizing the structures of the picture coding method or the picture decoding method as shown in each of the above embodiments is recorded on a memory medium such as a flexible disk, it becomes possible to perform the processing as shown in each of the embodiments easily in an independent computer system.

FIGS. 30A, 30B and 30C are illustrations showing the case where the present invention is implemented in a computer system using a flexible disk which stores the picture coding method or the picture decoding method of the above first to seventh embodiments.

FIG. 30B shows a front view and a cross-sectional view of an appearance of a flexible disk, and the flexible disk itself, and FIG. 30A shows an example of a physical format of a flexible disk as a recording medium body. The flexible disk FD is contained in a case F, and a plurality of tracks Tr are formed concentrically on the surface of the disk in the radius direction from the periphery and each track is divided into 16 sectors Se in the angular direction. Therefore, as for the flexible disk storing the above-mentioned program, the picture coding method as the program is recorded in an area allocated for it on the flexible disk FD.

FIG. 30C shows the structure for recording and reproducing the program on and from the flexible disk FD. When the program is recorded on the flexible disk FD, the picture coding method or the picture decoding method as a program is written in the flexible disk from the computer system Cs via a flexible disk drive. When the picture coding method is constructed in the computer system by the program on the flexible disk, the program is read out from the flexible disk using the flexible disk drive and transferred to the computer system.

The above explanation is made on the assumption that a recording medium is a flexible disk, but the same processing can also be performed using an optical disk. In addition, the recording medium is not limited to a flexible disk and an optical disk, but any other medium such as an IC card and a ROM cassette capable of recording a program can be used.

Ninth Embodiment

FIG. 31 to FIG. 34 are illustrations of devices for performing the coding processing or the decoding processing as described in the above embodiments and a system using them.

FIG. 31 is a block diagram showing the overall configuration of a content supply system ex100 for realizing content distribution service. The area for providing communication service is divided into cells of desired size, and base stations ex107 to ex110 which are fixed wireless stations are placed in respective cells.

In this content supply system ex100, devices such as a computer ex111, a PDA (personal digital assistant) ex112, a camera ex113, a mobile phone ex114 and a camera-equipped mobile phone ex115 are connected to the Internet ex 101 via an Internet service provider ex102, a telephone network ex104 and base stations ex107 to ex110.

However, the content supply system ex100 is not limited to the configuration as shown in FIG. 31, and a combination of any of them may be connected. Also, each device may be connected directly to the telephone network ex104, not through the base stations ex107 to ex110.

The camera ex113 is a device such as a digital video camera capable of shooting moving pictures. The mobile phone may be a mobile phone of a PDC (Personal Digital Communications) system, a CDMA (Code Division Multiple Access) system, a W-CDMA (Wideband-Code Division Multiple Access) system or a GSM (Global System for Mobile Communications) system, a PHS (Personal Handyphone system) or the like.

A streaming server ex103 is connected to the camera ex113 via the base station ex109 and the telephone network ex104, which allows live distribution or the like using the camera ex113 based on the coded data transmitted from a user. Either the camera ex113 or the server for transmitting the data may code the shot data. Also, the moving picture data shot by a camera ex116 may be transmitted to the streaming server ex103 via the computer ex111. The camera ex116 is a device such as a digital camera capable of shooting still and moving pictures. Either the camera ex116 or the computer ex111 may code the moving picture data. An LSI ex117 included in the computer ex111 or the camera ex116 actually performs coding processing. Software for coding and decoding moving pictures may be integrated into any type of storage medium (such as a CD-ROM, a flexible disk and a hard disk) that is a recording medium which is readable by the computer ex111 or the like. Furthermore, the camera-equipped mobile phone ex115 may transmit the moving picture data. This moving picture data is the data coded by the LSI included in the mobile phone ex115.

The content supply system ex100 codes contents (such as a live music video) shot by users using the camera ex113, the camera ex116 or the like in the same manner as the above embodiment and transmits them to the streaming server ex103, while the streaming server ex103 makes stream distribution of the content data to the clients at their request. The clients include the computer ex111, the PDA ex112, the camera ex113, the mobile phone ex114 and so on capable of decoding the above-mentioned coded data. In the content supply system ex100, the clients can thus receive and reproduce the coded data, and further the clients can receive, decode and reproduce the data in real time so as to realize personal broadcasting.

When each device in this system performs coding or decoding, the moving picture coding apparatus or the moving picture decoding apparatus, as shown in each of the above-mentioned embodiments, can be used.

A mobile phone will be explained as an example of the device.

FIG. 32 is a diagram showing the mobile phone ex115 that uses the moving picture coding method and the moving picture decoding method explained in the above embodiments. The mobile phone ex115 has an antenna ex201 for sending and receiving radio waves to and from the base station ex110, a camera unit ex203 such as a CCD camera capable of shooting video and still pictures, a display unit ex202 such as a liquid crystal display for displaying the data obtained by decoding video and the like shot by the camera unit ex203 and received via the antenna ex201, a body unit including a set of operation keys ex204, a voice output unit ex208 such as a speaker for outputting voices, a voice input unit 205 such as a microphone for inputting voices, a storage medium ex207 for storing coded or decoded data such as data of moving or still pictures shot by the camera, and text data and data of moving or still pictures of received e-mails, and a slot unit ex206 for attaching the storage medium ex207 to the mobile phone ex115. The storage medium ex207 includes a flash memory element, a kind of EEPROM (Electrically Erasable and Programmable Read Only Memory) that is an electrically erasable and rewritable nonvolatile memory, in a plastic case such as an SD card.

The mobile phone ex115 will be further explained with reference to FIG. 33. In the mobile phone ex115, a main control unit ex311 for overall controlling the display unit ex202 and the body unit including operation keys ex204 is connected to a power supply circuit unit ex310, an operation input control unit ex304, a picture coding unit ex312, a camera interface unit ex303, an LCD (Liquid Crystal Display) control unit ex302, a picture decoding unit ex309, a multiplex/demultiplex unit ex308, a record/reproduce unit ex307, a modem circuit unit ex306 and a voice processing unit ex305, and they are connected to each other via a synchronous bus ex313.

When a call-end key or a power key is turned ON by a user's operation, the power supply circuit unit ex310 supplies respective units with power from a battery pack so as to activate the camera-equipped digital mobile phone ex115 to place the digital mobile phone ex115 in a ready state.

In the mobile phone ex115, the voice processing unit ex305 converts the voice signals received by the voice input unit ex205 in conversation mode into digital voice data under the control of the main control unit ex311 including a CPU, ROM and RAM, the modem circuit unit ex306 performs spread spectrum processing of the digital voice data, and the send/receive circuit unit ex301 performs digital-to-analog conversion and frequency transform of the data, so as to transmit it via the antenna ex201. Also, in the mobile phone ex115, after the data received by the antenna ex201 in conversation mode is amplified and performed of frequency transform and analog-to-digital conversion, the modem circuit unit ex306 performs inverse spread spectrum processing of the data, and the voice processing unit ex305 converts it into analog voice data, so as to output it via the voice output unit 208.

Furthermore, when transmitting e-mail in data communication mode, the text data of the e-mail inputted by operating the operation keys ex204 on the body unit is sent out to the main control unit ex311 via the operation input control unit ex304. In the main control unit ex311, after the modem circuit unit ex306 performs spread spectrum processing of the text data and the send/receive circuit unit ex301 performs digital-to-analog conversion and frequency transform for it, the data is transmitted to the base station ex110 via the antenna ex201.

When picture data is transmitted in data communication mode, the picture data shot by the camera unit ex203 is supplied to the picture coding unit ex312 via the camera interface unit ex303. When the picture data is not transmitted, it is also possible to display the picture data shot by the camera unit ex203 directly on the display unit 202 via the camera interface unit ex303 and the LCD control unit ex302.

The picture coding unit ex312, which includes the picture coding apparatus as explained in the present invention, compresses and codes the picture data supplied from the camera unit ex203 by the coding method used for the picture coding apparatus as shown in the above embodiments so as to transform it into coded picture data, and sends it out to the multiplex/demultiplex unit ex308. At this time, the mobile phone ex115 sends out the voices received by the voice input unit ex205 during shooting by the camera unit ex203 to the multiplex/demultiplex unit ex308 as digital voice data via the voice processing unit ex305.

The multiplex/demultiplex unit ex308 multiplexes the coded picture data supplied from the picture coding unit ex312 and the voice data supplied from the voice processing unit ex305 by a predetermined method, the modem circuit unit ex306 performs spread spectrum processing of the multiplexed data obtained as a result of the multiplexing, and the send/receive circuit unit ex301 performs digital-to-analog conversion and frequency transform of the data for transmitting via the antenna ex201.

As for receiving data of a moving picture file which is linked to a Web page or the like in data communication mode, the modem circuit unit ex306 performs inverse spread spectrum processing of the signal received from the base station ex110 via the antenna ex201, and sends out the multiplexed data obtained as a result of the processing to the multiplex/demultiplex unit ex308.

In order to decode the multiplexed data received via the antenna ex201, the multiplex/demultiplex unit ex308 separates the multiplexed data into a bit stream of picture data and a bit stream of voice data, and supplies the coded picture data to the picture decoding unit ex309 and the voice data to the voice processing unit ex305 respectively via the synchronous bus ex313.

Next, the picture decoding unit ex309, which includes the picture decoding apparatus as explained in the present invention, decodes the bit stream of picture data by the decoding method corresponding to the coding method as shown in the above-mentioned embodiments to generate reproduced moving picture data, and supplies this data to the display unit ex202 via the LCD control unit ex302, and thus moving picture data included in a moving picture file linked to a Web page, for instance, is displayed. At the same time, the voice processing unit ex305 converts the voice data into analog voice data, and supplies this data to the voice output unit ex208, and thus voice data included in a moving picture file linked to a Web page, for instance, is reproduced.

The present invention is not limited to the above-mentioned system, and at least either the picture coding apparatus or the picture decoding apparatus in the above-mentioned embodiments can be incorporated into a system for digital broadcasting as shown in FIG. 34. Such ground-based or satellite digital broadcasting has been in the news lately. More specifically, a coded bit stream of video information is transmitted from a broadcast station ex409 to a communication or broadcast satellite ex410 via radio waves. Upon receipt of it, the broadcast satellite ex410 transmits radio waves for broadcasting, a home-use antenna ex406 with a satellite broadcast reception function receives the radio waves, and a television (receiver) ex401 or a set top box (STB) ex407 decodes the bit stream for reproduction. The picture decoding apparatus as shown in the above-mentioned embodiments can be implemented in the reproduction apparatus ex403 for reading off and decoding the bit stream recorded on a storage medium ex402 that is a recording medium such as a CD and DVD. In this case, the reproduced video signals are displayed on a monitor ex404. It is also conceived to implement the picture decoding apparatus in the set top box ex407 connected to a cable ex405 for a cable television or the antenna ex406 for satellite and/or ground-based broadcasting so as to reproduce them on a monitor ex408 of the television ex401. The picture decoding apparatus may be incorporated into the television, not in the set top box. Or, a car ex412 having an antenna ex411 can receive signals from the satellite ex410, the base station ex107 or the like for reproducing moving pictures on a display device such as a car navigation system ex413 in the car ex412.

Furthermore, the picture coding apparatus as shown in the above-mentioned embodiments can code picture signals for recording on a recording medium. As a concrete example, there is a recorder ex420 such as a DVD recorder for recording picture signals on a DVD disc ex421 and a disk recorder for recording them on a hard disk. They can be recorded on an SD card ex422. If the recorder ex420 includes the picture decoding apparatus as shown in the above-mentioned embodiments, the picture signals recorded on the DVD disc ex421 or the SD card ex422 can be reproduced for display on the monitor ex408.

As the structure of the car navigation system ex413, the structure without the camera unit ex203, the camera interface unit ex303 and the picture coding unit ex312, out of the units shown in FIG. 33, is conceivable. The same applies to the computer ex111, the television (receiver) ex401 and others.

In addition, three types of implementations can be conceived for a terminal such as the above-mentioned mobile phone ex114; a sending/receiving terminal including both an encoder and a decoder, a sending terminal including an encoder only, and a receiving terminal including a decoder only.

As described above, it is possible to use the moving picture coding method or the moving picture decoding method in the above-mentioned embodiments in any of the above-mentioned apparatuses and systems, and using this method, the effects described in the above embodiments can be obtained.

It should be noted that the present invention is not limited to the above embodiments, and many variations or modifications thereof are possible without departing from the scope of the invention.

The present invention is suitable for a picture coding apparatus for performing coding with switching between frame coding and field coding on a block-by-block basis in a picture and a picture decoding apparatus. More specifically, it is suitable for a Web server for distributing moving pictures, a network terminal for receiving them, a digital camera for recording and replaying moving pictures, a camera-equipped mobile phone, a DVD recorder/player, a PDA, a personal computer and the like.

The invention claimed is:

1. A coding method for coding blocks of picture data, said coding method comprising:
generating, by a command generation unit, a sequence of commands for respectively assigning frame-indices, used for frame coding, to reference frames of the blocks of picture data;
adaptively switching, by a processor and on a block-by-block basis of the blocks of picture data, between frame coding and field coding;
specifying, by a reference frame specification unit and in a case where frame coding is performed on a block of picture data of the blocks of picture data, a reference frame, which is referred to when coding the block of picture data, according to a frame-index included in the assigned frame-indices assigned by the sequence of commands;
specifying, by a reference field specification unit and in a case where field coding is performed on the block of picture data, a reference field, which is referred to when coding the block of picture data, according to a field-index, which is for field coding the block of picture data and which is generated using the frame-index included in the assigned frame-indices;
coding, by a reference index coding unit and as a reference index, the frame-index, which is used for specifying the reference frame, in the case where frame coding is performed on the block of picture data;
coding, by the reference index coding unit and as a reference index, the field-index, which is used for specifying the reference field, in the case where field coding is performed on the block of picture data;
coding information indicating a maximum number of frame-indices; and
determining a maximum number of field-indices to be double a value of the maximum number of frame-indices,
wherein said specifying of the reference field includes:
determining the field-index so that a number of specified reference fields is not greater than the determined maximum number of field-indices;
specifying, as the field-index, a doubled value of a value of the frame-index, which is used for specifying a reference frame including the reference field, in a case where the reference field has a same parity as a parity of a field including the block of picture data; and
specifying, as the field-index, a value obtained by adding one to the doubled value of the value of the frame-index, which is used for specifying the reference frame including the reference field, in a case where the reference field has a different parity from the parity of the field including the block of picture data.

2. A non-transitory computer-readable recording medium having a program stored thereon, the program for coding an image signal, and the program causing a computer to execute a coding method comprising:
generating, by a command generation unit, a sequence of commands for respectively assigning frame-indices, used for frame coding, to reference frames of the blocks of picture data;
adaptively switching, by a processor and on a block-by-block basis of the blocks of picture data, between frame coding and field coding;
specifying, by a reference frame specification unit and in a case where frame coding is performed on a block of picture data of the blocks of picture data, a reference frame, which is referred to when coding the block of picture data, according to a frame-index included in the assigned frame-indices assigned by the sequence of commands;
specifying, by a reference field specification unit and in a case where field coding is performed on the block of picture data, a reference field, which is referred to when coding the block of picture data, according to a field-index, which is for field coding the block of picture data and which is generated using the frame-index included in the assigned frame-indices;
coding, by a reference index coding unit and as a reference index, the frame-index, which is used for specifying the reference frame, in the case where frame coding is performed on the block of picture data;
coding, by the reference index coding unit and as a reference index, the field-index, which is used for specifying the reference field, in the case where field coding is performed on the block of picture data;
coding information indicating a maximum number of frame-indices; and
determining a maximum number of field-indices to be double a value of the maximum number of frame-indices,
wherein said specifying of the reference field includes:
determining the field-index so that a number of specified reference fields is not greater than the determined maximum number of field-indices;
specifying, as the field-index, a doubled value of a value of the frame-index, which is used for specifying a reference frame including the reference field, in a case where the reference field has a same parity as a parity of a field including the block of picture data; and
specifying, as the field-index, a value obtained by adding one to the doubled value of the value of the frame-index, which is used for specifying the reference frame including the reference field, in a case where the reference field has a different parity from the parity of the field including the block of picture data.

3. A coding apparatus for coding blocks of picture data while adaptively switching, on a block-by-block basis of the blocks of picture data, between frame coding and field coding, said coding apparatus comprising:
a command generation unit operable to generate a sequence of commands for respectively assigning frame-indices, used for frame coding, to reference frames of the blocks of picture data;
a coding unit operable to code information indicating a maximum number of frame-indices;
a reference frame/field specification unit operable to:
specify, in a case where frame coding is performed on a block of picture data of the blocks of picture data, a reference frame, which is referred to when coding the block of picture data, according to a frame-index included in the assigned frame-indices assigned by the sequence of commands; and
specify, in a case where field coding is performed on the block of picture data, a reference field, which is referred to when coding the block of picture data, according to a field-index, which is for field coding the block of picture data and which is generated using the frame-index included in the assigned frame-indices; and
a reference index coding unit operable to:
code, as a reference index, the frame-index, which is used for specifying the reference frame, in the case where frame coding is performed on the block of picture data; and code, as a reference index, the field-index, which is used for specifying the reference field, in the case where field coding is performed on the block of picture data, wherein said reference frame/field specification unit:

specifies the reference field by determining the field-index so that a number of specified reference fields is not greater than a determined maximum number of field-indices that is double a value of the maximum number of frame-indices;

specifies, as the field-index, a doubled value of a value of the frame-index, which is used for specifying a reference frame including the reference field, in a case where the reference field has a same parity as a parity of a field including the block of picture data; and specifies, as the field-index, a value obtained by adding one to the doubled value of the value of the frame-index, which is used for specifying the reference frame including the reference field, in a case where the reference field has a different parity from the parity of the field including the block of picture data.

* * * * *

UNITED STATES PATENT AND TRADEMARK OFFICE
CERTIFICATE OF CORRECTION

| | |
|---|---|
| PATENT NO. | : 7,995,651 B2 |
| APPLICATION NO. | : 12/969897 |
| DATED | : August 9, 2011 |
| INVENTOR(S) | : Kiyofumi Abe et al. |

Page 1 of 1

It is certified that error appears in the above-identified patent and that said Letters Patent is hereby corrected as shown below:

TITLE PAGE
Item 60 – Related U.S. Application Data – "Continuation of application No. 11/980,618, filed on Oct. 31, 2007, which is a division of application No. 10/501,001, filed as application No. PCT/JP03/13679 on Oct. 27, 2003, now Pat. No. 7,881,375."

Change to -- Division of Application No. 10/501,001, filed as Application No. PCT/JP03/13679 on October 27, 2003, now Pat. No. 7,881,375--.

Signed and Sealed this
Fifteenth Day of November, 2011

David J. Kappos
*Director of the United States Patent and Trademark Office*